United States Patent
Chulinin et al.

(10) Patent No.: US 10,068,156 B2
(45) Date of Patent: Sep. 4, 2018

(54) METHODS AND SYSTEMS FOR DECISION-TREE-BASED AUTOMATED SYMBOL RECOGNITION

(71) Applicant: ABBYY Development LLC, Moscow (RU)

(72) Inventors: Yuri Chulinin, Moscow (RU); Yury Vatlin, Moscow (RU)

(73) Assignee: ABBYY Development LLC, Moscow (RU)

(*) Notice: Subject to any disclaimer, the term of this patent is extended or adjusted under 35 U.S.C. 154(b) by 444 days.

(21) Appl. No.: 14/662,570

(22) Filed: Mar. 19, 2015

(65) Prior Publication Data

US 2016/0217123 A1  Jul. 28, 2016

(30) Foreign Application Priority Data

Jan. 27, 2015 (RU) .................................. 2015102520

(51) Int. Cl.
*G06K 9/00* (2006.01)
*G06K 9/62* (2006.01)
*G06K 9/03* (2006.01)
*G06K 9/72* (2006.01)
*G06K 9/34* (2006.01)
(Continued)

(52) U.S. Cl.
CPC ....... *G06K 9/6282* (2013.01); *G06F 17/2765* (2013.01); *G06K 9/00986* (2013.01); *G06K 9/03* (2013.01); *G06K 9/344* (2013.01); *G06K 9/348* (2013.01); *G06K 9/469* (2013.01); *G06K 9/72* (2013.01); *G06K 2209/011* (2013.01)

(58) Field of Classification Search
CPC ......... G06K 2209/01; G06K 2209/011; G06K 2209/013; G06K 9/6282
See application file for complete search history.

(56) References Cited

U.S. PATENT DOCUMENTS 4,499,596 A   2/1985  Casey et al.
4,589,142 A * 5/1986  Bednar ................ G06K 9/6282
                                                    382/226
(Continued)

OTHER PUBLICATIONS

Y. X. Gu et al., "Application of a Multilayer Decision Tree in Computer Recognition of Chinese Character", IEEE Transactions on Pattern Analysis and Machine Intelligence, vol. 5, No. 9, Jan. 1983, 2 pages.

(Continued)

*Primary Examiner* — Wesley J Tucker
(74) *Attorney, Agent, or Firm* — Lowenstein Sandler LLP

(57) ABSTRACT

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed create and store a decision tree, the nodes of which include classifiers that each recognizes the symbol that corresponds to a symbol image. Input of a symbol image to the decision tree and processing of the symbol image through one or more nodes of the decision tree returns a symbol corresponding to the symbol image.

23 Claims, 62 Drawing Sheets

(51) Int. Cl.
*G06K 9/46* (2006.01)
*G06F 17/27* (2006.01)

(56) References Cited

U.S. PATENT DOCUMENTS

| | | | | |
|---|---|---|---|---|
| 4,831,657 | A | | 5/1989 | Casey et al. |
| 4,975,975 | A | * | 12/1990 | Filipski ............... G06K 9/6217 382/159 |
| 4,989,258 | A | * | 1/1991 | Takahashi ........... G06K 9/6282 382/199 |
| 5,394,484 | A | * | 2/1995 | Casey ................. G06K 9/6282 382/159 |
| 6,480,838 | B1 | * | 11/2002 | Peterman ........... G06K 9/00865 |
| 7,031,948 | B2 | * | 4/2006 | Lee ...................... G05B 13/028 706/12 |
| 8,463,054 | B2 | * | 6/2013 | De Muelenaere ....... G06K 9/44 382/227 |
| 8,532,389 | B2 | | 9/2013 | Mossakowski |
| 2003/0130992 | A1 | * | 7/2003 | Tyan ................. G06F 17/30253 |
| 2016/0247019 | A1 | * | 8/2016 | Chulinin ........... G06K 9/00456 |

OTHER PUBLICATIONS

Henry S. Baird et al., "Bounded-Error Preclassification Trees", AT&T Bell Laboratories, Murray Hill, NJ, 7 pages.

Henry S. Baird et al., "High-performance OCR preclassification trees", AT&T Bell Laboratories, Murray Hill, NJ, 7 pages.

Ibrahim S. I. Abuhaiba, "Efficient OCR Using Simple Features and Decision Trees With Backtracking", Dept. of Electrical and Computer Engineering, University of Gaza, Gaza, Palestine, The Arabian Journal for Science and Engineering, vol. 31, No. 2B, Oct. 2006, 21 pages.

Siddhaling Urolagin et al., "Design of a Decision Tree to Classify Similar Looking Characters using Subimages for Kannada Script", Journal of Pattern Recognition Research 1 (2012), 14 pages.

Adnan Amin, "Recognition of printed arabic text based on global features and decision tree learning techniques", School of Computer Science and Engineering, Univ. of New South Wales, 2052 Sydney, Australia, The Journal of the Pattern Recognition Society 2000, 15 pages.

* cited by examiner

<My goal was supposed to be a math teacher, however, I ended up to be hired by a personal computer company.>

Taking programing classes in my college and purchasing a microcomputer seemed to be a trigger for working with a computer. One day, when I got news that a new, high performance computer had been on r sale, I chose the computer company as a part time job. The job was to answer to customer's questions in the show room, and I was allowed to use those computers anytime when I had nothing to do.

"You soon get tired of one thing. I wonder how you can keep taking care of high school students by three years as a teacher", one day an executive of the company said, which made me sense certainly. Then, I made a decision to get a job in the company.It was a small venture business where I was working for. While working there being given a lot of different roles at the developmental fields, every day was absolutely fulfillment for me. The company was happened to be sold by TOSHIBA, Inc., when it was my tenth year. If you work for a corporation, your goal should be getting a position as "president". However, TOSHIBA had more than thirty executives; many of them were so smart people, it was totally impossible for me to be the president.

Fall Down Seven Times, Get up Eight

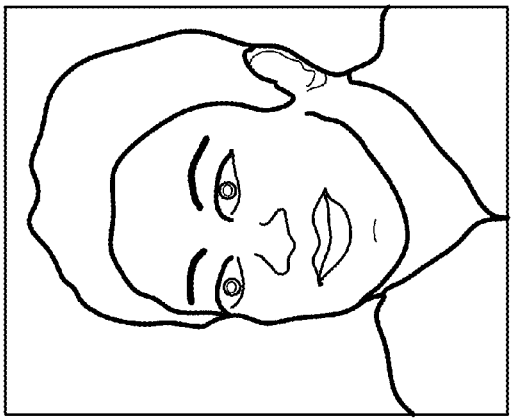

Handmade Search Engine by Grope

Born in Tokyo in 1957. Graduate from Tokyo University of Science in 1979, got employed by Sword Machine Systems. Moving to Soft Bank Laboratory, Soft Bank, then funded Yahoo Inc, in January 1996. President & CEO Yahoo Inc from January 1996. Jazz music and reading science fiction as hobby and interest. His current favorite is "Perry Rhodan Universe Hero", which has been written by multiple writers novel relay in Germany.

FIG. 1B

| symbol | h/hw | v/vw | b | num vs | num hs | num vs + num hs | v/h |
|---|---|---|---|---|---|---|---|
| 1 | .2 | .6 | .12 | 0 | 0 | 0 | 3 |
| 2 | .6 | .6 | .28 | 0 | 0 | 0 | 1 |
| 3 | .6 | .2 | .12 | 0 | 0 | 0 | .33 |
| 4 | .2 | .6 | .12 | 0 | 0 | 0 | 3 |
| 5 | .6 | .46 | .2 | 0 | 0 | 0 | .77 |
| 6 | .6 | .46 | .2 | 0 | 0 | 0 | .77 |
| 7 | .2 | .6 | .6 | 1 | 0 | 1 | 3 |
| 8 | .6 | .6 | .28 | 0 | 0 | 0 | 1 |
| 9 | .6 | .6 | .28 | 0 | 0 | 0 | 1 |
| 10 | .6 | .6 | .28 | 0 | 0 | 0 | 1 |
| 11 | .46 | .6 | .2 | 0 | 0 | 0 | 1.3 |
| 12 | .46 | .6 | .2 | 0 | 0 | 0 | 1.3 |
| 13 | .6 | .6 | .28 | 0 | 0 | 0 | 1 |
| 14 | .6 | .6 | .32 | 0 | 0 | 0 | 1 |
| 15 | .6 | .2 | .16 | 0 | 1 | 1 | .33 |
| 16 | .6 | .6 | .28 | 0 | 0 | 0 | 1 |
| 17 | .2 | .2 | .08 | 1 | 0 | 1 | 1 |
| 18 | .2 | .2 | .12 | 0 | 0 | 0 | 1 |
| 19 | .2 | .6 | .16 | 1 | 0 | 1 | 3 |
| 20 | .6 | .6 | .32 | 0 | 0 | 0 | 1 |
| 21 | .6 | .2 | .16 | 0 | 1 | 1 | .33 |
| 22 | .6 | .6 | .28 | 0 | 0 | 0 | 1 |
| 23 | .2 | .6 | .2 | 1 | 0 | 1 | 3 |
| 24 | .2 | .2 | .12 | 0 | 0 | 0 | 1 |
| 25 | .2 | .6 | .16 | 1 | 0 | 1 | 3 |
| 26 | .6 | .6 | .2 | 0 | 0 | 0 | 1 |
| 27 | .2 | .2 | .08 | 0 | 1 | 1 | 1 |
| 28 | .2 | .6 | .08 | 0 | 1 | 1 | 1 |
| 29 | .2 | .6 | .2 | 1 | 0 | 1 | 3 |
| 30 | .2 | .2 | .16 | 0 | 0 | 0 | 1 |
| 31 | .2 | .6 | .16 | 1 | 0 | 1 | 3 |
| 32 | .6 | .6 | .2 | 0 | 0 | 0 | 1 |
| 33 | .2 | .33 | .15 | 0 | 0 | 0 | 1.7 |
| 34 | .2 | .33 | .15 | 0 | 0 | 0 | 1.7 |
| 35 | .2 | .33 | .23 | 0 | 0 | 0 | 1.7 |
| 36 | .2 | .2 | .16 | 0 | 0 | 0 | 1 |
| 37 | .6 | .6 | .32 | 0 | 0 | 0 | 1 |
| 38 | .6 | .6 | .2 | 0 | 0 | 0 | 1 |
| 39 | .2 | .33 | .19 | 0 | 0 | 0 | 1.7 |
| 40 | .2 | .33 | .19 | 0 | 0 | 0 | 1.7 |
| 41 | .2 | .33 | .19 | 0 | 0 | 0 | 1.7 |
| 42 | .2 | .2 | .04 | 0 | 0 | 0 | 1 |
| 43 | .6 | .6 | .2 | 0 | 0 | 0 | 1 |
| 44 | .6 | .6 | .2 | 0 | 0 | 0 | 1 |
| 45 | .6 | .6 | .2 | 0 | 0 | 0 | 1 |
| 46 | .2 | .33 | .19 | 0 | 0 | 0 | 1.7 |
| 47 | .2 | .33 | .23 | 0 | 0 | 0 | 1.7 |
| 48 | .2 | .2 | .16 | 1 | 1 | 2 | 1 |

FIG. 9

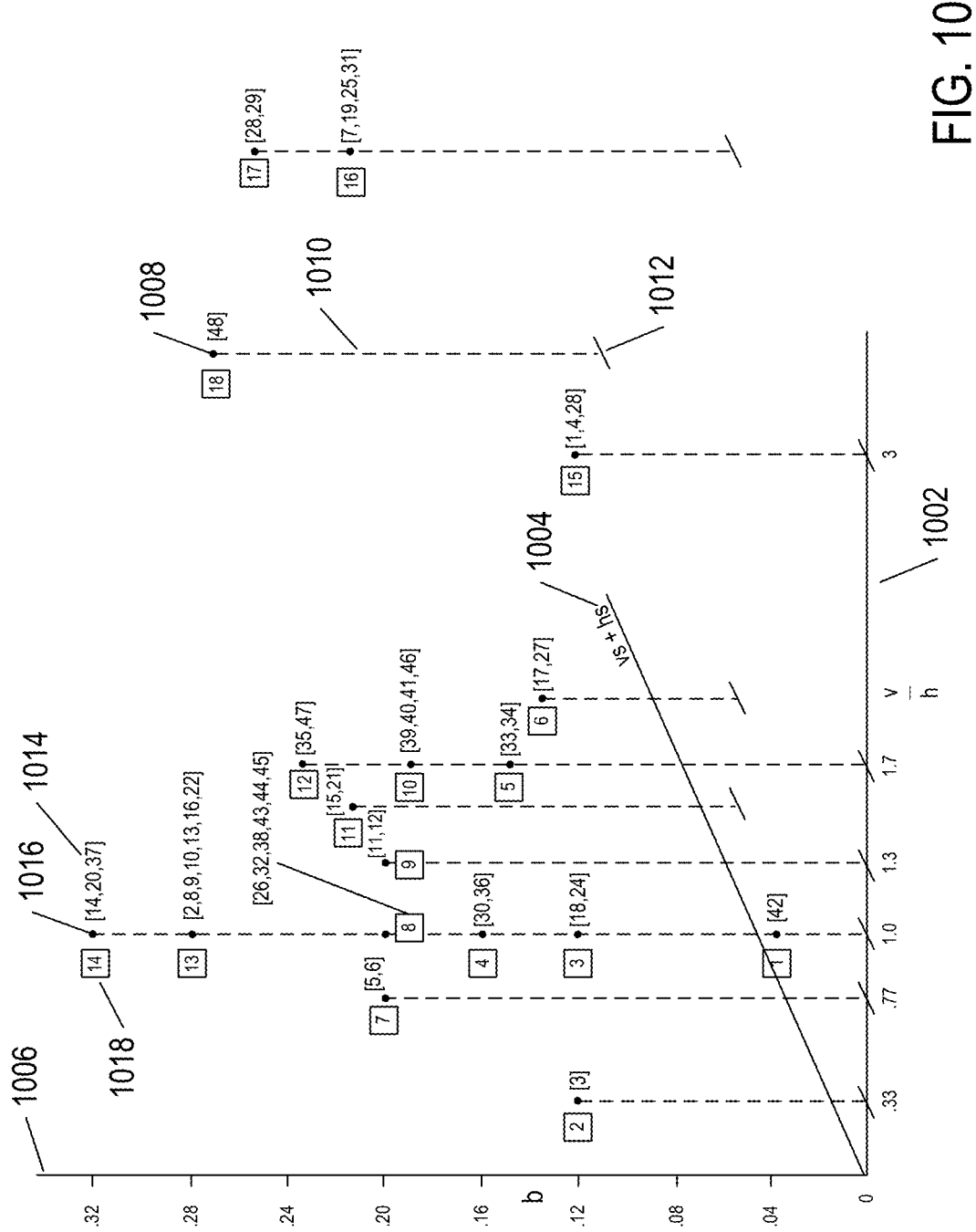

| | h/hw | v/vw | b | num vs | num hs | num vs + num hs | v/h | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 13B

| | $\dfrac{h}{hw}$ | $\dfrac{v}{vw}$ | b | num vs | num hs | num vs + num hs | $\dfrac{v}{h}$ | P | longest edge |
|---|---|---|---|---|---|---|---|---|---|
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 14B

| | $\dfrac{h}{hw}$ | $\dfrac{v}{vw}$ | b | num vs | num hs | num vs + num hs | $\dfrac{v}{h}$ | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 15B

| | h/hw | v/vw | b | num vs | num hs | num vs + num hs | v/h | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 37 | .6 | .6 | .32 | 0 | 0 | 0 | 1 | 0 | 3 |
| 38 | .6 | .6 | .2 | 0 | 0 | 0 | 1 | 7 | 3 |
| 39 | .2 | .33 | .19 | 0 | 0 | 0 | 1.7 | 10 | 2 |
| 40 | .2 | .33 | .19 | 0 | 0 | 0 | 1.7 | 9 | 2 |
| 41 | .2 | .33 | .19 | 0 | 0 | 0 | 1.7 | 12 | 2 |
| 42 | .2 | .2 | .04 | 0 | 0 | 0 | 1 | 0 | 3 |
| 43 | .6 | .6 | .2 | 0 | 0 | 0 | 1 | 2 | 1 |
| 44 | .6 | .6 | .2 | 0 | 0 | 0 | 1 | 8 | 3 |
| 45 | .6 | .6 | .2 | 0 | 0 | 0 | 1 | 0 | 3 |
| 46 | .2 | .33 | .19 | 0 | 0 | 0 | 1.7 | 11 | 2 |
| 47 | .2 | .33 | .23 | 0 | 0 | 0 | 1.7 | 14 | 2 |
| 48 | .2 | .2 | .16 | 1 | 1 | 2 | 1 | 0 | 3 |

FIG. 16B

| | h/hw | v/vw | b | num vs | num hs | num vs + num hs | v/h | P | longest edge |
|---|---|---|---|---|---|---|---|---|---|
| 1 | .2 | .6 | .12 | 0 | 0 | 0 | 3 | 0 | 0 |
| 2 | .6 | .6 | .28 | 0 | 0 | 0 | 1 | 2 | 3 |
| 3 | .6 | .2 | .12 | 0 | 0 | 0 | .33 | 0 | 1 |
| 4 | .2 | .6 | .12 | 0 | 0 | 0 | 3 | 2 | 0 |
| 5 | .6 | .46 | .2 | 0 | 0 | 0 | .77 | 4 | 2 |
| 6 | .6 | .46 | .2 | 0 | 0 | 0 | .77 | 3 | 2 |
| 7 | .2 | .6 | .6 | 1 | 0 | 1 | 3 | 5 | 0 |
| 8 | .6 | .6 | .28 | 0 | 0 | 0 | 1 | 4 | 1 |
| 9 | .6 | .6 | .28 | 0 | 0 | 0 | 1 | 0 | 1 |
| 10 | .6 | .6 | .28 | 0 | 0 | 0 | 1 | 3 | 3 |
| 11 | .46 | .6 | .2 | 0 | 0 | 0 | 1.3 | 2 | 2 |
| 12 | .46 | .6 | .2 | 0 | 0 | 0 | 1.3 | 1 | 2 |
| 13 | .6 | .6 | .28 | 0 | 0 | 0 | 1 | 0 | 0 |
| 14 | .6 | .6 | .32 | 0 | 0 | 0 | 1 | 14 | 0 |
| 15 | .6 | .2 | .16 | 0 | 1 | 1 | .33 | 2 | 1 |
| 16 | .6 | .6 | .28 | 0 | 0 | 0 | 1 | 4 | 3 |
| 17 | .2 | .2 | .08 | 1 | 0 | 1 | 1 | 0 | 3 |
| 18 | .2 | .2 | .12 | 0 | 0 | 0 | 1 | 13 | 2 |
| 19 | .2 | .6 | .16 | 1 | 0 | 1 | 3 | 11 | 0 |
| 20 | .6 | .6 | .32 | 0 | 0 | 0 | 1 | 13 | 0 |
| 21 | .6 | .2 | .16 | 0 | 1 | 1 | .33 | 1 | 1 |
| 22 | .6 | .6 | .28 | 0 | 0 | 0 | 1 | 1 | 3 |
| 23 | .2 | .6 | .2 | 1 | 0 | 1 | 3 | 4 | 0 |
| 24 | .2 | .2 | .12 | 0 | 0 | 0 | 1 | 14 | 2 |
| 25 | .2 | .6 | .16 | 1 | 0 | 1 | 3 | 10 | 0 |
| 26 | .6 | .6 | .2 | 0 | 0 | 0 | 1 | 6 | 3 |
| 27 | .2 | .2 | .08 | 0 | 1 | 1 | 1 | 0 | 3 |
| 28 | .2 | .6 | .08 | 0 | 1 | 1 | 1 | 0 | 2 |
| 29 | .2 | .6 | .2 | 1 | 0 | 1 | 3 | 3 | 0 |
| 30 | .2 | .2 | .16 | 0 | 0 | 0 | 1 | 14 | 2 |
| 31 | .2 | .6 | .16 | 1 | 0 | 1 | 3 | 9 | 0 |
| 32 | .6 | .6 | .2 | 0 | 0 | 0 | 1 | 5 | 3 |
| 33 | .2 | .33 | .15 | 0 | 0 | 0 | 1.7 | 14 | 2 |
| 34 | .2 | .33 | .15 | 0 | 0 | 0 | 1.7 | 13 | 2 |
| 35 | .2 | .33 | .23 | 0 | 0 | 0 | 1.7 | 13 | 2 |
| 36 | .2 | .2 | .16 | 0 | 0 | 0 | 1 | 13 | 2 |

FIG. 17B

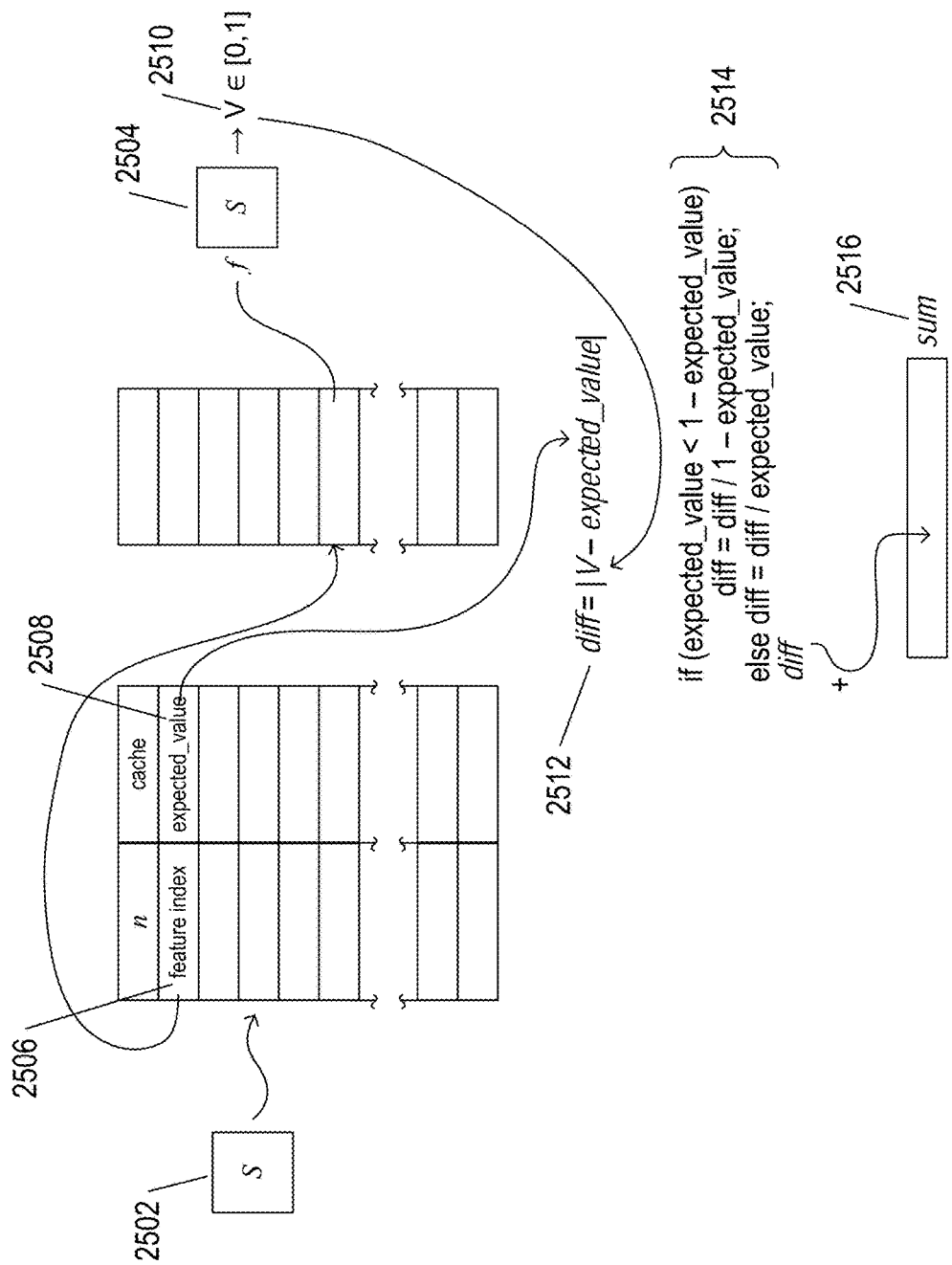

METHODS AND SYSTEMS FOR DECISION-TREE-BASED AUTOMATED SYMBOL RECOGNITION

CROSS REFERENCE TO RELATED APPLICATIONS

This application claims the benefit of priority to Russian Patent Application No. 2015102520, filed Jan. 27, 2015; disclosure of which is incorporated herein by reference in its entirety.

TECHNICAL FIELD

The current application is directed to automated processing of scanned-document images and other text-containing images and, in particular, to methods and systems that efficiently convert symbol images extracted from scanned documents to digital encodings of the corresponding symbols using a decision tree that includes classifiers. each of which recognizes a symbol that corresponds to a symbol image.

BACKGROUND

Printed, typewritten, and handwritten documents have long been used for recording and storing information. Despite current trends towards paperless offices, printed documents continue to be widely used in commercial, institutional, and home environments. With the development of modern computer systems, the creation, storage, retrieval, and transmission of electronic documents has evolved, in parallel with continued use of printed documents, into an extremely efficient and cost-effective alternative information-recording and information-storage medium. Because of overwhelming advantages in efficiency and cost effectiveness enjoyed by modern electronic-document-based information storage and information transactions, printed documents are routinely converted into electronic documents by various methods and systems, including conversion of printed documents into digital scanned-document images using electro-optico-mechanical scanning devices, digital cameras, and other devices and systems followed by automated processing of the scanned-document images to produce electronic documents encoded according to one or more of various different electronic-document-encoding standards. As one example, it is now possible to employ a desktop scanner and sophisticated optical-character-recognition ("OCR") control programs that control a personal computer to convert a printed-paper document into a corresponding electronic document that can be displayed and edited using a word-processing program.

While modern OCR systems have advanced to the point that complex printed documents that include pictures, frames, line boundaries, and other non-text elements as well as text symbols of any of many common alphabet-based languages can be automatically converted to electronic documents, challenges remain with respect to conversion of printed documents containing Chinese and Japanese characters or Korean morpho-syllabic blocks.

SUMMARY

The current document is directed to methods and systems for identifying symbols corresponding to symbol images in a scanned-document image or other text-containing image, with the symbols corresponding to Chinese or Japanese characters, to Korean morpho-syllabic blocks, or to symbols of other languages that use a large number of symbols for writing and printing. In one implementation, the methods and systems to which the current document is directed create and store a decision tree, the nodes of which include classifiers that each recognizes the symbol that corresponds to a symbol image. Input of a symbol image to the decision tree and processing of the symbol image through one or more nodes of the decision tree returns a symbol corresponding to the symbol image.

BRIEF DESCRIPTION OF THE DRAWINGS

FIG. 1B illustrates a printed document.

FIG. 9 shows a table of parameter values computed for all of the symbols in the example symbol set shown in FIG. 6.

FIG. 10 illustrates a three-dimensional plot of the symbols of the example set of symbols shown in FIG. 6 within a three-dimensional space, where the dimensions represent values of each of three different parameters.

FIG. 13B illustrates the full set of parameter values for the hypothetical symbol set shown in FIG. 6.

FIG. 14B illustrates construction of four decision trees from four subsets of the hypothetical symbol set shown in FIG. 6.

FIG. 15B illustrates construction of four decision trees from four subsets of the hypothetical symbol set shown in FIG. 6.

FIG. 16B illustrates construction of four decision trees from four subsets of the hypothetical symbol set shown in FIG. 6.

FIG. 17B illustrates construction of four decision trees from four subsets of the hypothetical symbol set shown in FIG. 6.

FIG. 25A illustrates generation of a weight by a pattern data structure and OCR logic for an input symbol image.

DETAILED DESCRIPTION

The current document is directed to methods and systems for identifying symbols corresponding to symbol images in a scanned-document image. In one implementation, the methods and systems to which the current document is directed create and store a decision tree, the nodes of which include classifiers that each recognizes a particular symbol. Input of a symbol image to the decision tree and processing of the symbol image through one or more nodes of the decision tree returns a symbol corresponding to the symbol image. The following discussion includes three subsections: (1) an overview of scanned document images and electronic documents; (2) a description of example OCR methods and systems; and (3) a discussion of decision-tree-based symbol-image recognition to which the current application and claims is directed.

Scanned Document Images and Electronic Documents

Figure 1A:
FIG. 1A illustrates a printed document.

FIGS. 1A-B illustrates a printed document. FIG. 1A shows the original document with Japanese text. The printed document 100 includes a photograph 102 and five different text-containing regions 104-108 that include Japanese characters. This is an example document used in the following discussion of the method and systems for sense-orientation determination to which the current application is directed. The Japanese text may be written in left-to-right fashion, along horizontal rows, as English is written, but may alternatively be written in top-down fashion within vertical columns. For example, region 107 is clearly written vertically while text block 108 includes text written in horizontal rows. FIG. 1B shows the printed document illustrated in FIG. 1A translated into English.

Figure 2:
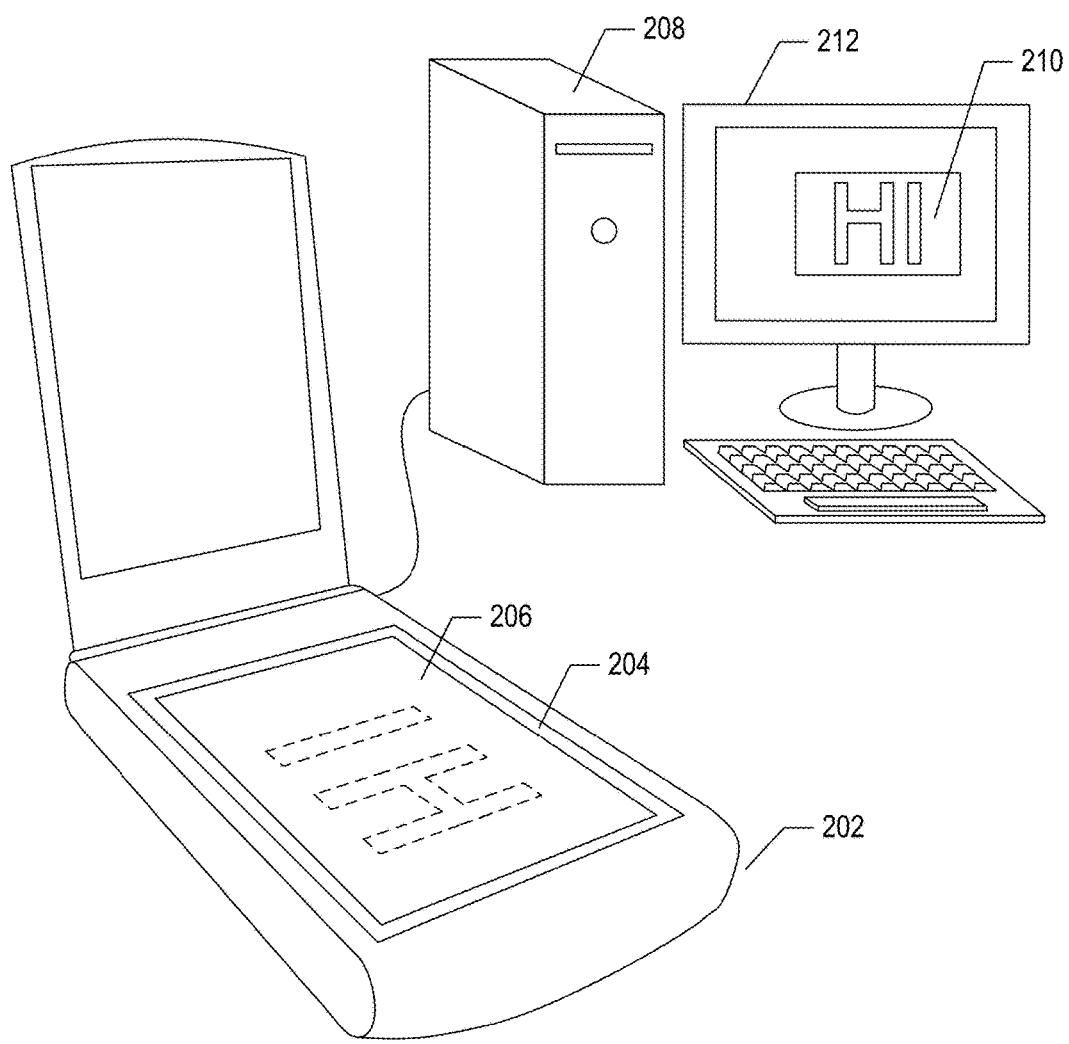
FIG. 2 illustrates a typical desktop scanner and personal computer that are together used to convert printed documents into digitally encoded electronic documents stored in mass-storage devices and/or electronic memories.

Printed documents can be converted into digitally encoded, scanned-document images by various means, including electro-optico-mechanical scanning devices and digital cameras. FIG. 2 illustrates a typical desktop scanner and personal computer that are together used to convert printed documents into digitally encoded electronic documents stored in mass-storage devices and/or electronic memories. The desktop scanning device 202 includes a transparent glass bed 204 onto which a document is placed, face down 206. Activation of the scanner produces a digitally encoded scanned-document image which may be transmitted to the personal computer ("PC") 208 for storage in a mass-storage device. A scanned-document-image-rendering program may render the digitally encoded scanned-document image for display 210 on a PC display device 212.

Figure 3:
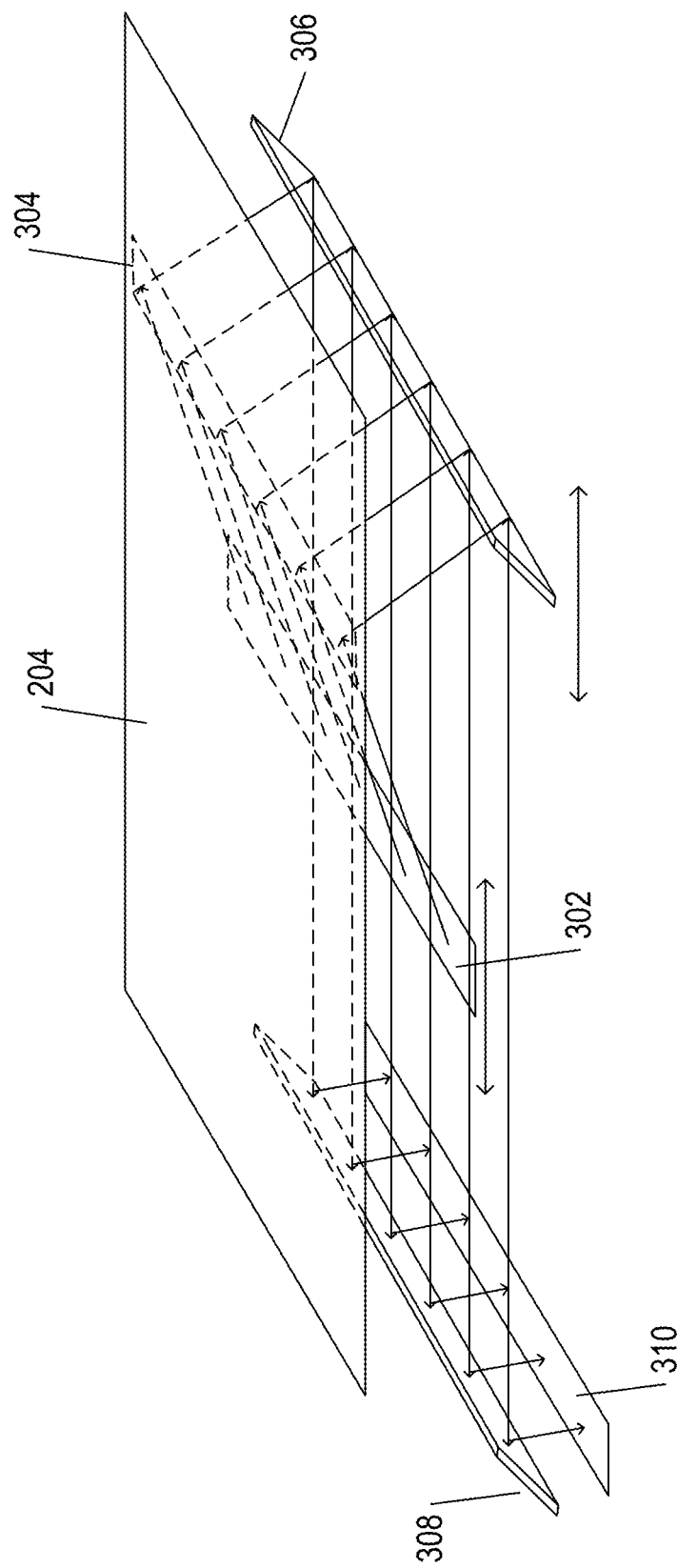
FIG. 3 illustrates operation of the optical components of the desktop scanner shown in FIG. 2.

FIG. 3 illustrates operation of the optical components of the desktop scanner shown in FIG. 2. The optical components in this charge-coupled-device ("CCD") scanner reside below the transparent glass bed 204. A laterally translatable bright-light source 302 illuminates a portion of the document being scanned 304 which, in turn, re-emits and reflects light downward. The re-emitted and reflected light is reflected by a laterally translatable mirror 306 to a stationary mirror 308, which reflects the emitted light onto an array of CCD elements 310 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 4:
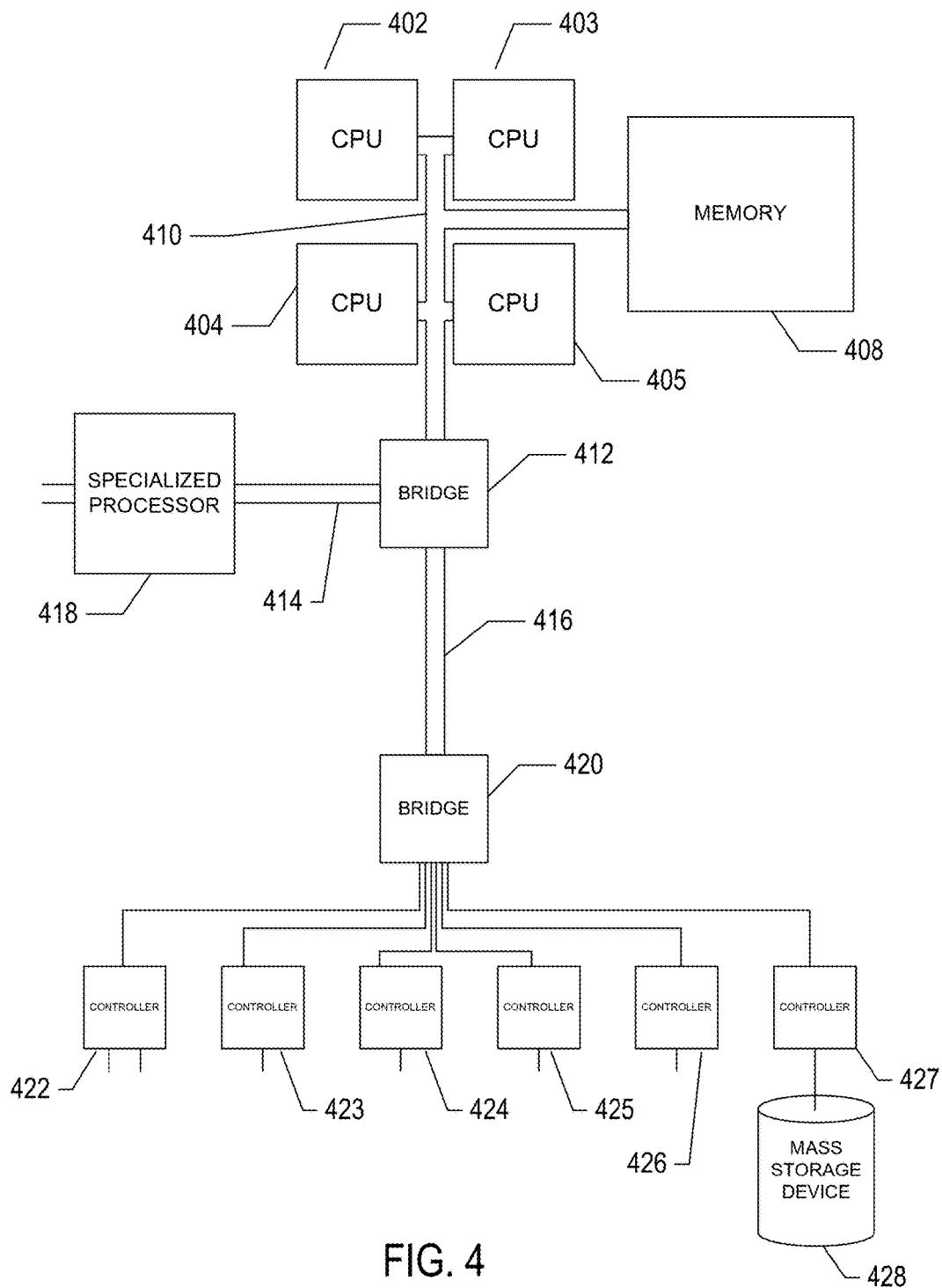
FIG. 4 provides a general architectural diagram for various types of computers and other processor-controlled devices.

FIG. 4 provides a general architectural diagram for various types of computers and other processor-controlled devices. The high-level architectural diagram may describe a modern computer system, such as the PC in FIG. 2, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 402-405, one or more electronic memories 408 interconnected with the CPUs by a CPU/memory-subsystem bus 410 or multiple busses, a first bridge 412 that interconnects the CPU/memory-subsystem bus 410 with additional busses 414 and 416, or other types of high-speed interconnection media, including multiple, high-speed serial interconnects. These busses or serial interconnections, in turn, connect the CPUs and memory with specialized processors, such as a graphics processor 418, and with one or more additional bridges 420, which are interconnected with high-speed serial links or with multiple controllers 422-427, such as controller 427, that provide access to various different types of mass-storage devices 428, electronic displays, input devices, and other such components, subcomponents, and computational resources.

Figure 5:
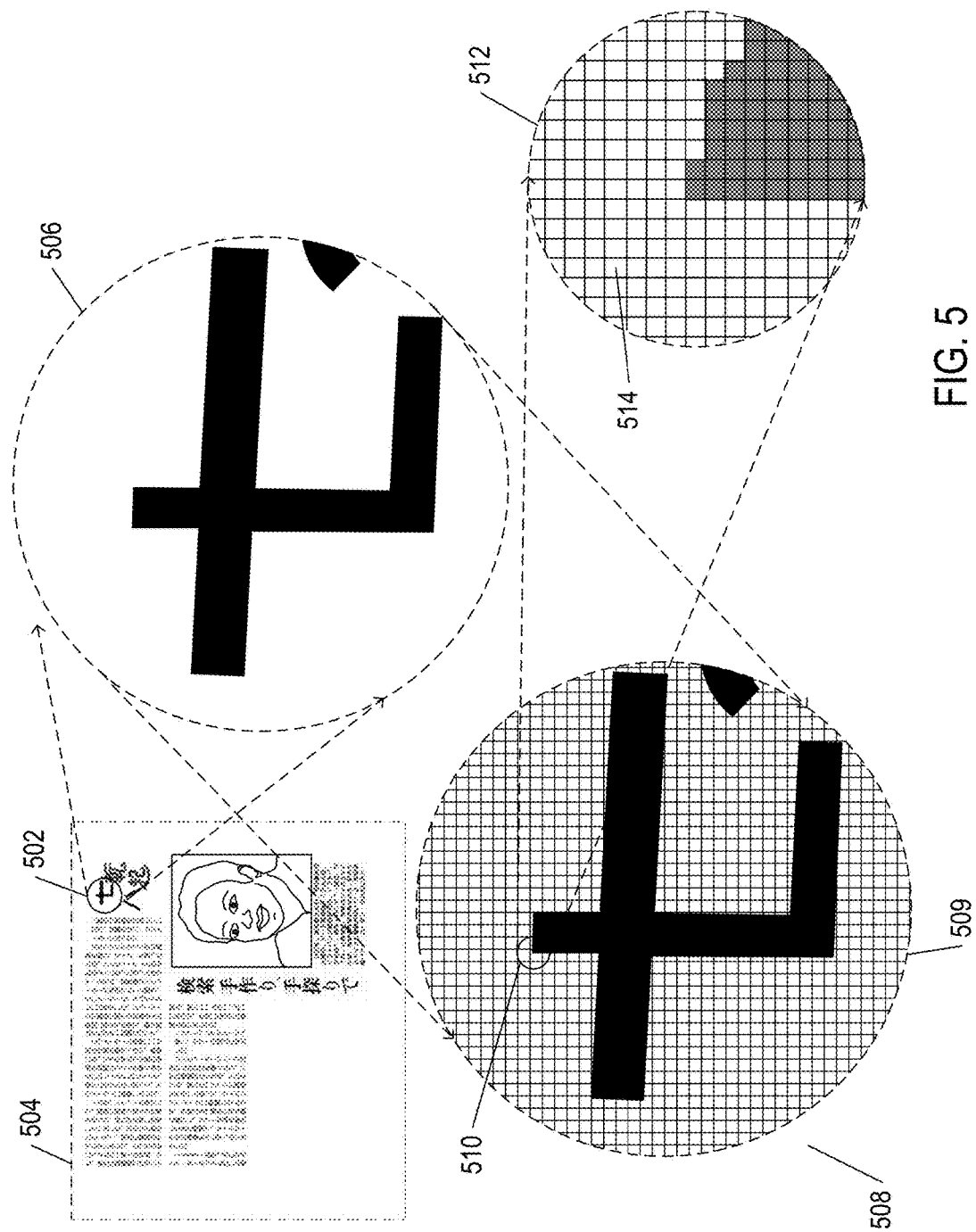
FIG. 5 illustrates digital representation of a scanned document.

FIG. 5 illustrates digital representation of a scanned document. In FIG. 5, a small disk-shaped portion 502 of the example printed document 504 is shown magnified 506. A corresponding portion of the digitally encoded scanned-document image 508 is also represented in FIG. 5. The digitally encoded scanned document includes data that represents a two-dimensional array of pixel-value encodings. In the representation 508, each cell of a grid below the characters, such as cell 509, represents a square matrix of pixels. A small portion 510 of the grid is shown at even higher magnification, 512 in FIG. 5, at which magnification the individual pixels are represented as matrix elements, such as matrix element 514. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character. Sub-images corresponding to symbol images can be processed to produce a bit for the symbol image, in which bits with value "1" correspond to the symbol image and bits with value "0" correspond to background. Bit maps are convenient for representing both extracted symbol images as well as patterns used by an OCR system to recognize particular symbols.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

In an initial phase of scanned-document-image-to-electronic-document conversion, a printed document, such as the example document 100 shown in FIG. 1, is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. The tree representing the document includes a root node corresponding to the document as a whole and six leaf nodes each corresponding to one of the identified regions. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region is determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. The text-containing regions are then partitioned into sub-images that contain individual characters or symbols, and these sub-images are then generally scaled and oriented, and the symbol images are centered within the sub-image to facilitate subsequent automated recognition of the symbols that correspond to the symbol images.

Example OCR Methods and Systems

Figure 6:
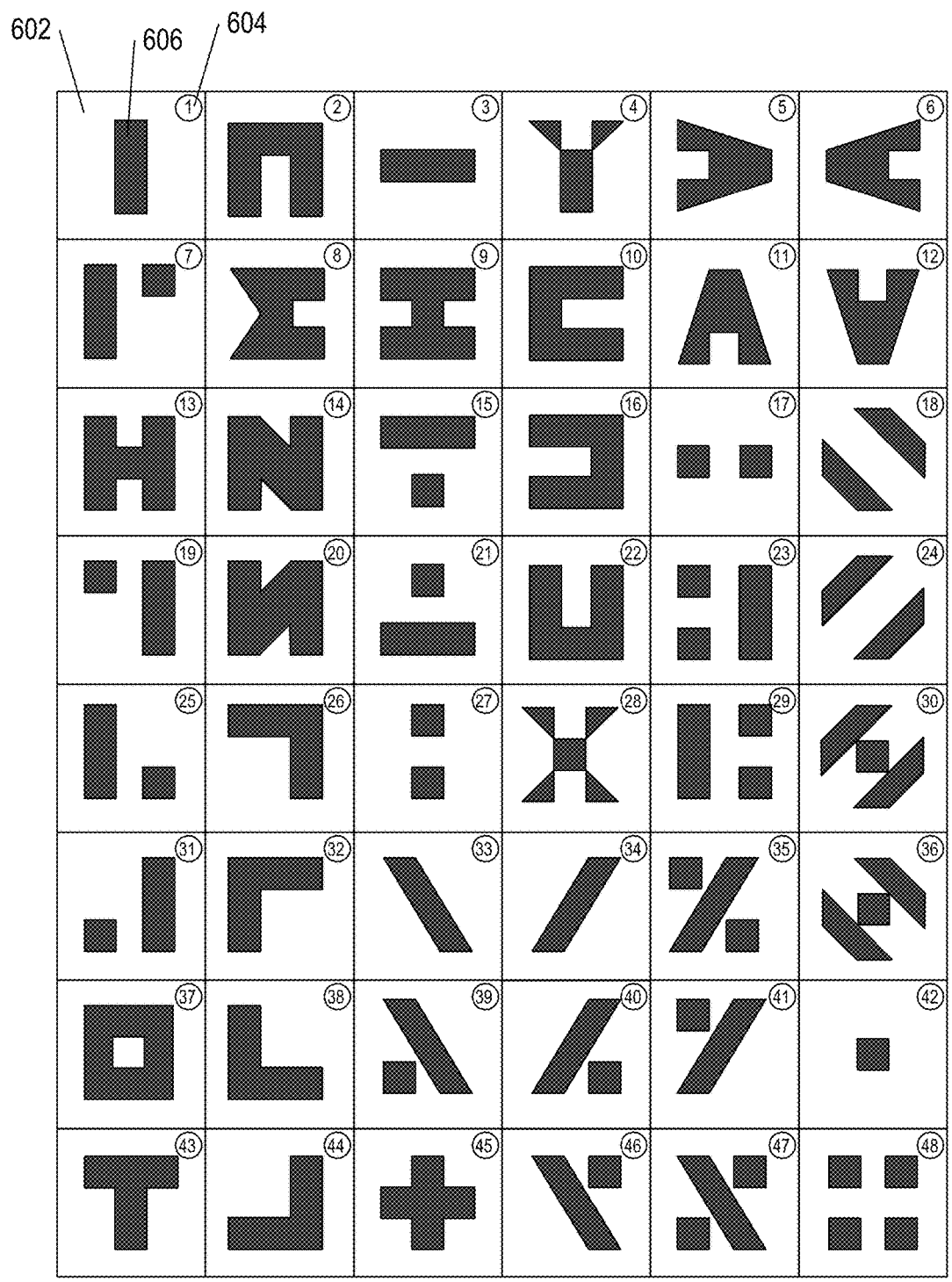
FIG. 6 shows a hypothetical symbol set.

In order to provide a concrete discussion of various optical-character-recognition techniques, an example symbol set for a hypothetical language is used. FIG. 6 shows a hypothetical symbol set. In FIG. 6, 48 different symbols are shown within each of 48 rectangular regions, such as rectangular region 602. In the right-hand corner of each rectangular region, a numerical index or code for the symbol is shown inscribed within a circle, such as the index or code "1" 604 corresponding to the first symbol 606 shown in rectangular region 602. The example is chosen for illustration of both currently existing OCR methods and systems as well as new OCR methods and systems disclosed in the current document. In fact, for character-based written languages, including Chinese and Japanese, there may be many tens of thousands of different symbols used for printing and writing the language.

Figure 7A:
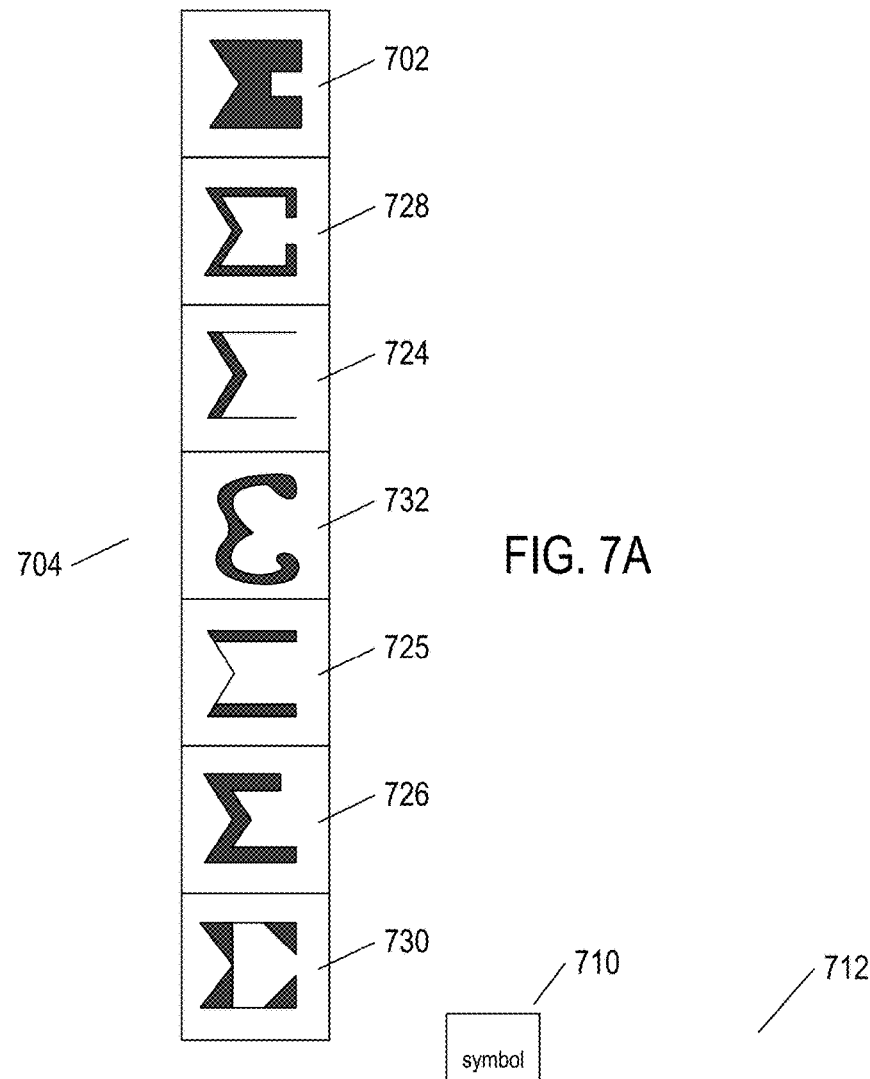
FIG. 7A illustrates various aspects of symbol sets for natural languages.
Figure 7B:
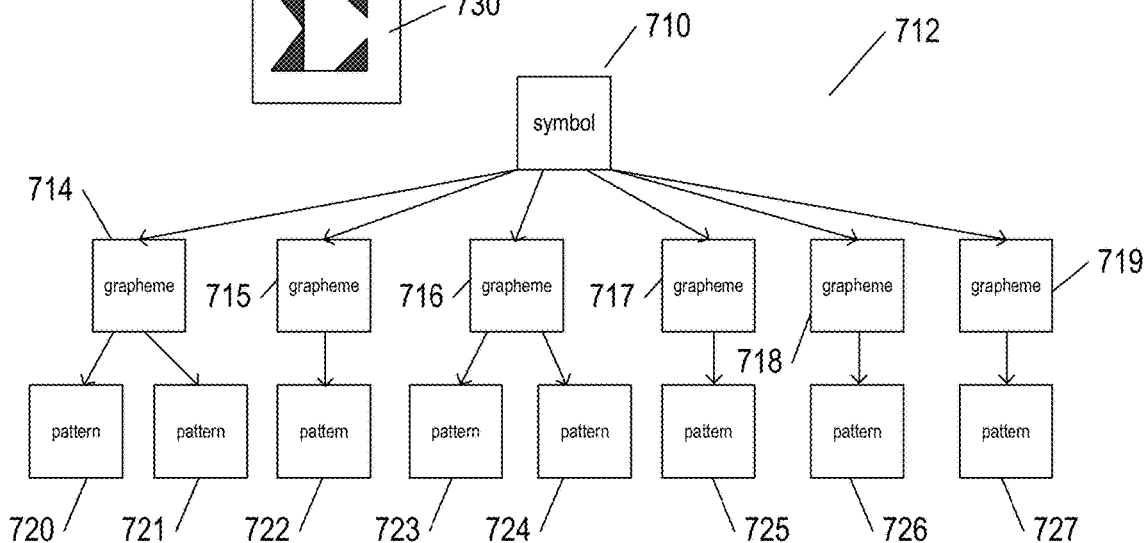
FIG. 7B illustrates various aspects of symbol sets for natural languages.

FIGS. 7A-B illustrate various aspects of symbol sets for natural languages. In FIG. 7A, a column of different forms of the eighth symbol in the symbol set shown in FIG. 6 is provided. The eighth symbol 702 of the symbol set shown in FIG. 6 is followed, in a column 704, by different forms of the symbol in different styles of text. In many natural languages, there may be many different text styles and alternative written forms for a given symbol.

FIG. 7B shows various different concepts related to symbols of a natural language. In FIG. 7B, a particular symbol of a natural language is represented by node 710 in graph 712. A particular symbol may have numerous different general written or printed forms. For OCR purposes, each of these different general forms constitutes a grapheme. In certain cases, a particular symbol may comprise two or more graphemes. For example, Chinese characters may comprise a combination of two or more graphemes, each of which occurs in additional characters. The Korean language is actually alphabetic, with Korean morpho-syllabic blocks containing a number of alphabetic characters in different positions. Thus, a Korean morpho-syllabic block may represent a higher-level symbol composed of multiple grapheme components. For symbol 710 shown in FIG. 7B, there are six different graphemes 714-719. There are, in addition, one or more different printed or written renderings of a grapheme, each rendering represented by a pattern. In FIG. 7B, graphemes 714 and 716 each has two alternative renderings represented by patterns 720 and 721 and 723-724, respectively. Graphemes 715 and 717-719 are each associated with a single pattern, patterns 722 and 725-727, respectively. For example, the eighth symbol of the example symbol set, shown in FIG. 6, may be associated with three graphemes, including one grapheme that encompasses renderings 702, 724, 725, and 726, a second grapheme that encompasses renderings 728 and 730, and a third grapheme that encompasses rendering 732. In this case, the first grapheme has straight horizontal members, the second grapheme has horizontal members with right-hand, short vertical members, and the third grapheme includes curved, rather than straight, features. Alternatively, all of the renderings of the eighth symbol 702, 728, 724, 732, 725, 726, and 730 may be represented as patterns associated with a single grapheme for the eighth symbol. To a certain extent, the choice of graphemes is somewhat arbitrary. In certain types of character-based languages, there may be many thousands of different graphemes. Patterns can be thought of as alternative renderings or images, and may be represented by a set of parameter/parameter-value pairs, as discussed below.

Figure 7C:
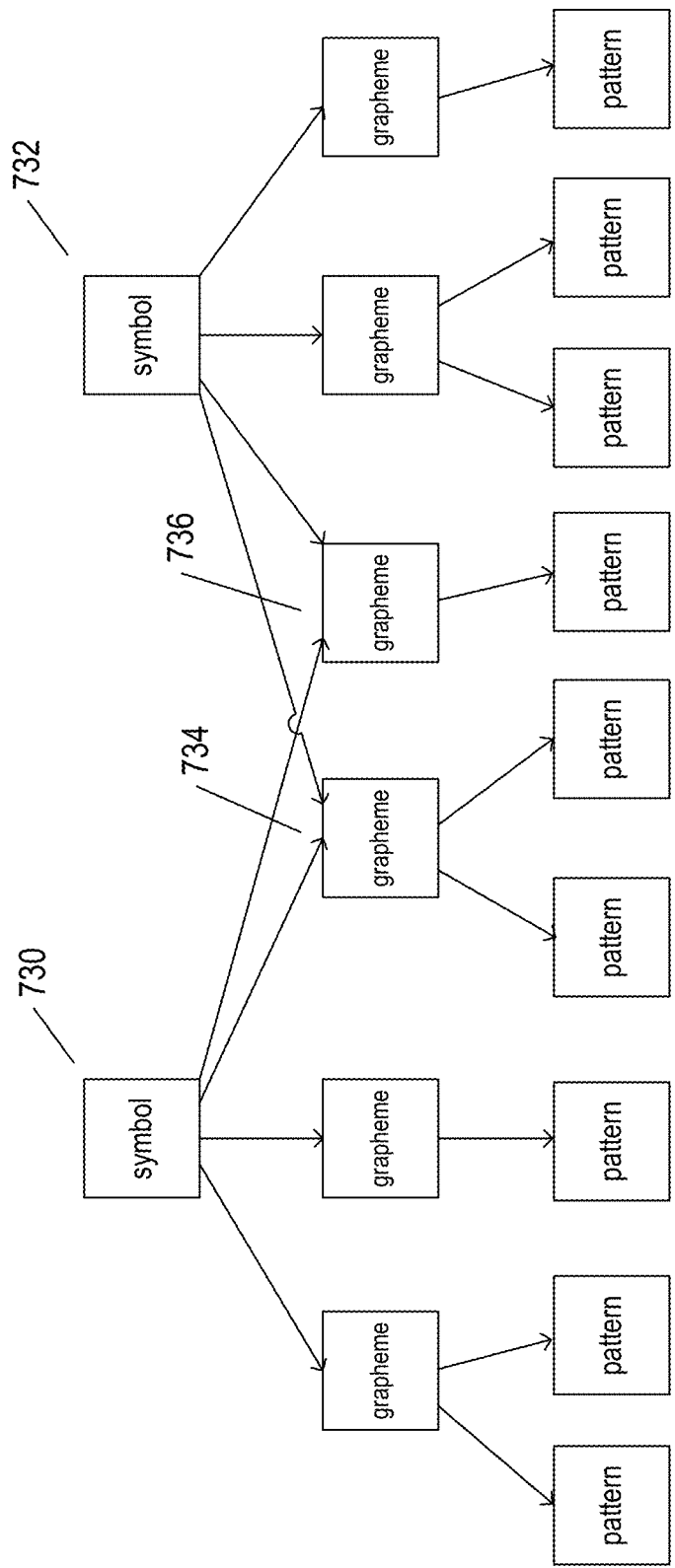
FIG. 7C illustrates various aspects of symbol sets for natural languages.

In fact, although the relationships between symbols, graphemes, and patterns is shown, in FIG. 7B, as being strictly hierarchical, with each grapheme related to a single, particular parent symbol, the actual relationships may not be so simply structured. FIG. 7C illustrates a slightly more complex set of relationships, in which two symbols 730 and 732 are both parents of two different graphemes 734 and 736. As one example, the English-language symbols "o," the lower-case letter, "O," the upper-case letter, "0," the digit zero, and "°", the symbol for degree, may all be associated with a circle-like grapheme. The relationships might alternatively be represented as graphs or networks. In certain cases, graphemes, rather than, or in addition to, symbols might be shown at the highest levels within the representation. In essence, there is a significant degree of arbitrariness in the symbols, graphemes, and patterns identified for a particular language and the relationships between them.

Figure 8A:
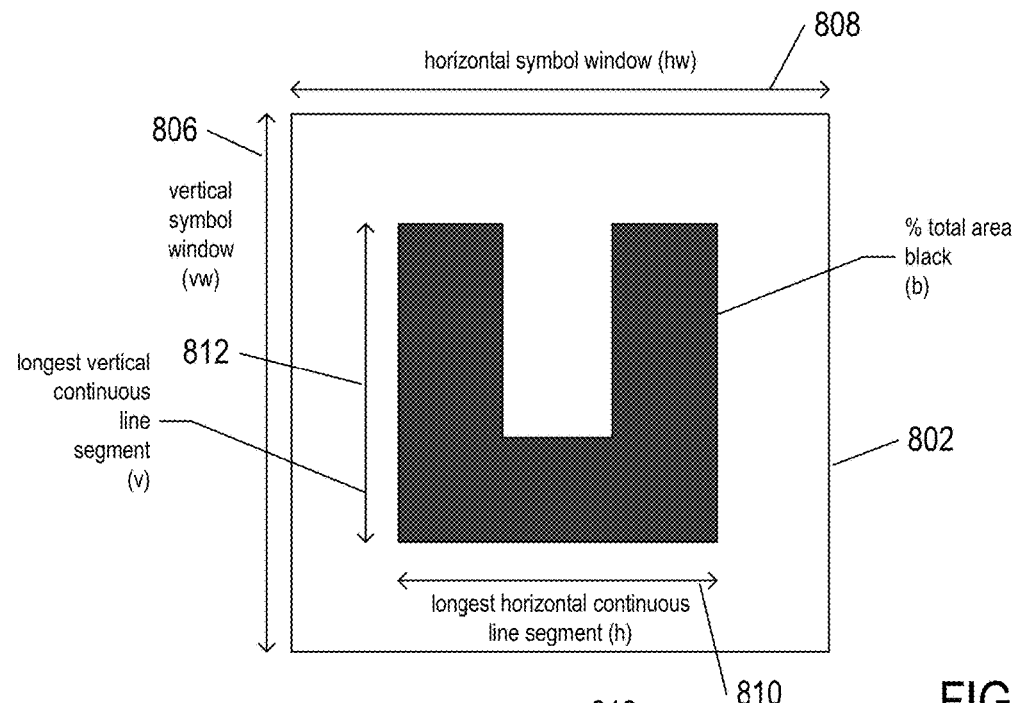
FIG. 8A illustrates parameters and parameter values computed with respect to symbol images.
Figure 8B:
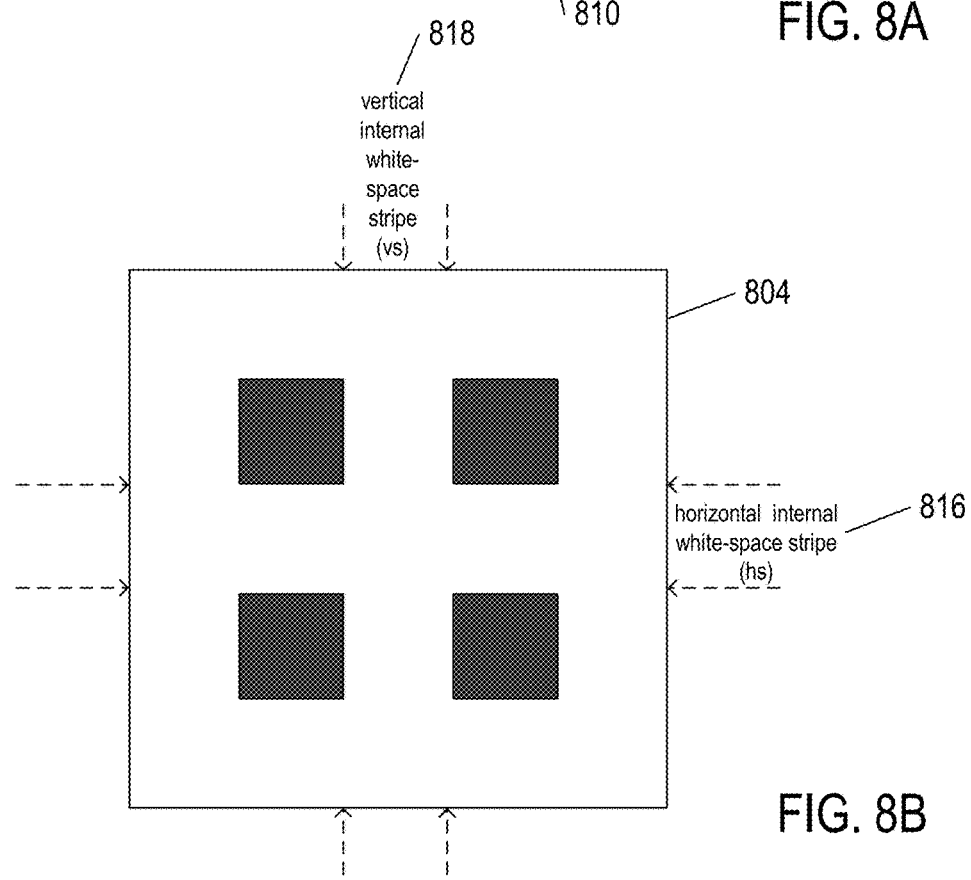
FIG. 8B illustrates parameters and parameter values computed with respect to symbol images.

FIGS. 8A-B illustrate parameters and parameter values computed with respect to symbol images. Note that the phrase "symbol image" may describe a printed, written, or displayed rendering of a symbol or grapheme. In the following example, parameters and parameter values are discussed with respect to images of symbols, but, in an actual real-language context, the parameters and parameter values are often used to characterize and represent images of graphemes. FIG. 8A shows a rectangular symbol image 802 extracted from a text-containing image that includes an image of the 22$^{nd}$ symbol in the example symbol set shown in FIG. 6. FIG. 8B includes a rectangular symbol image 804 extracted from the text-containing image corresponding to the 48$^{th}$ symbol in the example symbol set shown in FIG. 6. In printing and writing of the hypothetical language corresponding to the example symbol set, the symbols are centered within rectangular symbol areas. When this is not the case, initial processing steps carried out by OCR systems may reorient, rescale, and reposition extracted symbol images with respect to a background area in order to normalize extracted symbol images for subsequent processing steps.

FIG. 8A illustrates three different parameters that may be used by an OCR system to characterize symbols. Note that the area of the symbol image, or symbol window, is characterized by a vertical symbol-window dimension 806, abbreviated "vw") and a horizontal symbol-window dimension 808, referred to as "hw." A first parameter is the longest horizontal continuous line segment within the symbol image, referred to as "h" 810. This is the longest sequence of contiguous dark pixels within the generally white-pixel background of the symbol window. A second parameter is the longest vertical continuous line segment 812 within the symbol image (v). A third parameter is the percentage of pixels in the symbol window corresponding to the symbol image, in the current case, the percentage of black pixels within the generally white symbol window (b). In all three cases, parameter values can be straightforwardly computed once a bitmap for the symbol window has been generated. FIG. 8B shows two additional parameters. The first parameter is the number of horizontal, internal white-space stripes within the symbol image, with the symbol represented by the symbol image shown in FIG. 8B having a single horizontal internal white-space stripe 816. A second parameter is the number of vertical internal white-space stripes within the symbol image. For the 48$^{th}$ symbol of the symbol set, represented by the image within the symbol window 804 shown in FIG. 8B, there is a single vertical internal white-space stripe 818. The number of horizontal white-space stripes is referred to as "hs" and the number of internal vertical white-space stripes is referred to as "vs."

FIG. 9 shows a table of parameter values computed for all of the symbols in the example symbol set shown in FIG. 6. In the table 902 shown in FIG. 9, calculated parameter values for a particular symbol are shown in each row of the table. The parameters include: (1) the longest horizontal continuous line segment relative to the symbol window, $$\frac{h}{hw},$$

904; (2) the longest vertical continuous line segment relative to the vertical symbol-window dimension, $$\frac{v}{vw},$$

906; (3) the percent total area corresponding to the symbol image, or black space, b, 908; (4) the number of internal vertical stripes, vs, 910; (5) the number of horizontal internal stripes, hs, 912; (6) the sum of the number of internal vertical stripes and horizontal stripes, vs+hs, 914; and (7) the ratio of the longest vertical line segment to the longest horizontal line segment, $$\frac{v}{h},$$

916. Thus, considering the first row 920 of table 902 in FIG. 9, the first symbol of the symbol set (606 in FIG. 6) is a vertical bar, and thus, as would be expected, the numeric value of $$\frac{v}{vw},$$

0.6, is significantly greater man the numeric value of $$\frac{h}{hw},$$

0.2. Symbol 606 represents only 12 percent of the entire symbol window 602. There are no internal horizontal or vertical white spaces within symbol 606, and thus vs, hs, and vs+hs are all 0. The ratio $$\frac{v}{h}$$

is 3. Because the example symbols are all relatively simple and block-like, there are relatively few different values for each of the parameters in table 902.

Despite the fact that each of the parameters discussed above with reference to FIG. 9 have only relatively few different parameters values with respect to the 48 example characters, only three of the parameters are sufficient to partition the example characters into 18 partitions, or clusters. FIG. 10 illustrates a three-dimensional plot of the symbols of the example set of symbols shown in FIG. 6 within a three-dimensional space, where the dimensions represent values of each of three different parameters. In FIG. 10, a first horizontal axis 1002 represents the parameter $$\frac{v}{h}$$

Figure 11A:
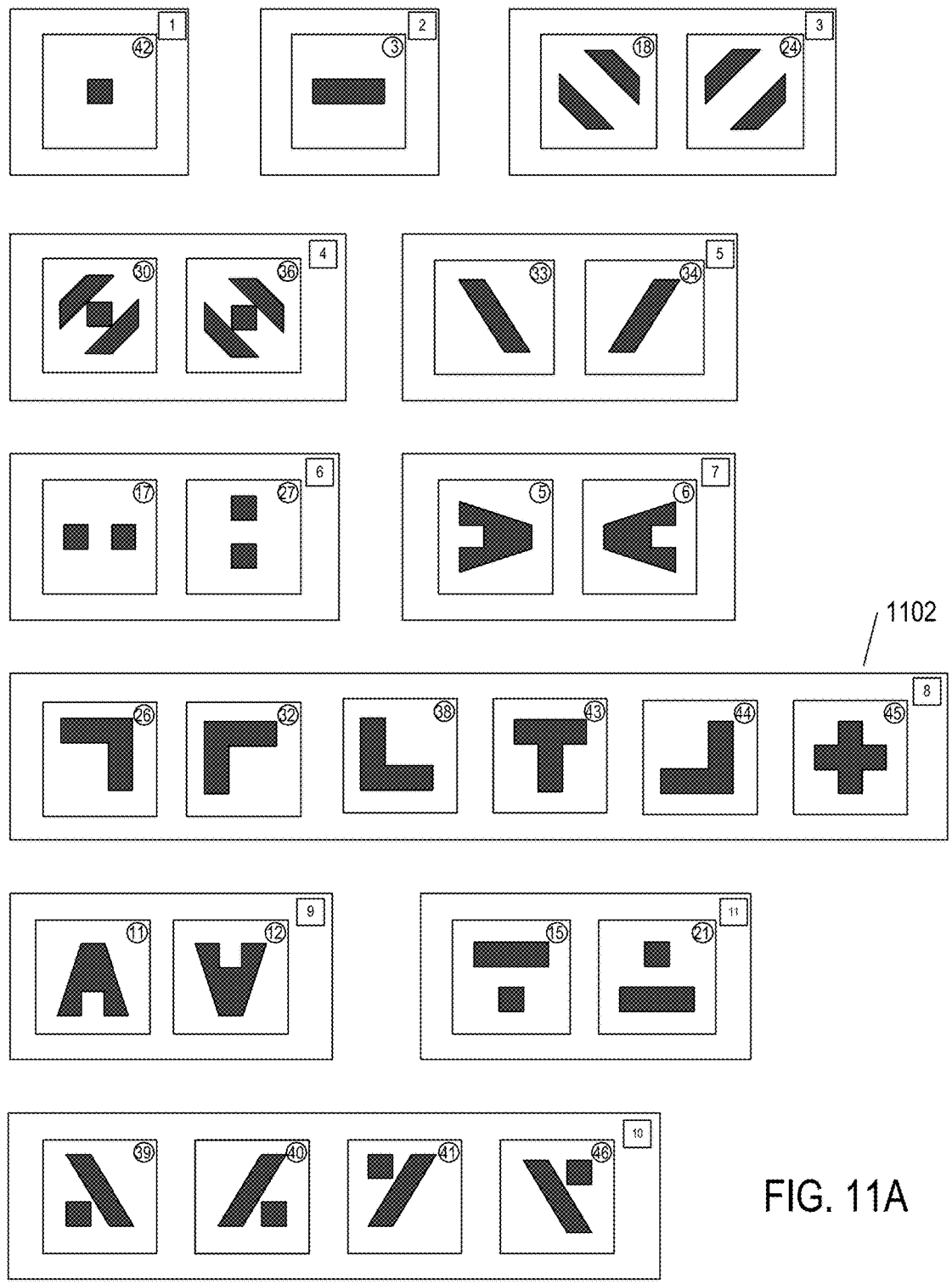
FIG. 11A shows the symbols contained in each of the clusters represented by points in the three-dimensional space shown in FIG. 10.
Figure 11B:
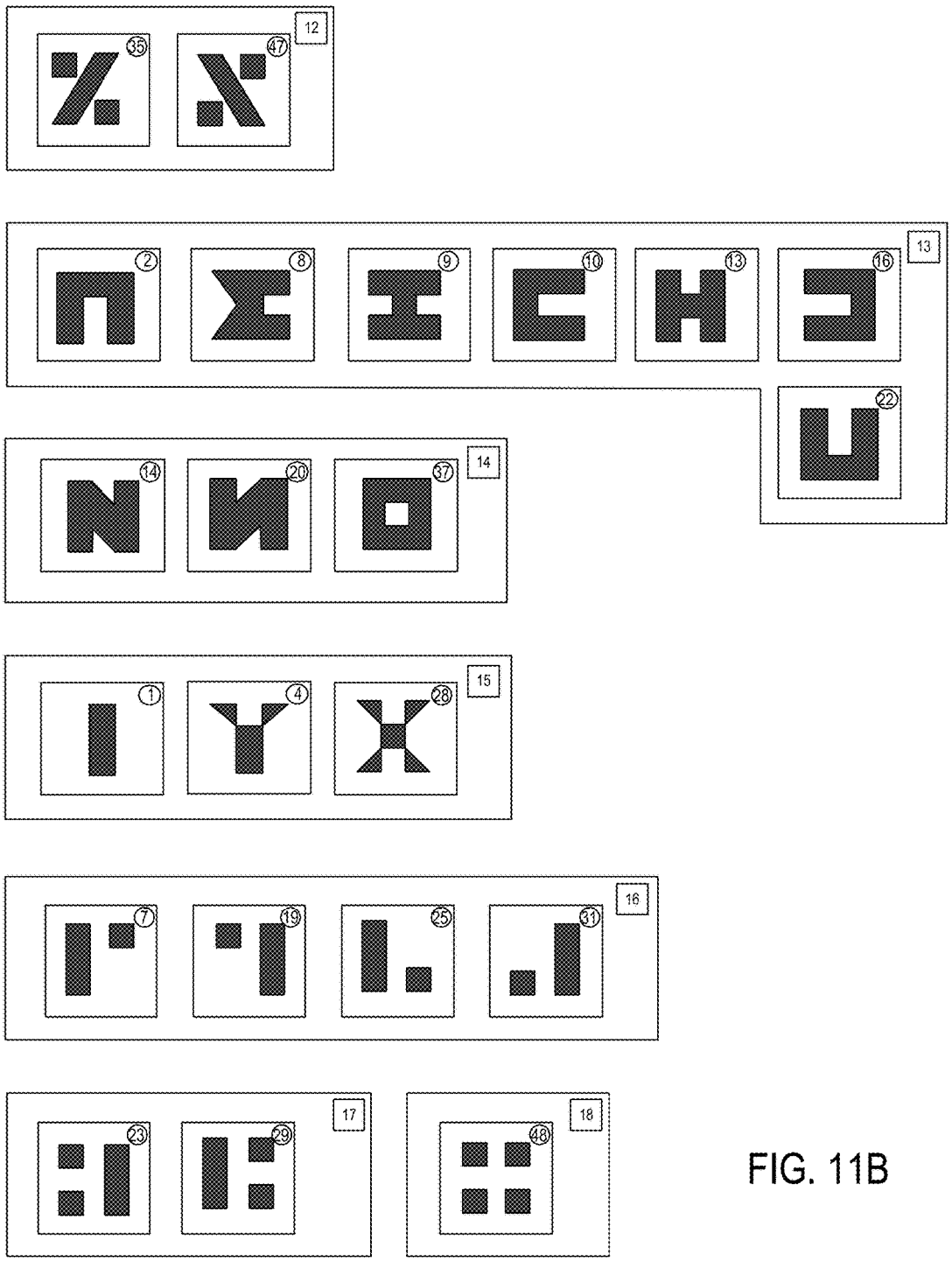
FIG. 11B shows the symbols contained in each of the clusters represented by points in the three-dimensional space shown in FIG. 10.

(916 in FIG. 9), a second horizontal axis 1004 represents the parameter vs+hs (914 in FIG. 9), and a third, vertical axis 1006 represents the parameter b (908 in FIG. 9). There are 18 different plotted points, such as plotted point 1008, each shown as a small darkened disk, with the vertical projection of the point down to the horizontal plane that includes axes 1002 and 1004 represented by a vertical dashed line, such as vertical dashed line 1010 connecting point 1008 to its projection on the horizontal plane 1012. The code or sequence number for the symbols that map to a particular point are shown within brackets to the right of the point. For example, symbols 14, 20, and 37 (1014) all map to point 1016 with coordinates (1, 0, 0.32) with respect to axes 1002, 1004, and 1006. Each point is associated with a partition or cluster number in a small rectangle to the left of the point. For example, point 1016 is associated with cluster number "14" 1018. FIGS. 11A-B show the symbols contained in each of the clusters represented by points in the three-dimensional space shown in FIG. 10. As can be readily observed from the symbol contents of these clusters, or partitions, the three parameters employed to distribute the symbols within the three-dimensional space shown in FIG. 10 are actually effective in partitioning the 48 example symbols into related sets of symbols.

Figure 12A:
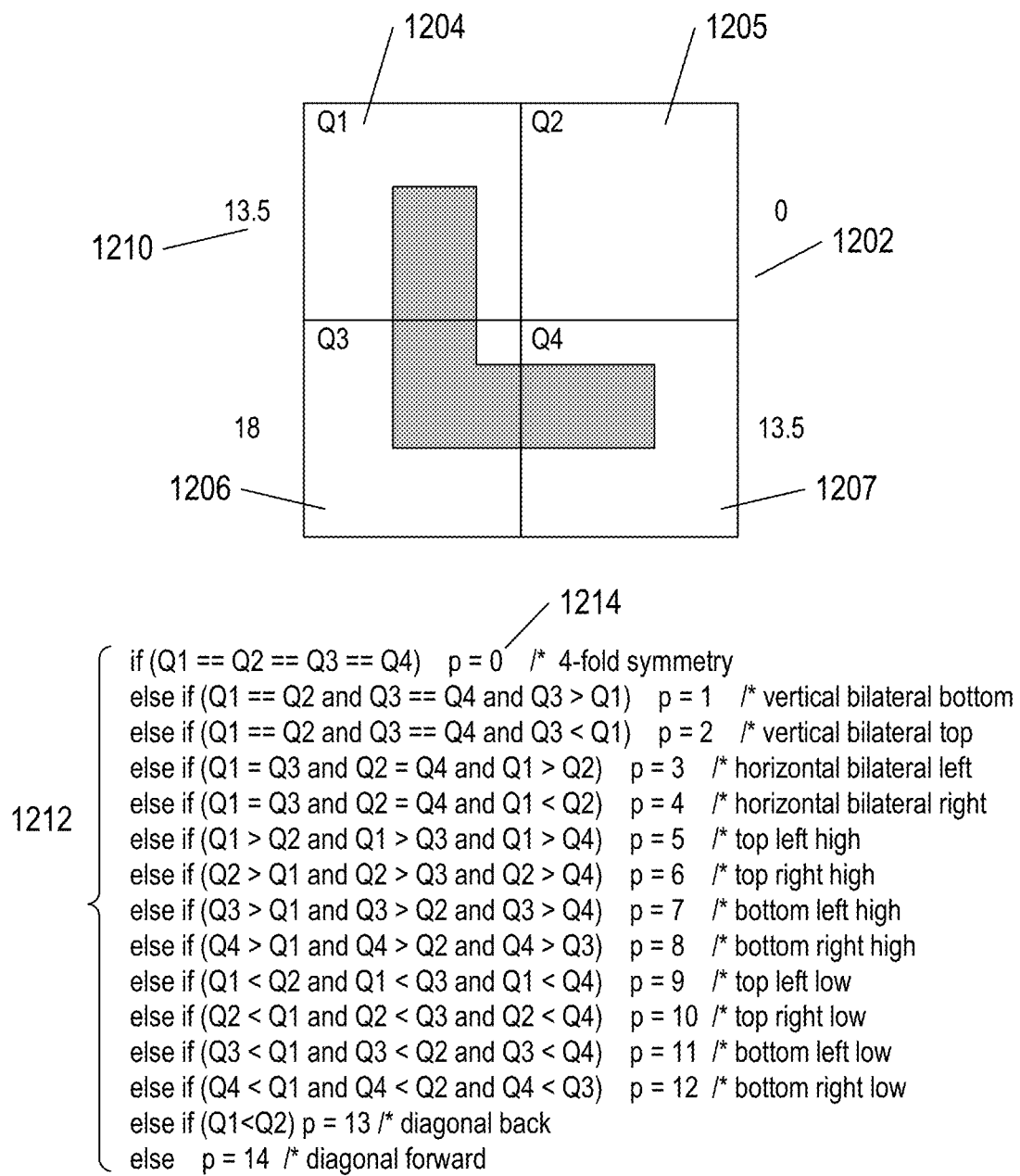
FIG. 12A illustrates a different parameter that can be used, in combination with the three parameters corresponding to dimensions in the three-dimensional parameter space shown in FIG. 10, to fully distinguish each of the symbols in cluster 8.
Figure 12B:
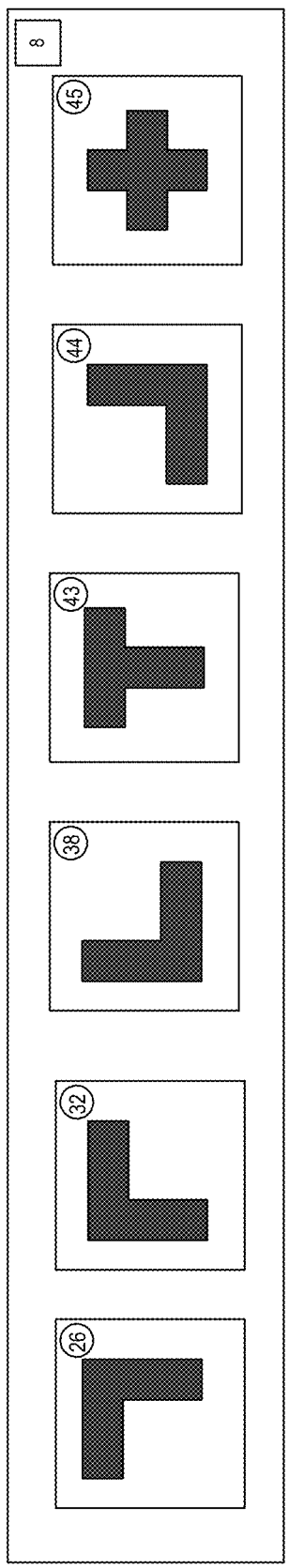
FIG. 12B illustrates the value of the additional parameter, discussed with reference to FIG. 12A, for each of the symbols in cluster 8.

Additional parameters can be used in order to uniquely distinguish each symbol within each cluster or partition. Consider, for example, cluster 8 (1102) shown in FIG. 11A. This cluster of symbols includes four angular, "L"-like symbols with four-fold rotational variations have symbol codes 26, 32, 38, and 44, as well as the "T"-like symbol with symbol code 43 and the cross-sign-like symbol with symbol code 45. FIG. 12A illustrates a different parameter that can be used, in combination with the three parameters corresponding to dimensions in the three-dimensional parameter space shown in FIG. 10, to fully distinguish each of the symbols in cluster 8. In the following, this parameter is referred to as p. As shown in the symbol window 1202 in FIG. 12A, the symbol window is divided into four quadrants Q1 1204, Q2 1205, Q3 1206, and Q4 1207. The number of units of area within the quadrant occupied by the symbol image is then computed and shown adjacent to the quadrant. For example, 13.5 units of area 1210 are occupied by the portion of the symbol image in quadrant Q1 1204. These values for the number of units of area within each quadrant are then assigned to the variables Q1, Q2, Q3, and Q4. Thus, in the example shown in FIG. 12A, the variable Q1 is assigned the value 13.5, the variable Q2 is assigned the value 0, the variable Q3 is assigned the value 18, and the variable Q4 is assigned the value 13.5. Then, the value for the new parameter p is computed according to the small pseudocode snippet 1212 shown in FIG. 12A below the symbol window. For example, when all four variables Q1, Q2, Q3, and Q4 have the same value, then the parameter p is assigned the value 0 (1214), indicating a four-fold symmetry in the symbol window with respect to the number of units of area occupied by the symbol image. FIG. 12B illustrates the value of the additional parameter, discussed with reference to FIG. 12A, for each of the symbols in cluster 8. As can be seen from the parameters values associated with the symbols in FIG. 12B, the new parameter, discussed above with reference to FIG. 12A, has a different value for each of the six symbols in cluster 8. In other words, a combination of the three parameters used to create the three-dimensional plot shown in FIG. 10 and the additional parameter discussed above with reference to FIG. 12A can be used together to uniquely identify all of the symbols in cluster 8.

Figure 13A:
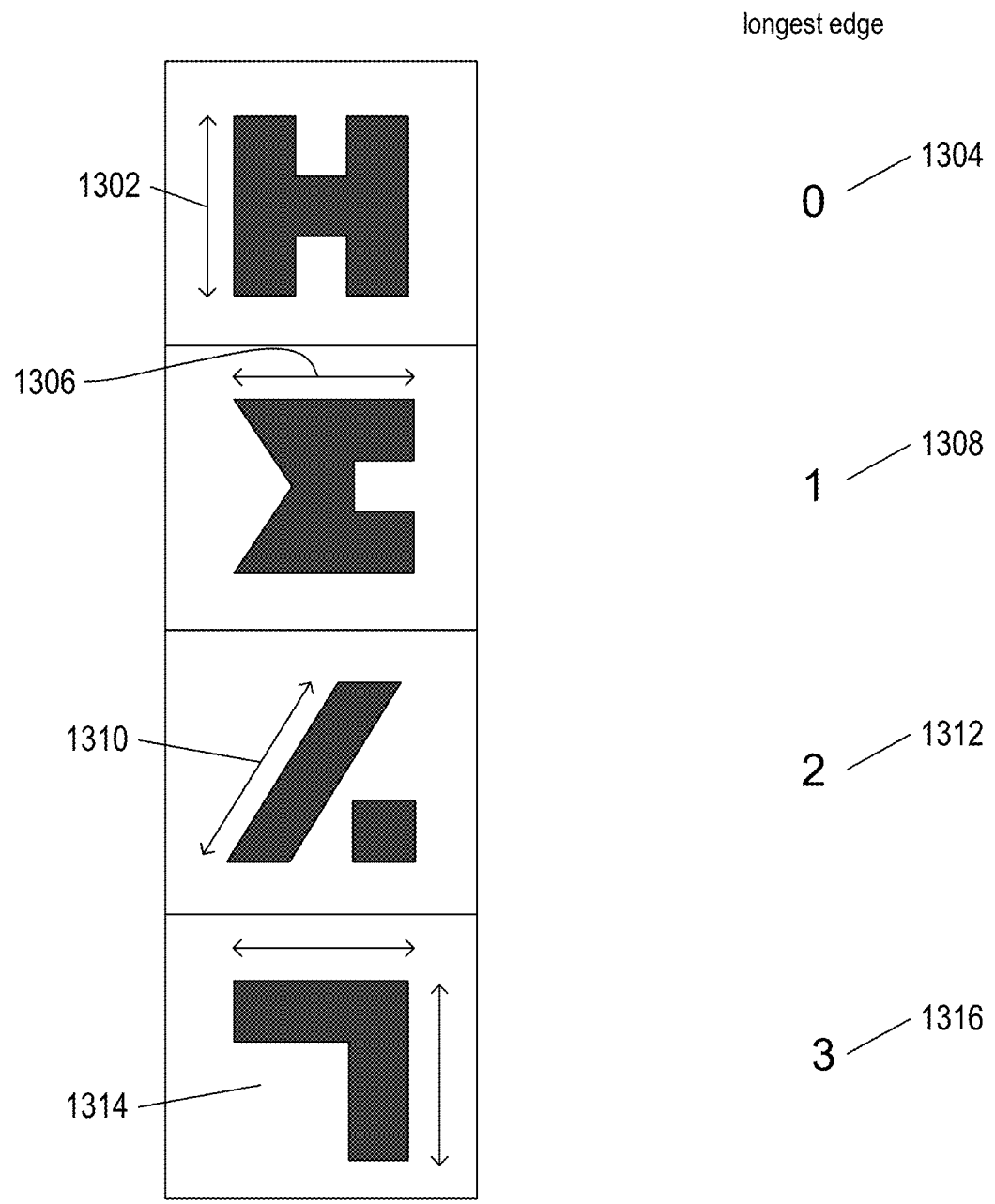
FIG. 13A illustrates an additional parameter used for characterizing symbol images.

FIG. 13A illustrates an additional parameter used for characterizing symbol images. The additional parameter is referred to, below, as the "longest edge" parameter. This parameter indicates the direction of the longest edge of the symbol image. When the longest edge is a vertical edge 1302, the longest-edge parameter has the value "0" 1304. When the longest edge of the symbol is horizontal 1306, the longest-edge parameter has the numeric value "1" 1308. When the longest edge of the symbol is diagonal 1310, the longest-edge parameter has the numeric value "2" 1312. And, finally, when there is no longest vertical, horizontal, or diagonal edge, as in the case of the symbol shown in cell 1314 in FIG. 13A, then the longest-edge parameter has the numeric value "3" 1316.

FIG. 13B illustrates the full set of parameter values for the hypothetical symbol set shown in FIG. 6. The table shown in FIG. 13B is identical to the table 902, previously shown in FIG. 9, with the exception of the final two columns 1320 and 1322, which include values for the parameter p discussed above with reference to FIG. 12A and the longest-edge parameter, discussed above with reference to FIG. 13A.

Figure 14A:
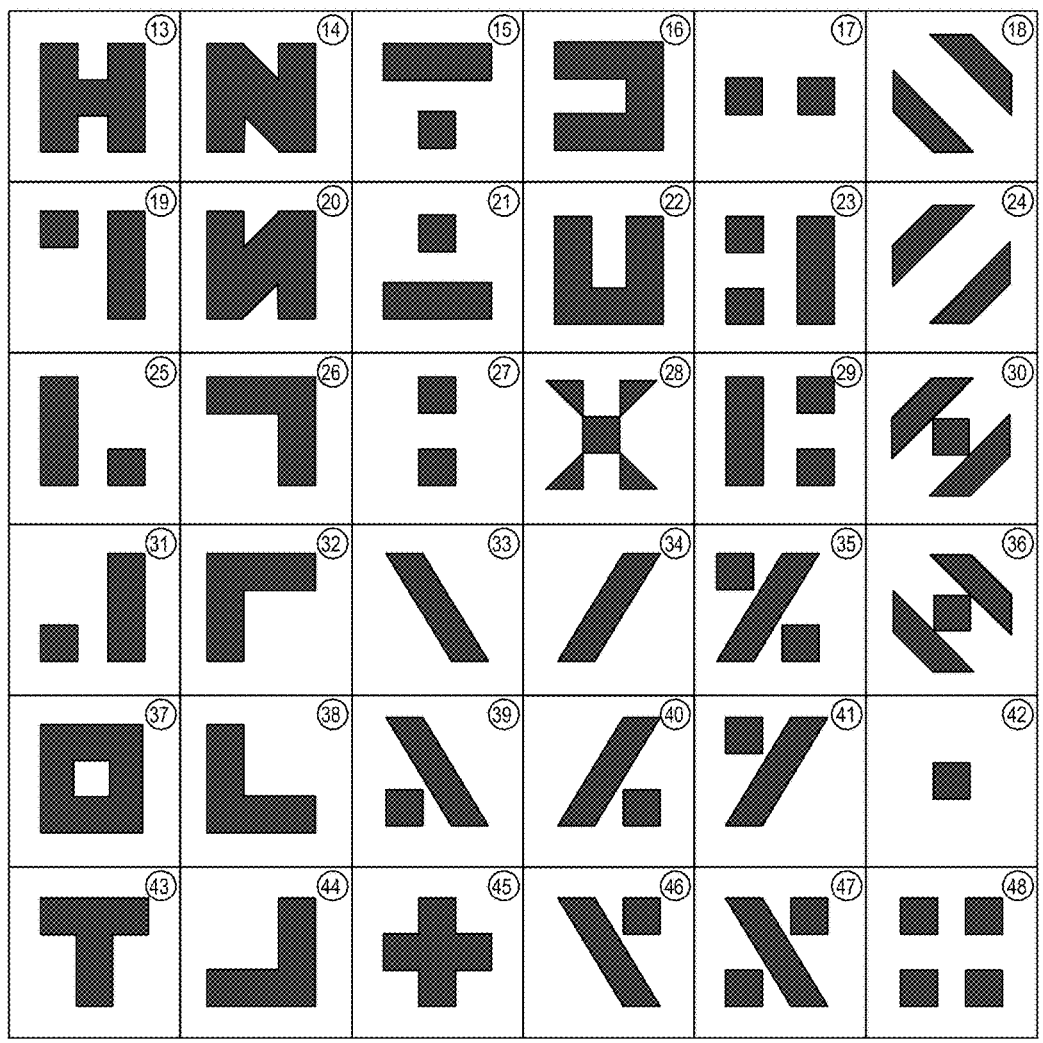
FIG. 14A illustrates construction of four decision trees from four subsets of the hypothetical symbol set shown in FIG. 6.

FIGS. 14A-17C illustrate construction of four decision trees from four subsets of the hypothetical symbol set shown in FIG. 6. FIG. 14A shows 36 symbols selected from the 48 symbols of the hypothetical symbol set shown in FIG. 6. This first subset of symbols is then used to generate a decision tree that can be used to classify an input symbol as best matching a particular one of the symbols of the subset of symbols shown in FIG. 14A. FIG. 14B shows the table of parameter values for the 36 symbols in the subset of symbols shown in FIG. 14A. These parameter values are used to construct the decision tree. FIG. 14C shows a decision tree created for the subset of symbols shown in FIG. 14A based on the parameter values for the symbols shown in FIG. 14B. Note that the parameter value shown in FIG. 14B is a subset of the complete table of parameter values shown in FIG. 13B.

Figure 14C:
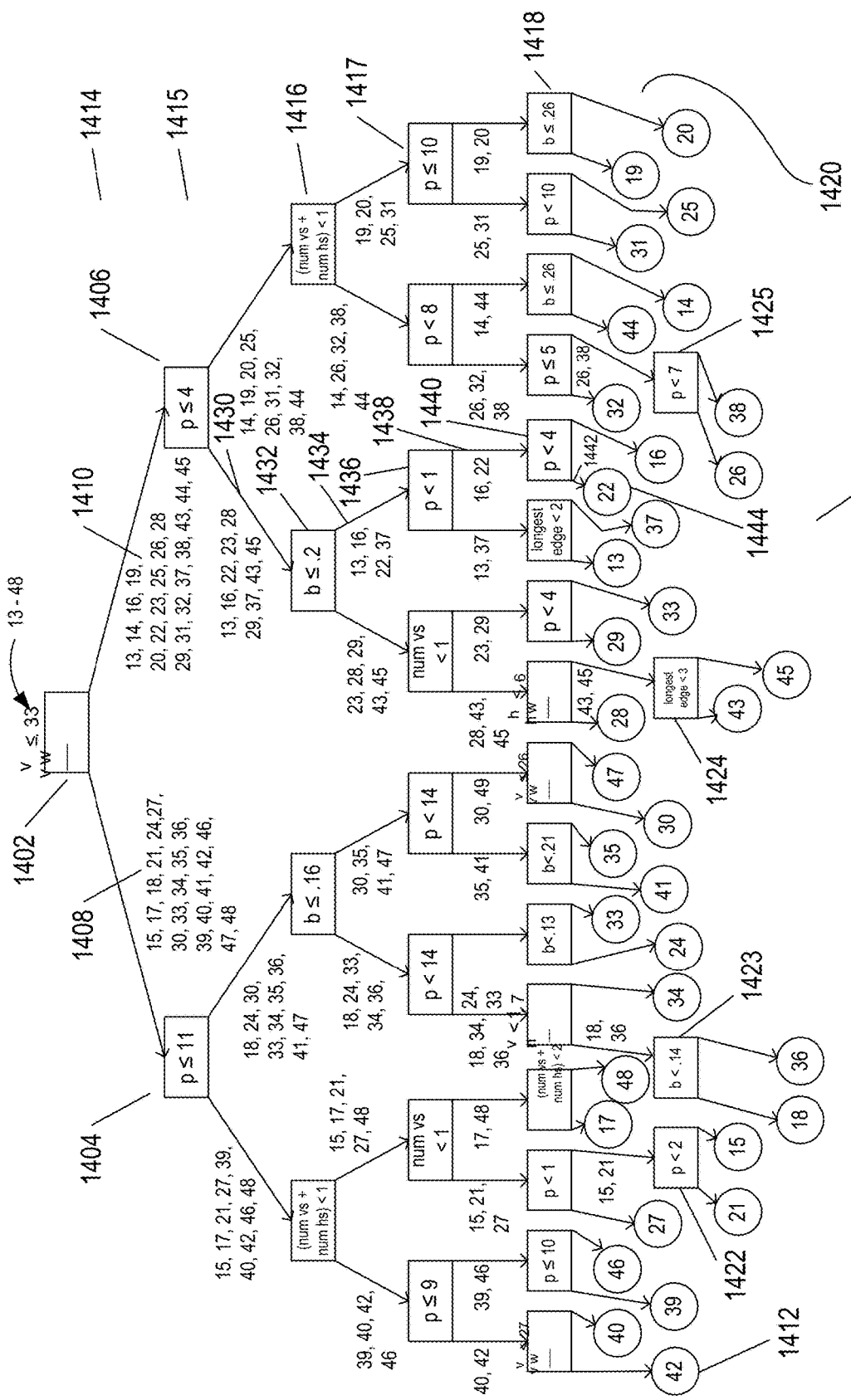
FIG. 14C illustrates construction of four decision trees from four subsets of the hypothetical symbol set shown in FIG. 6.

There are many different types of decision trees. The decision trees created in the example of FIGS. 14A-17C are binary decision trees. Each node of the decision tree, such as node 1402 in FIG. 14C, represents a decision or test that allows one to select which of two lower-level nodes 1404 and 1406 to navigate to in a traversal of the decision tree based on a set of parameter values computed for a symbol image. The decision tree is created using the symbol subset shown in FIG. 14A as well as the parameter value shown in FIG. 14B. In a first step in creating the decision tree, the various parameter values for each of the nine parameters computed for each symbol image in the symbol-image subset are considered to identify a particular parameter and numerical threshold value for the parameter that most evenly divides the subset of symbol images into two partitions. In the case of the symbol subset shown in FIG. 14A, the parameter $$\frac{v}{vw}$$

is a suitable parameter for the first test represented by node 1402, the root node of the decision tree. Using a threshold numerical value of 0.33, a test of the numeric value for a particular symbol image from the subset of symbol images as being less than or equal to the threshold value 0.33 partitions the 36 symbol images of the symbol subset into a first partition of 18 symbols 1408 and a second partition of 18 symbols 1410. At each stage of decision-tree construction, a parameter-based test is sought that most evenly divides the set of symbols input to a node into two output partitions. This process is carried out recursively, node-bynode and level-by-level, in order to construct the entire decision tree 1400. The root node 1402 represents the first level of the decision tree. The second level of the decision tree includes nodes 1404 and 1406. Both of these nodes include a test based on the parameter p described with reference to FIG. 12A. In the case of node 1404, the threshold value for the test is 11 and, in the case of node 1406, the threshold value is 4. The leaf nodes of the tree are shown as circled numbers, such as leaf node 1412 in FIG. 14C. The leaf nodes represent individual symbols from the subset of symbols used to create the decision tree. There are 36 leaf nodes corresponding to the 36 symbols in the symbol subset shown in FIG. 14A.

Again, there are many different types of decision trees and methods for constructing decision trees. In the current example, each node includes a simple test that compares the value of a parameter to a threshold value. In other types of decision trees, the tests may be more complex and involve multiple parameters. In certain types of decision trees, parameters used for tests are selected from random parameter subsets in order to introduce randomness with respect to a series of decision trees created for characterizing a particular set of symbols or other objects. The selection of parameters and threshold values may be used to minimize or maximize some objective function, including objective functions based on the information-theory concepts of entropy and information gain. As further discussed below, multiple decision trees created for a particular set of symbol images or other objects, with a different subset of the objects used for creating each of the multiple decision trees, may together constitute a decision forest that often provides more robust and accurate classification. Considerable research and development efforts have been devoted to the topics of decision trees, decision forests, and random decision forests and have produced detailed characterizations and elaborations of the concept of decision trees and decision forests as well as their application to particular types of problem domains. While simple binary decision trees are used in the current example, any of a wide variety of different types of decision trees and decision forests may be used for symbol-image processing by OCR systems according to the current document.

Figure 15A:
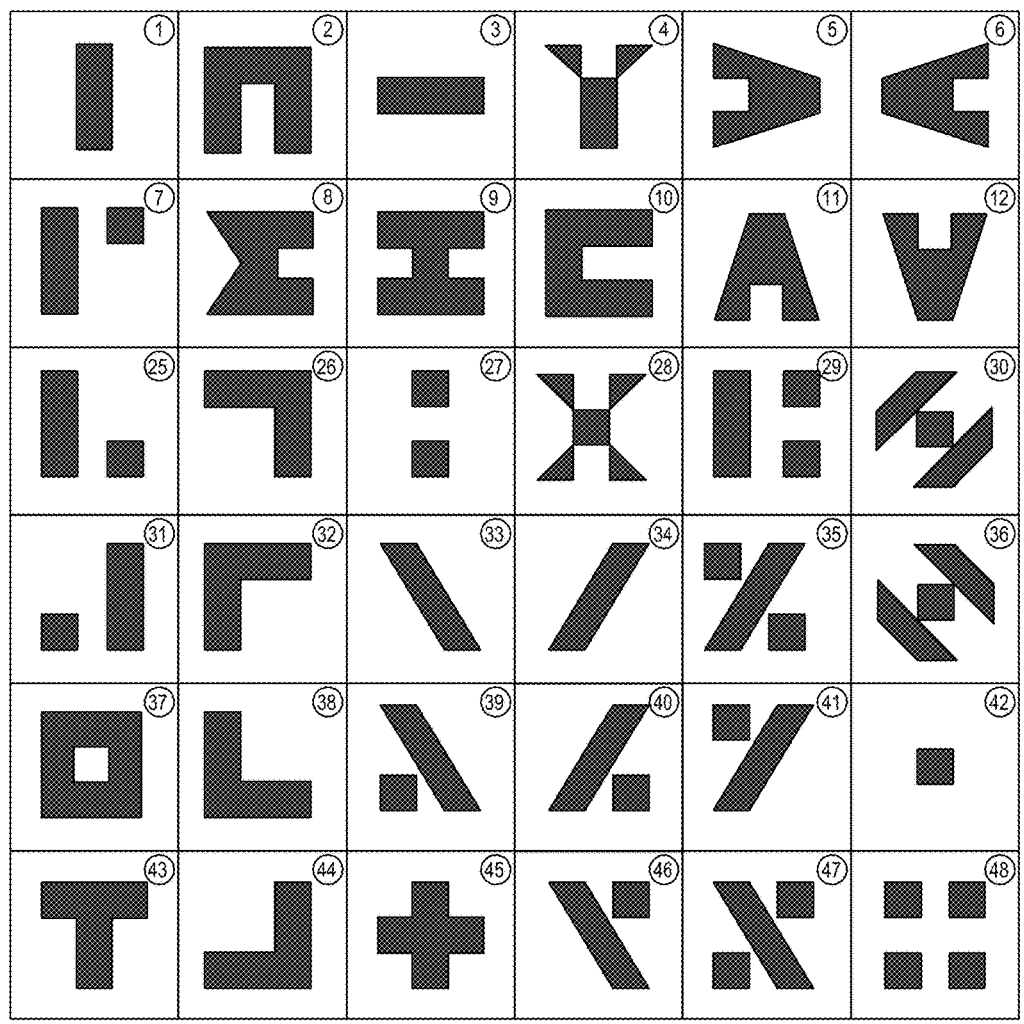
FIG. 15A illustrates construction of four decision trees from four subsets of the hypothetical symbol set shown in FIG. 6.
Figure 15C:
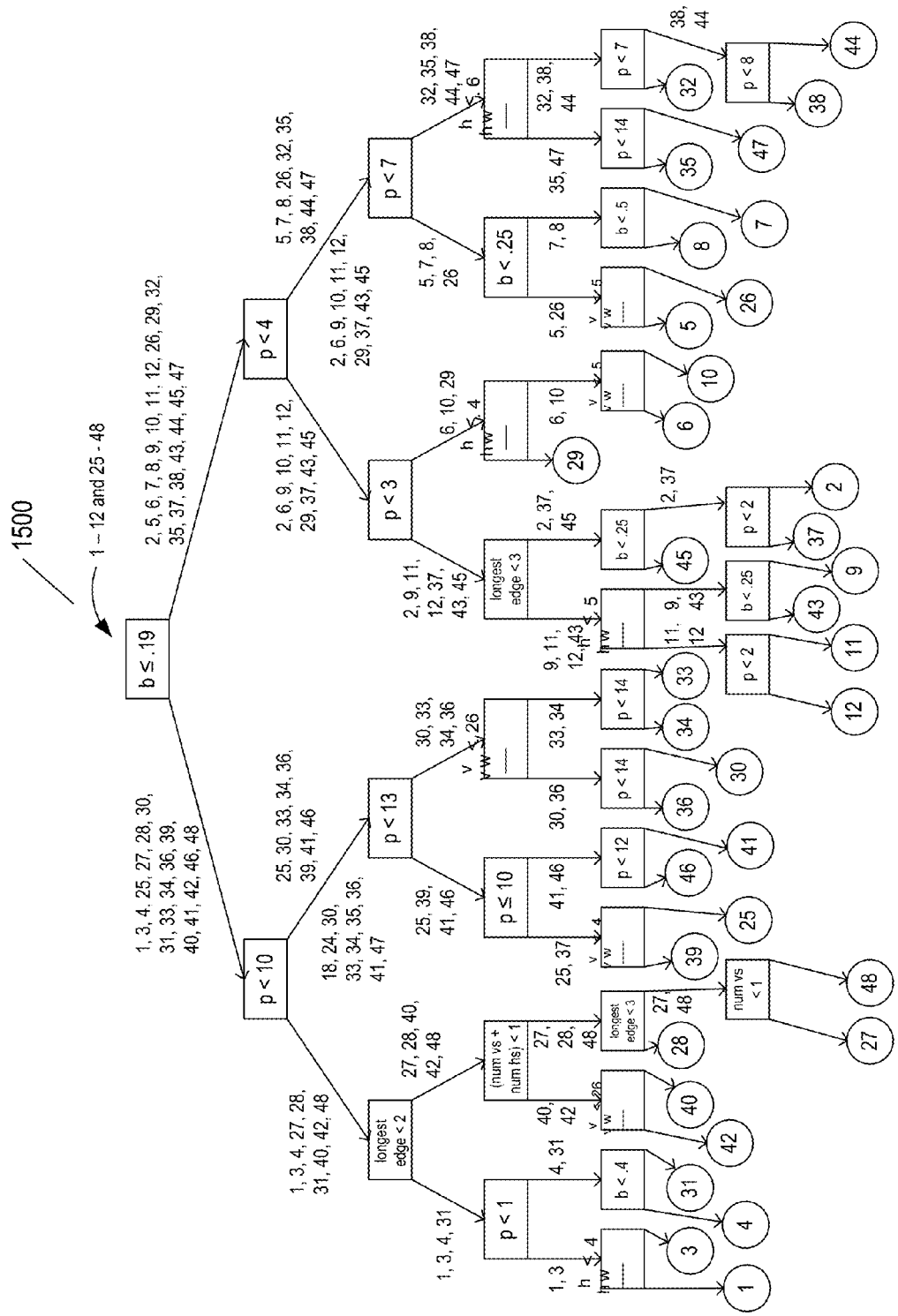
FIG. 15C illustrates construction of four decision trees from four subsets of the hypothetical symbol set shown in FIG. 6.
Figure 16A:
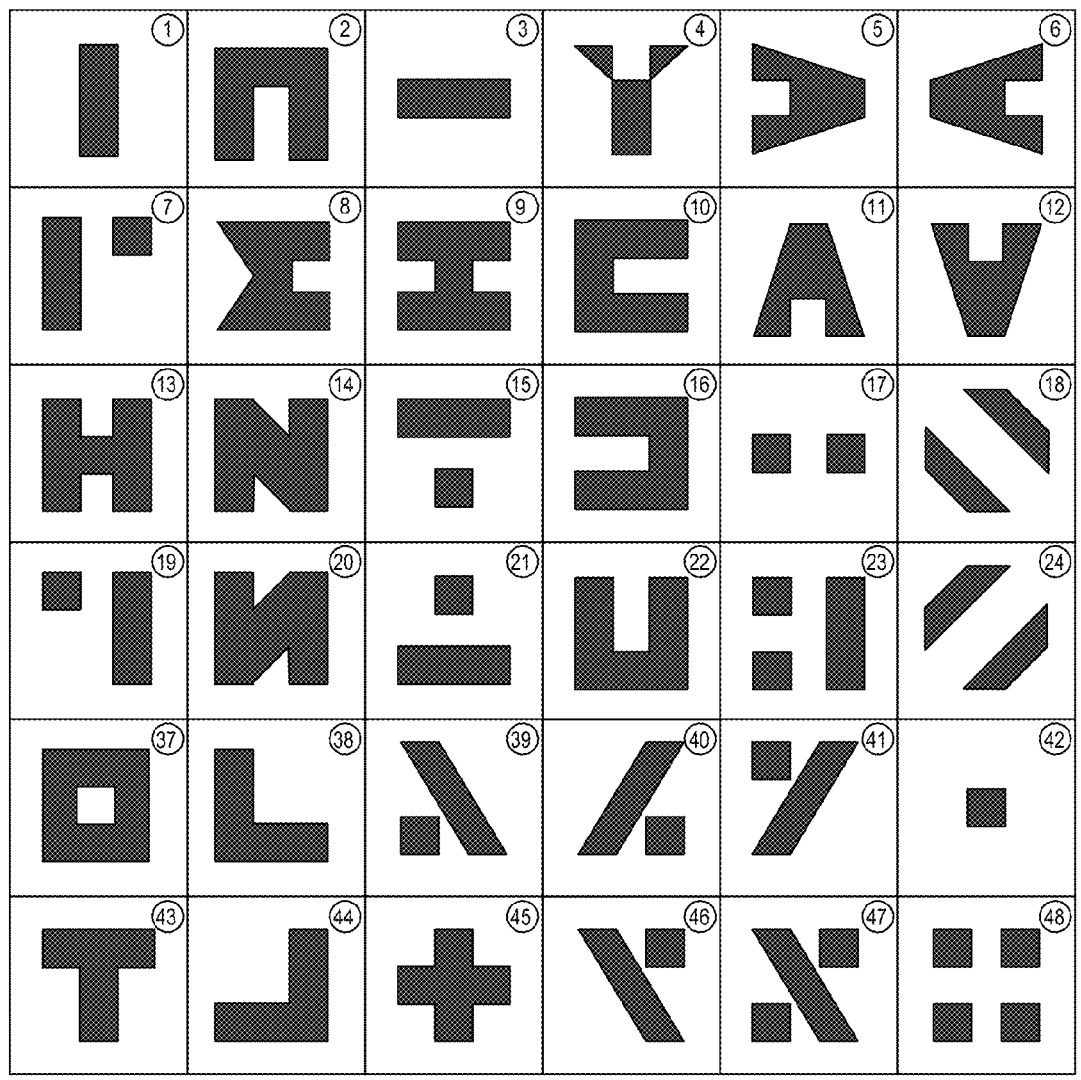
FIG. 16A illustrates construction of four decision trees from four subsets of the hypothetical symbol set shown in FIG. 6.
Figure 16C:
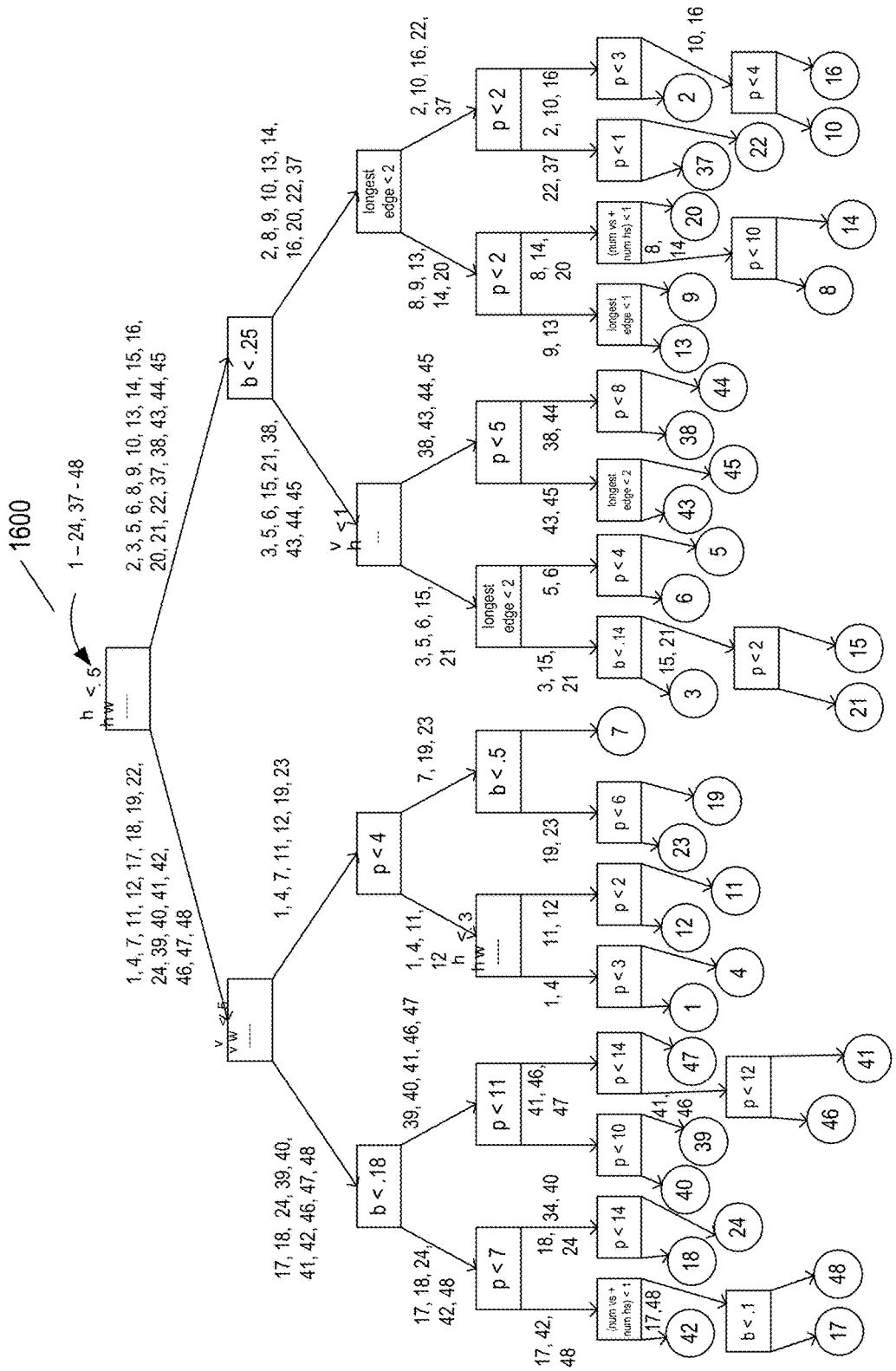
FIG. 16C illustrates construction of four decision trees from four subsets of the hypothetical symbol set shown in FIG. 6.
Figure 17A:
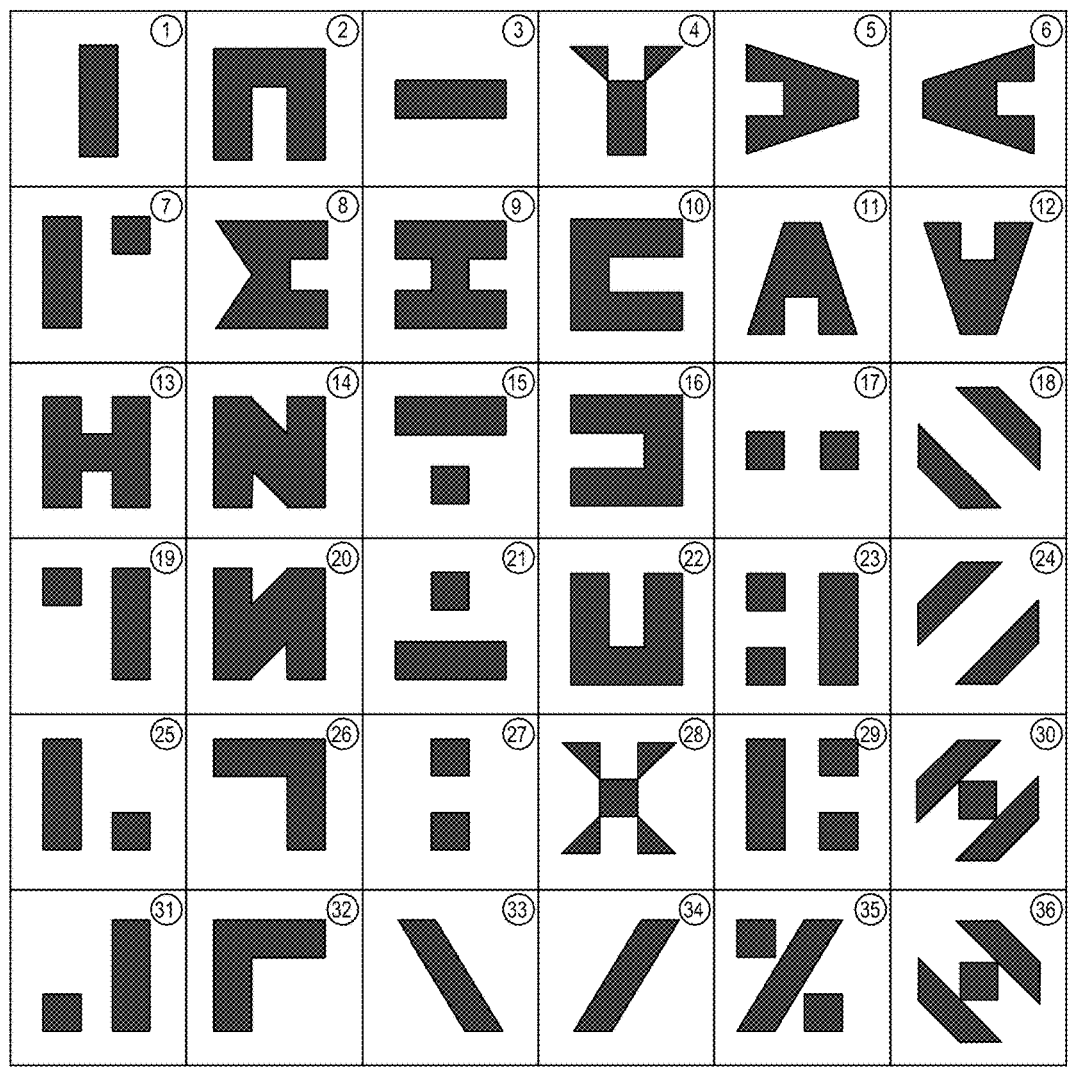
FIG. 17A illustrates construction of four decision trees from four subsets of the hypothetical symbol set shown in FIG. 6.
Figure 17C:
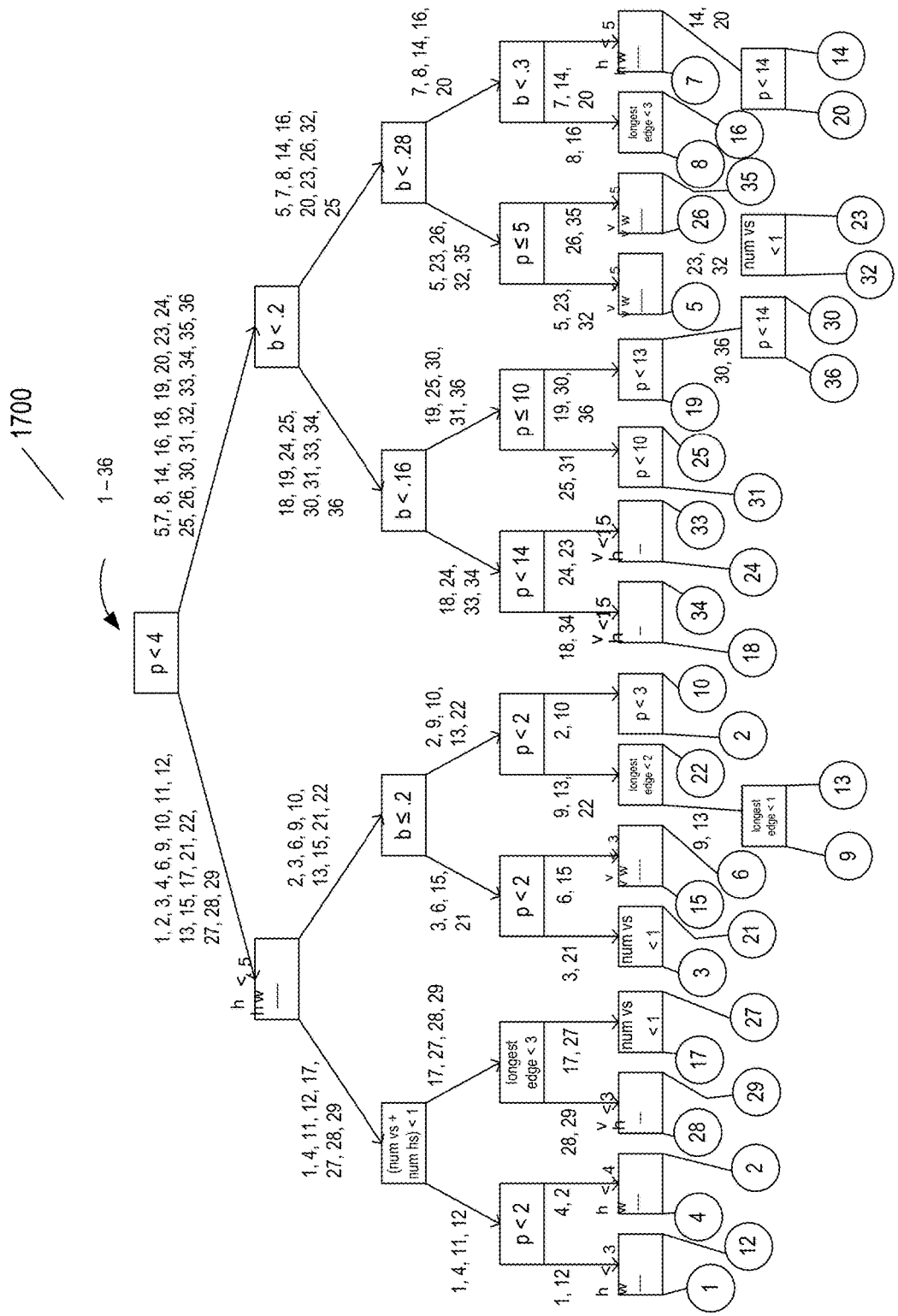
FIG. 17C illustrates construction of four decision trees from four subsets of the hypothetical symbol set shown in FIG. 6.

In FIG. 14C, the decision tree 1400 has five full levels of nodes 1414-1418. Most of the nodes at the sixth level 1420 are leaf nodes but, in certain cases, there are additional internal, decision nodes 1422-1425 at the sixth level, and these produce pairs of leaf nodes at the seventh level. As further discussed below, one can classify an arbitrary symbol image as corresponding to one of the 36 symbols in the symbol set shown in FIG. 14A by computing the numeric parameter values for the symbol image and then traversing the tree, from the root node to a leaf node, using those parameter values and the tests included in each node. FIGS. 15A-C illustrate the construction of a second decision tree 1500 from a second set of 36 symbols, shown in FIG. 15A, selected from the 48 symbols of the hypothetical symbol set shown in FIG. 6. Similarly, FIGS. 16A-C show construction of a third decision tree 1600 from a third subset of symbols selected from the 48 symbols of the hypothetical symbol set shown in FIG. 6. Finally, FIGS. 17A-C illustrate construction of a fourth decision tree 1700 from a fourth subset of symbols selected from the set of 48 hypothetical symbols shown in FIG. 6. In this example, each of the four decision trees 1400, 1500, 1600, and 1700 is constructed from a different subset of 36 symbols selected from the 48 symbols of the hypothetical symbol set shown in FIG. 6. This is, however, a somewhat artificial example. In general, when a forest of decision trees is constructed from a training set, some relatively large fraction of the objects in the training set is randomly selected, each time, with replacement, in order to construct each decision tree. In the case that 90% of the objects are randomly selected for construction of each tree, it would be expected that the average overlap of training objects used to construct any particular pair of trees would be greater than 90%, since the random selection of objects is made from the entire set of objects, each time. Nonetheless, the current example provides a simple illustration of the construction and operation of a decision forest.

Figure 18A:
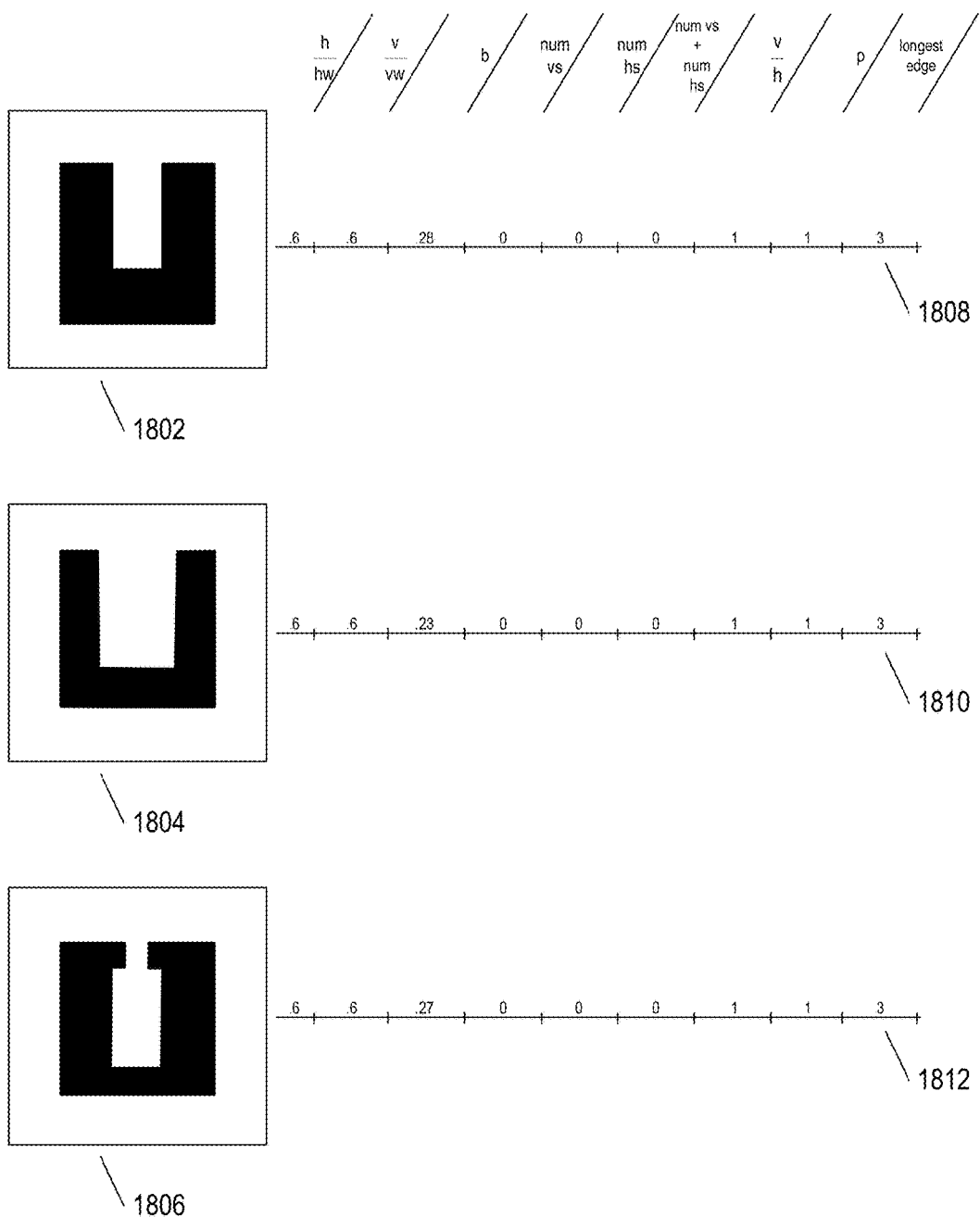
FIG. 18A illustrates classification of symbol images by a decision forest.
Figure 18B:
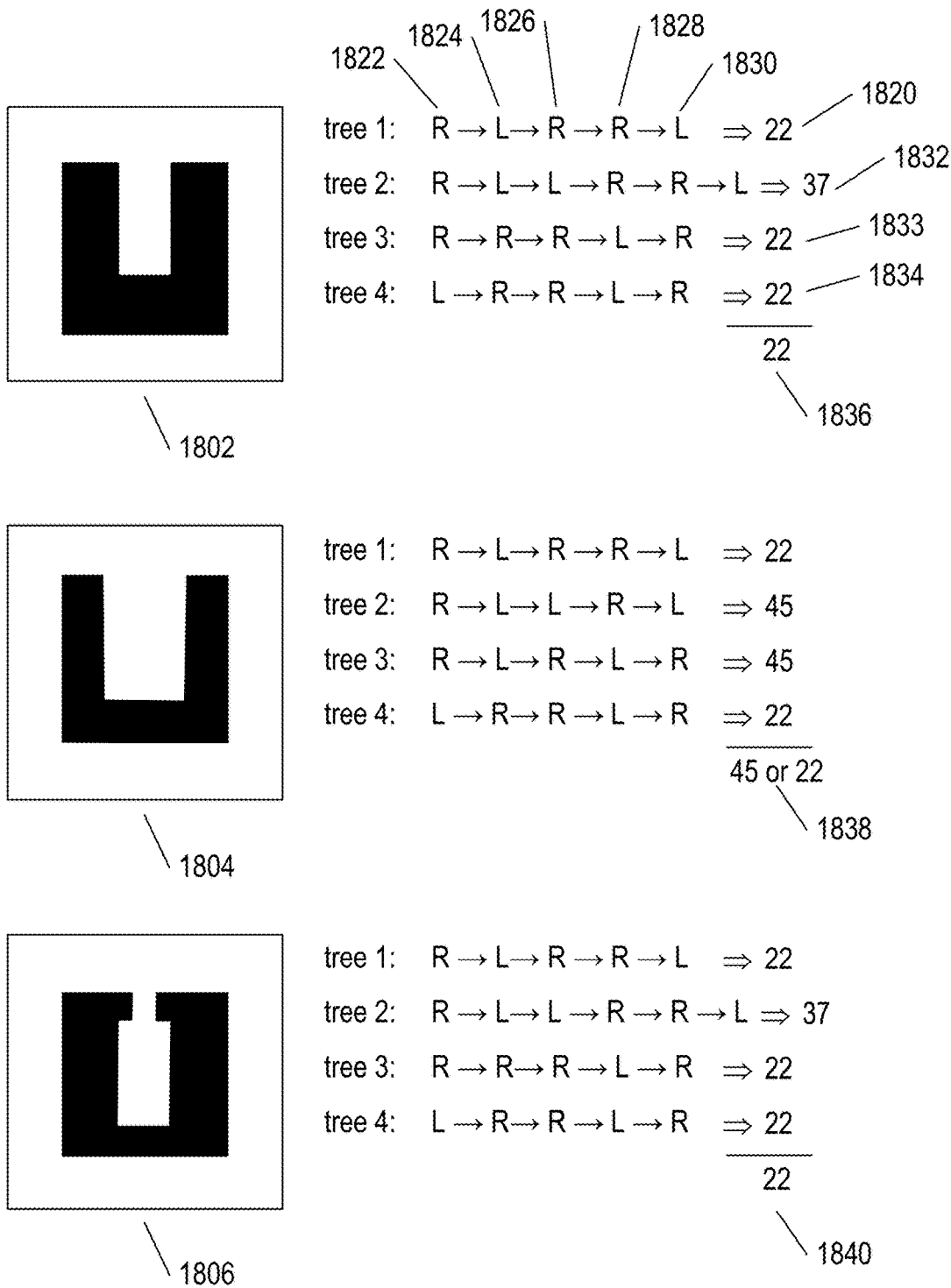
FIG. 18B illustrates classification of symbol images by a decision forest.

FIGS. 18A-B illustrate classification of symbol images by a decision forest. FIG. 18A shows three symbol images 1802, 1804, and 1806 along with the numerical values computed from these symbol images for the nine above-discussed parameters 1808, 1810, and 1812, respectively. Symbol image 1802 is an exact match of the symbol image for symbol 22 of the set of hypothetical symbols shown in FIG. 6. Thus, the parameters 1808 computed for this symbol image are identical to the parameters shown in row 1319 of FIG. 13B. Symbol image 1804 is similar to symbol image 1802, but the relative widths of the segments has been decreased, producing a somewhat thinner symbol. Symbol image 1806 is a thinner horizontal segment as well as having two inward-facing extensions at the tops of the vertical stems of the symbol. The parameter values 1810 computed for symbol image 1804 and the parameter values 1812 computed for symbol image 1806 do not correspond to any of the parameter values shown in FIG. 13B, since symbol images 1804 and 1806 do not correspond to any of the images for the symbols of the hypothetical symbol set shown in FIG. 6.

FIG. 18B illustrates use of the small decision forest comprising decision trees 1400, 1500, 1600, and 1700 shown in FIGS. 14C, 15C, 16C, and 17C, respectively. Each line of text to the right of the symbol images in FIG. 18B represents traversal of one of the four decision trees. For example, text line 1820 in FIG. 18B represents traversal of decision tree 1400 in FIG. 14C, referred to as "tree 1," using the parameters 1808 computed for symbol image 1802. The first or root node (1402 in FIG. 14C) of decision tree 1400 includes the test:

$$\frac{v}{vw} \leq .33.$$

The computed value of $$\frac{v}{vw}$$

for symbol image 1802 is shown, in FIG. 18A, as 0.6. The value 0.6 is not less than or equal to 0.33, and thus the test represented by node 1402 results in traversal to node 1406, to the right, as represented by the letter "R" 1822 and text line 1820. Node 1406 includes the test: p≤4. The computed value for parameter p for symbol image 1802 is shown in FIG. 18A as 1. Thus, in the case of node 1406, the test succeeds and the left-hand downward-pointing arrow 1430 is therefore taken, as represented by the letter "L" 1824 in FIG. 18B. Node 1432 includes the test b≤0.2. The value for the parameter b for symbol image 1802 is shown in FIG. 18A to be 0.28. Thus, the test represented by node 1432 fails and the right-hand downward-pointing arrow 1434 is selected as the next traversal sub-path, as represented by the letter "R" 1826 in FIG. 18B. Node 1436 includes the test: p<1. The value of the parameter p for symbol image 1802 is shown, in FIG. 18A, as being 1. The test represented by node 1436 fails and the right-hand downward-pointing arrow 1438 is selected as the next traversal sub-path, as represented by the letter "R" 1828 in FIG. 18B. Node 1440 includes a test: p<4. Because the value of the parameter p for symbol image 1802 is 1, this test succeeds and therefore the right-hand downward-pointing arrow 1442 is selected as the next traversal sub-path, as represented by the letter "L" 1830 in FIG. 18B. This leads to the leaf node 1444, which represents the symbol with symbol code 22. Text lines 1832-1834 represent the traversals of the second through fourth decision trees, 1500, 1600, and 1700, which produce symbol codes 37, 22, and 22. The most frequently produced symbol code from the four tree traversals is symbol code 22 (1836 in FIG. 18B), which is the result of applying parameters 1808 to the decision forest comprising decision trees 1400, 1500, 1600, and 1700. Note that the subset of symbols used to construct the second decision tree, which produced symbol code 37, does not include symbol 22. It is therefore not surprising that the symbol code produced by traversal of this tree is not symbol code 22. Application of the parameters 1810 for symbol image 1804 to the decision forest produces an ambiguous result of either symbol code 45 or symbol code 22 1838. Application of the computed parameters 1812 for symbol image 1806 produces symbol code 22 1840.

In the current, simple example, all three variations of the U-like symbol 22, 1802, 1804, and 1806, were characterized as having symbol code 22, or either symbol code 22 or 45, by the decision forest comprising decision trees 1400, 1500, 1600, and 1700. However, U-like symbol images that depart further from the canonical symbol image shown in FIG. 6 for the symbol-code 22 would likely produce more divergent results. The four-decision-tree decision forest of this example is not terribly robust, for numerous reasons. One reason is that most of the decisions in the four decision trees include tests that involve only a small subset of the total number of parameters. Thus, the decision trees rely primarily on only a few of the nine parameters. Furthermore, the numeric values of the parameters are not necessarily ordered with respect to similarity in the symbol images producing the numeric values. For example, the numeric values for the parameter p, discussed with reference to FIG. 12A, have no numeric order representative of the degree of similarity between symbols with different numeric values for this parameter. Another problem is that each decision tree was constructed using only 75% of the total number of symbols, and the 75% of the symbols were not randomly selected. There is, therefore, significantly less overlap in the symbol sets used to construct the trees than would normally be employed to produce a robust decision forest. Finally, a practical decision forest would likely include a larger number of decision trees constructed based on subsets of a much larger set of better-distributed parameters.

Decision-Tree-Based Symbol-Image Recognition

The current document is directed to a decision-tree-based optical-character-recognition ("OCR") system that determines a symbol code corresponding to each symbol image extracted from a document image. The symbol codes are used to create an electronic document corresponding to the document image. To create the electronic document, the OCR system analyzes the document image at hierarchical levels, formatting the document image to replicate the formatting of the document image and replacing non-symbol features of the document image with equivalent electronic-document encodings. Symbol images in the document image are replaced, in the electronic document, by symbol codes, such as Unicode character encodings. The current document is directed to a decision-tree-based process, carried out by an OCR system, that outputs a symbol code for each input symbol image.

FIGS. 19-23B illustrate a number of hierarchically related data structures used by the currently described OCR system in order to identify and output a symbol code for an input symbol image. The data structures illustrated in FIGS. 19-23B, in combination with numerous OCR routines comprising computer instructions that are stored in an electronic memory and executed by one or more processors, control the OCR system to carry out a symbol-image-recognition process that produces a symbol code for each input symbol image. In the following discussion, certain of the data structures are discussed as including member functions, as common in object-oriented programming, that carry out OCR methods using the information contained in the data structures and, in the case of classifiers, as returning decisions. Those familiar with computer science understand that, alternatively, the data structures may be manipulated by separate routines that carry out the OCR methods and that make decisions for the OCR system based on the information contained in the data structures. Moreover, many different alternative data-structure encodings may be used, including data structures that contain values and substructures rather than references to values and substructures, data structures that contain references to values and substructures rather than the values and substructures themselves, and data structures that contain additional and/or different information. The following discussion and claims are intended to describe a new and useful computational approach to symbol-image recognition incorporated within OCR systems that can be implemented in various different ways.

Figure 19:
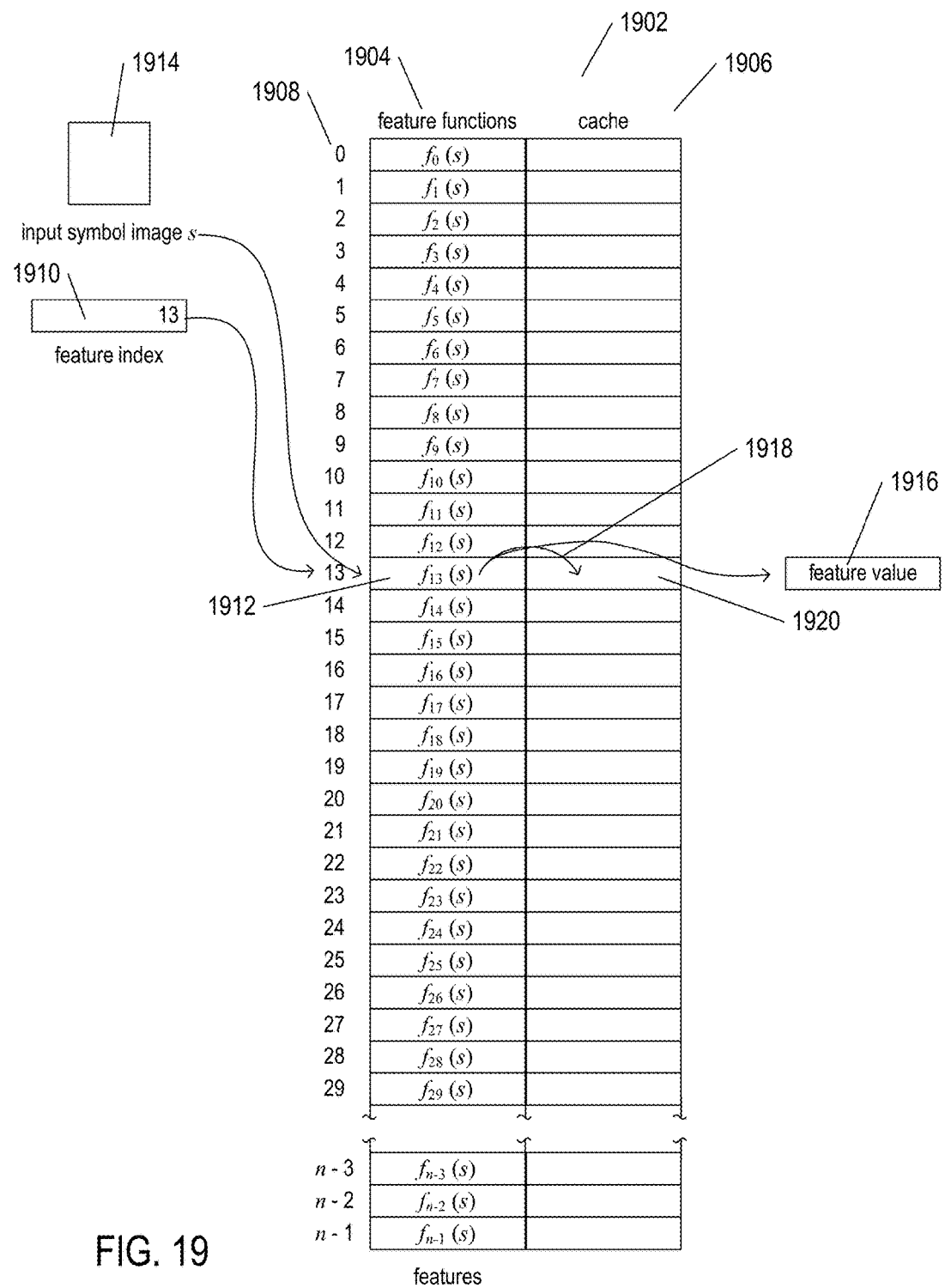
FIG. 19 illustrates a number of hierarchically related data structures used by the currently described OCR system in order to identify and output a symbol code for an input symbol image.

FIG. 19 illustrates a set of numerically indexed feature functions and corresponding cache values that provide underlying numerical values, or parameter values, that drive the symbol-image-recognition process. The feature functions and corresponding cache values are shown as a two-column table 1902 in FIG. 19. The first column includes feature functions or references to feature functions 1904 and the second column 1906 includes a cached value produced by the corresponding feature function. Each feature-function/cache-value pair is numerically indexed by the numerical indexes shown in the left-hand column 1908. Feature functions are described, above, with reference to FIGS. 8A-B, 9, 10, 12A, 13A-B, and other figures. Feature functions compute values for basic parameters and characteristics of a symbol image, such as the longest horizontal line in the symbol image, relative portion of black versus white pixels in the symbol image, and other such parameters and characteristics. In the currently described OCR system, each feature function returns a real value in the range [0,1]. Of course, other domains for feature-function values are possible.

The set of feature functions contained in the two-column table are used to compute feature values for an input symbol image. A feature index 1910 is used to select a particular feature function 1912. An input symbol image 1914 is then input to the feature function 1912 selected by the feature index 1910 to produce a corresponding feature value 1916. During the first access of a feature function for any particular input symbol image, the feature value is stored, as represented by arrow 1918, into the cache entry 1920 corresponding to the feature function 1912. Thereafter, rather than call the feature function to return the feature value, the cached feature value can be immediately returned for greater computational efficiency.

Figures 20A, 20B:
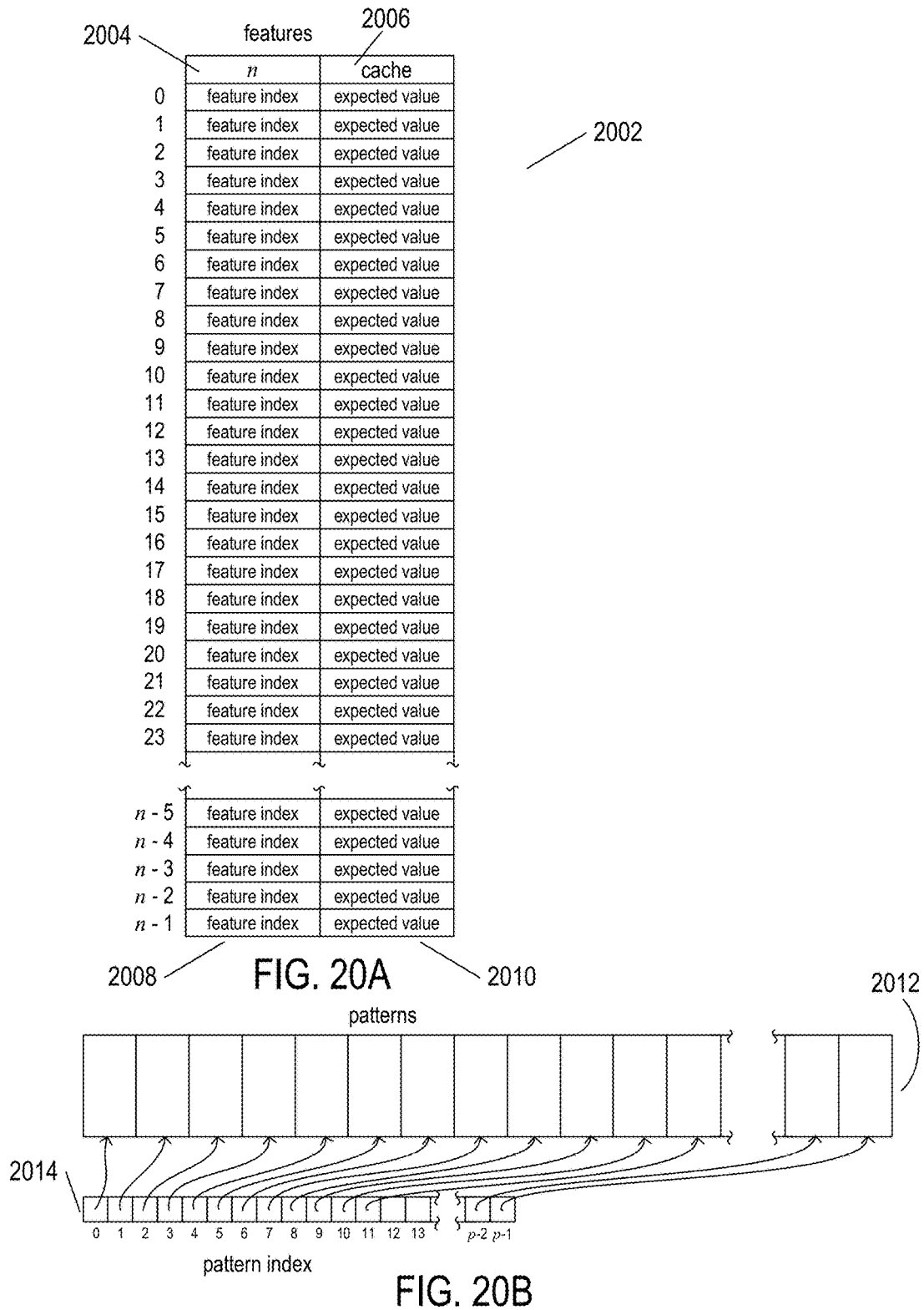
FIG. 20A illustrates a number of hierarchically related data structures used by the currently described OCR system in order to identify and output a symbol code for an input symbol image.
FIG. 20B illustrates a number of hierarchically related data structures used by the currently described OCR system in order to identify and output a symbol code for an input symbol image.

FIGS. 20A-B illustrate an indexed set of pattern data structures. FIG. 20A shows a tabular representation of a pattern data structure. The pattern data structure 2002 includes a numerical indication of the number of feature indexes contained within the pattern data structure 2004, a cache value 2006, a column of feature indexes 2008, and a second column of corresponding expected feature values 2010. The columns of feature functions and corresponding expected values can be alternatively be considered to be a set, or list, of tuples, each tuple including a feature index and corresponding expected value. The cache value 2006 may be set when the pattern data structure is first applied to a symbol image, and used thereafter as the weight for the symbol image during processing of the symbol image.

A pattern data structure contains a collection of feature indexes that index a set of feature functions that are used together to identify fundamental portions of a symbol image. As discussed further, below, a pattern data structure is used by the OCR system to compute a weight from an input symbol image that reflects the probability that the fundamental symbol-image component recognized by the pattern data structure is present within the input symbol image. The weight is computed as the sum of absolute-value differences between the feature values produced by the indexed feature functions and corresponding expected values. In the currently described implementation, the smaller the weight, the more likely that the symbol-image component recognized by the pattern data structure is present within the input symbol image. In the current implementation, the computed weights are real numbers in the range [0,1]. Of course, computationally, real numbers are represented by floating-point values. As shown in FIG. 20B, the currently described OCR system employs a large set of pattern data structures, represented by the row-vector-like array of pattern data structures 2012, that are numerically indexed by a pattern index 2014.

Figure 21:
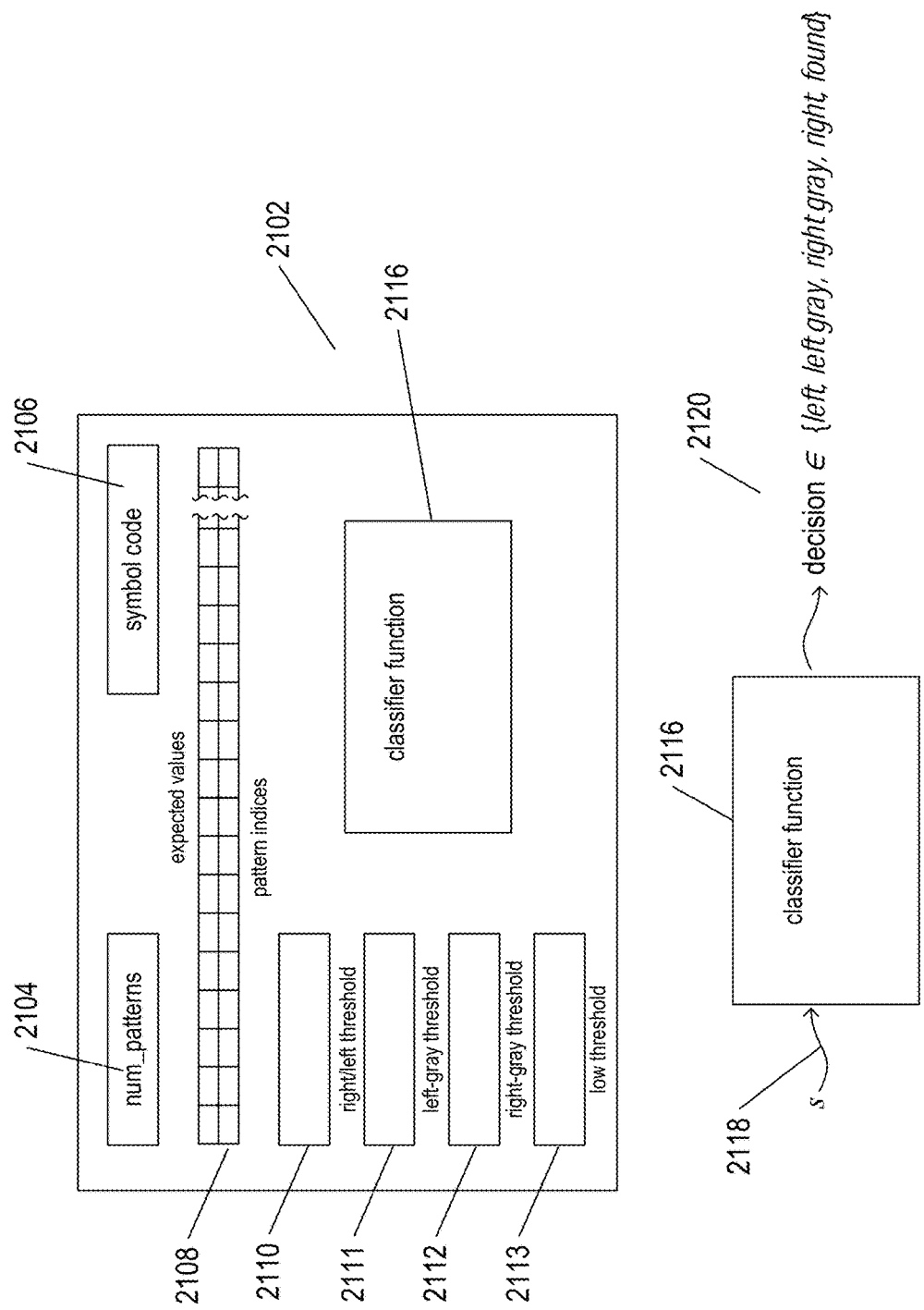
FIG. 21 illustrates a number of hierarchically related data structures used by the currently described OCR system in order to identify and output a symbol code for an input symbol image.

FIG. 21 illustrates a classifier data structure. The classifier data structure 2102 is used to identify a particular class or group of symbol images that corresponds to a symbol code. In other words, as one example, a large number of different renderings of a particular natural-language symbol, such as the letter "A" in the English language, would constitute a class of symbol images, each member of which corresponds to the symbol characterized by the symbol code for the letter "A." The classifier data structure 2102 includes an indication of the number of pattern data structures used by the classifier data structure 2104, a symbol code 2106 for the class of symbol images recognized by the classifier data structure, a two-row table 2108 of pattern-data-structure indexes and corresponding expected values, four threshold values 2110-2113, and a classifier function 2116 that uses the data contained within the classifier data structure to classify an input symbol image. The two-row table 2108 of pattern-data-structure indexes and corresponding expected values can be alternatively considered to be a set, or list, of tuples, each tuple including a pattern-data-structure index and a corresponding expected value.

The classifier function 2116 receives an input symbol image s 2118 and produces, as output, a decision 2120. In the described implementation, a generalized classifier produces one of five decisions: (1) left, an indication that the input symbol image does not correspond to the class of symbol images recognized by the classifier but may be recognized by other classifiers that can be reached by navigation of a left edge emanating from the classifier; (2) left gray, an indication that the classifier does not recognize the symbol image as belonging to the class of symbol images recognized by the classifier, but indicating that an appropriate classifier for the symbol image may be found by navigating a left edge or link emanating from the classifier and also indicating a significant level of uncertainty with regard to whether a left link or right link should be followed to find the appropriate classifier; (3) right gray, similar to the left gray decision, indicating that the symbol image is not recognized by the classifier but may be recognized by a classifier reached from a right link or edge emanating from the classifier and also indicating a significant level of uncertainty with regard to whether a left link or right link should be followed to find the appropriate classifier; (4) right, indicating that the appropriate classifier for the input symbol image can be found by traversing a right edge or link emanating from the classifier; and (5) found, an indication that the symbol image input to the classifier belongs to the class of symbol images recognized by the classifier. As discussed in greater detail below, classifiers may produce all five types of decisions, or, alternatively, when invoked during construction of a decision tree, may produce the decisions left, right, left and right, and found, with the left-and-right decision indicating that a symbol should be passed through the node containing the classifier to both the left and right links. Similarly, during symbol-image recognition, a root-node or intermediate-node classifier but may produce only the left, right, and found decisions, while a leaf-node classifier may produce either the decision found or another decision as well as the weight computed by the leaf-node classifier. Again, in certain implementations, classifiers do not produce enumerated decisions but, instead, equivalent decisions are made by OCR routines based on the weight computed using data contained within, or referenced by, a classifier.

Figure 22:
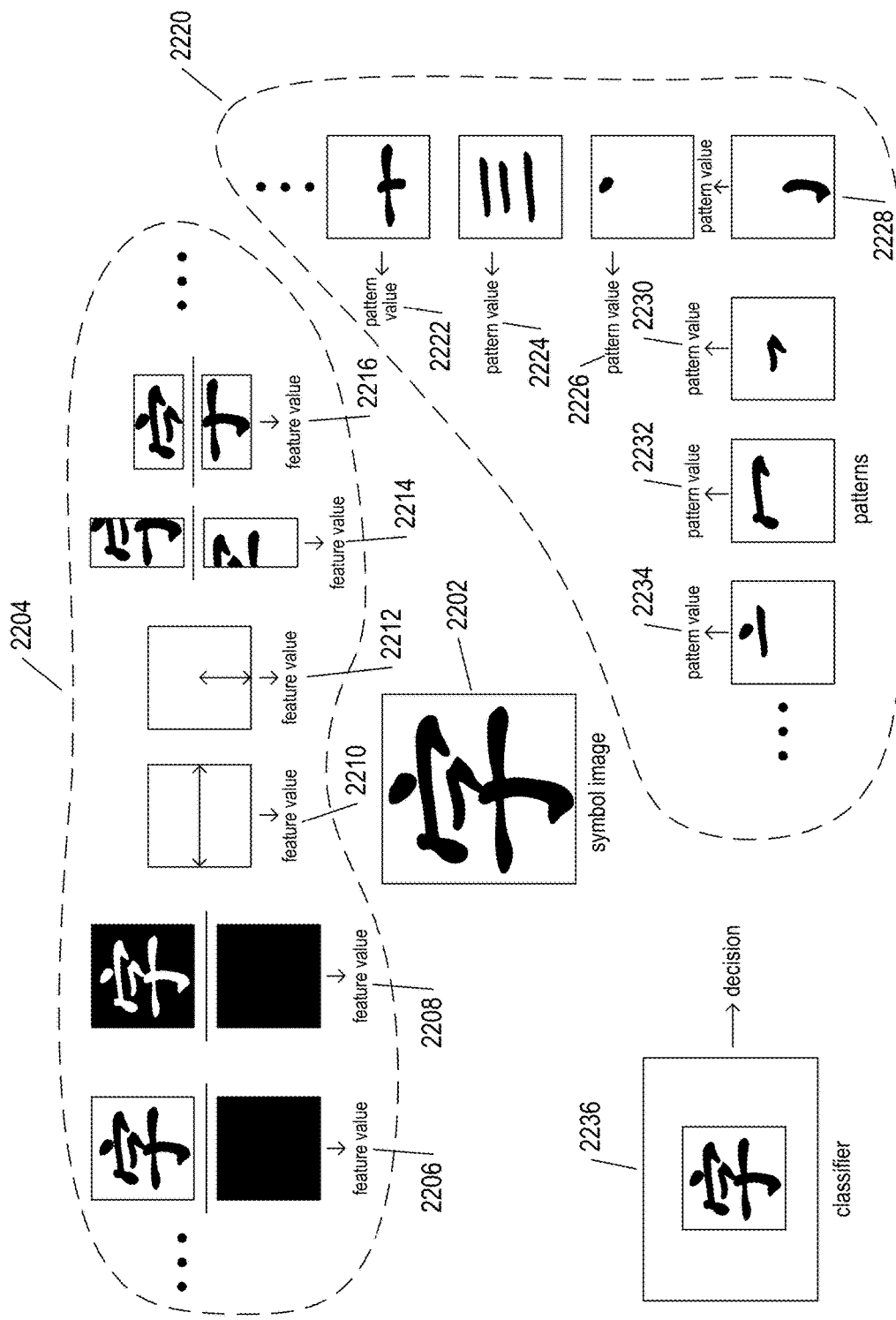
FIG. 22 illustrates a number of hierarchically related data structures used by the currently described OCR system in order to identify and output a symbol code for an input symbol image.

FIG. 22 illustrates the relationship between symbol images, features and feature values, patterns and weights produced by patterns, and classifiers. In FIG. 22, a particular symbol image 2202 corresponding to a Mandarin character is shown in the middle of the figure. A number of features and corresponding feature values are illustrated in a first dashed-line-enclosed portion of the FIG. 2204. The illustrated feature values include the ratio of the black pixels in the symbol to the symbol image area 2206, the ratio of the white space, or background pixels, to the total symbol-image area 2208, the longest horizontal line in the symbol image 2210, the longest vertical line in the symbol image 2212, the ratio of black pixels on the left side of the image to the number of black pixels on the right side of the image 2214, and the ratio of the number of black pixels in the upper portion of the symbol image to the number of black pixels in the lower portions of the symbol image 2216. These are but a few examples of the many different possible feature functions and corresponding feature values. The feature values, real numbers in the range [0,1], are related to certain primitive parameters and characteristics of a symbol image that, in general, do not independently reflect the absence or presence of symbol-image components. By contrast, patterns and corresponding pattern values, examples of which are shown in the second dashed-line-enclosed region 2220 of FIG. 22, produce weights, real numbers in the range [0,1], reflective of the absence or presence of particular symbol-image components of a symbol image. For example, the patterns in corresponding pattern values are used to recognize a skewed plus-sign-like structure 2222, the presence of three parallel horizontal features 2224, the presence of a centered, compact feature 2226, the presence in a lower central portion of the symbol image of a hook-like feature 2228, the presence of a centered horizontal hook-like feature 2230, the presence of a horizontally oriented, compressed J-like feature 2232, and the presence of a compact feature above a horizontal feature in the upper central portion of the symbol image 2234. A classifier 2236 is associated with a class of symbol images corresponding to a particular symbol or character of a character set for a natural language. For example, classifier 2236 recognizes the class of symbol images that includes symbol image 2202. Thus, features and corresponding feature values represent a lowest-level within a hierarchy of symbol-recognition tools, patterns and corresponding pattern values represent an intermediate hierarchical level of symbol-recognition tools, and classifiers represent the highest level hierarchical symbol-recognition tools.

Figure 23A:
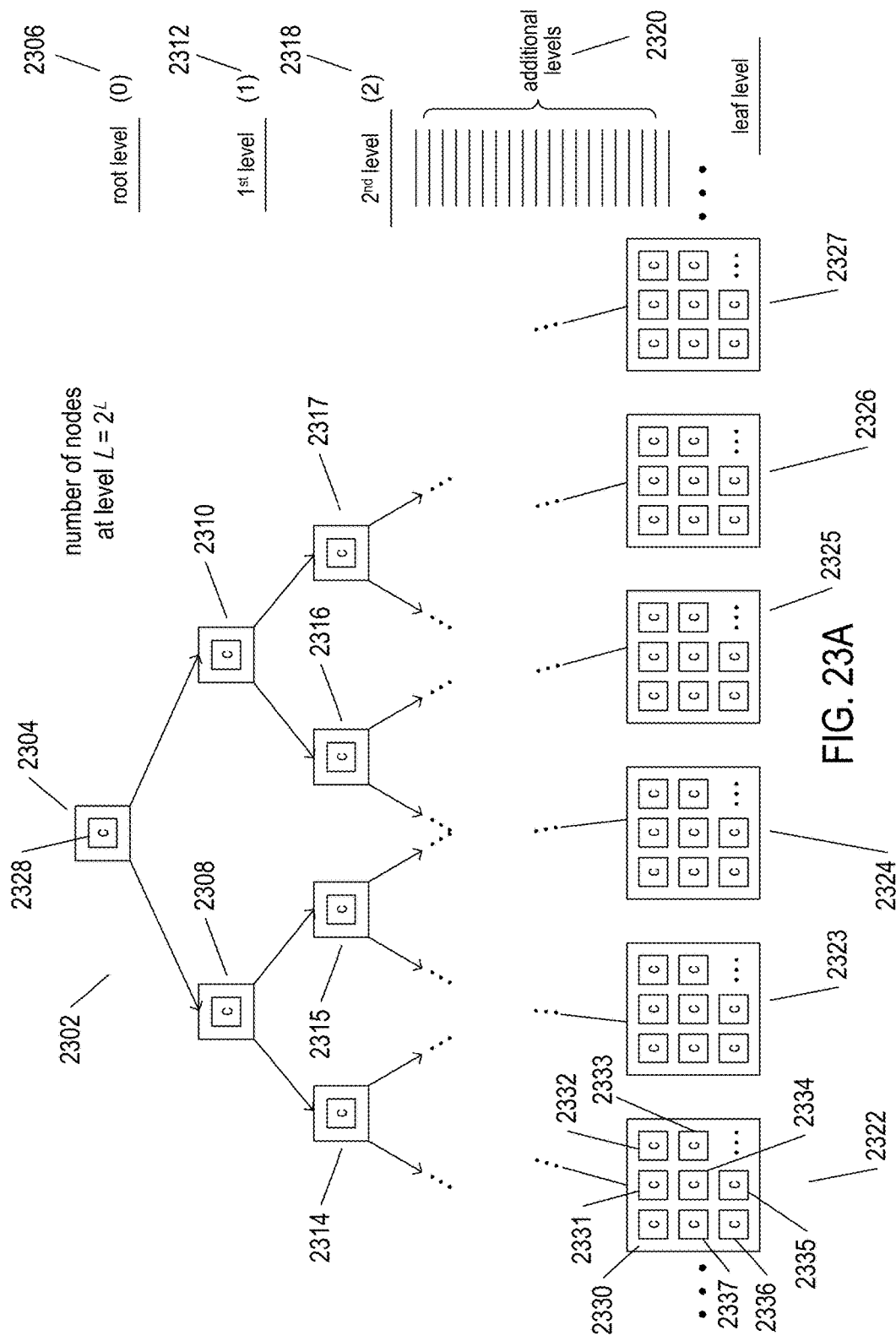
FIG. 23A illustrates a number of hierarchically related data structures used by the currently described OCR system in order to identify and output a symbol code for an input symbol image.
Figure 23B:
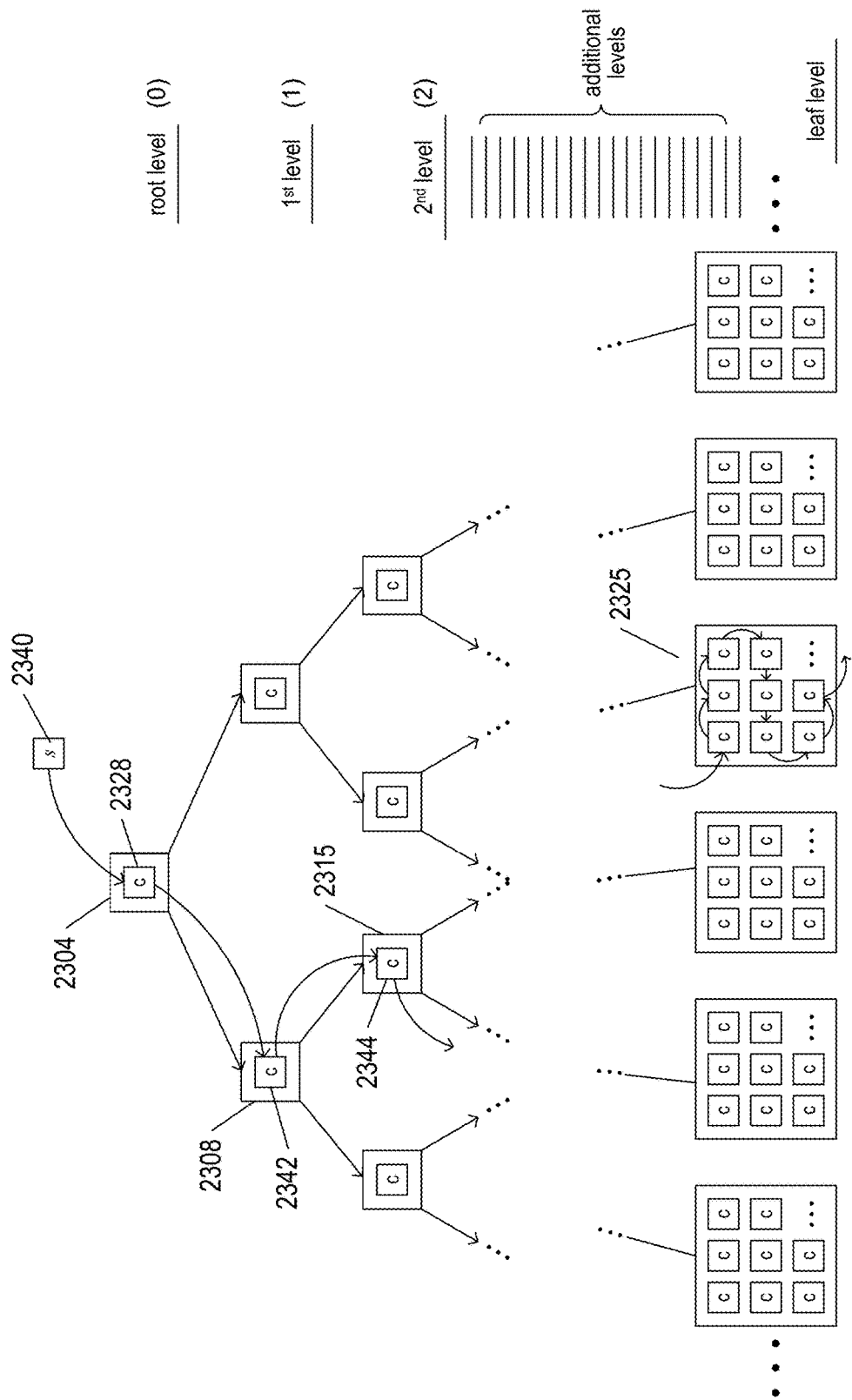
FIG. 23B illustrates a number of hierarchically related data structures used by the currently described OCR system in order to identify and output a symbol code for an input symbol image.

FIGS. 23A-B illustrate a decision tree that includes classifier data structures within nodes of the decision tree. As shown in FIG. 23A, the decision tree 2302 includes a root node 2304 at the root level "0" 2306, two intermediate-level nodes 2308 and 2310 at the first tree level 2312, four intermediate-level nodes 2314-2317 at the second level 2318 within the decision tree, numerous additional levels of intermediate nodes 2320, and a set of terminal leaf nodes, including leaf nodes 2322-2327. This is a binary decision tree, in which the root and intermediate-level nodes each have two children nodes. The number of nodes at level "L" is equal to $2^L$. and the number of nodes in a tree with highest node level L is $2^{(L+1)}-1$. Each of the root and intermediate-level nodes includes a single classifier, represented in FIG. 23A by a small rectangle 2328 labeled with the letter "C." The leaf nodes each include multiple classifiers, such as classifiers 2330-2337 within leaf node 2322. The number of nodes, levels, and classifiers within leaf nodes varies with the particular natural language to which the decision tree is directed. In certain cases, the decision tree may include 20 or more levels. As discussed, in greater detail, below, each of the root and intermediate-level nodes is associated with a different classifier, but leaf nodes may contain classifiers that also occur in an intermediate-level node or in other leaf nodes.

FIG. 23B illustrates traversal of the decision tree. An input symbol image 2340 is first input to the classifier 2328 of the root node 2304. Should the classifier return the decision found, then the traversal terminates and the decision tree returns a symbol code associated with the classifier 2328 as corresponding to the input symbol image. In the example shown in FIG. 23B, classifier 2328 instead returns a decision left, resulting in a downward navigation to intermediate node 2308. When the symbol image is input to the classifier 2342 contained within intermediate level 2308, in the example shown in FIG. 23B, the classifier returns the decision right. Had the classifier returned a decision found, the symbol code associated with classifier 2342 would have been returned by the decision tree and further traversal would terminate. However, in the current example, a traversal is made to node 2315. The input symbol image is input to the classifier 2344 contained in node 2315. In this example, the classifier returns a decision left. This process continues as long as the classifiers within traverse nodes do not return the decision found. When the traversal reaches a leaf node, such as leaf node 2325 in the example shown in FIG. 23B, the classifiers within the leaf node are traversed. Again, should any of these classifiers return the decision found, traversal terminates and the symbol code associated with that classifier is returned by the decision tree. Otherwise, when all of the classifiers within the leaf node have been traversed, the classifier returning the lowest weight for the input symbol is selected as the classifier corresponding to the symbol image and the symbol code associated with that classifier is returned.

Figure 24A:
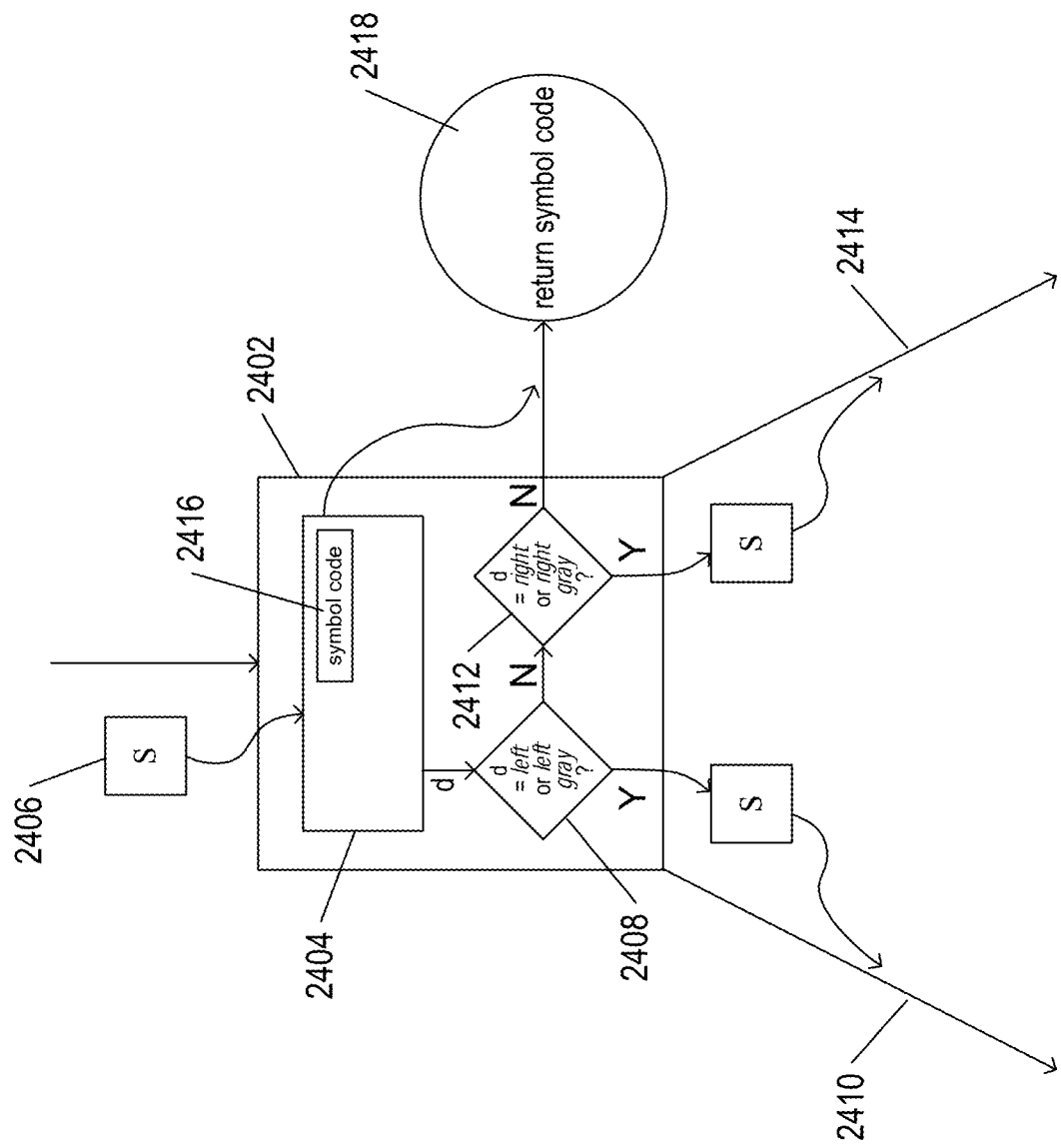
FIG. 24A illustrates the traversal of an intermediate-level decision-tree node and a leaf-node decision-tree node.
Figure 24B:
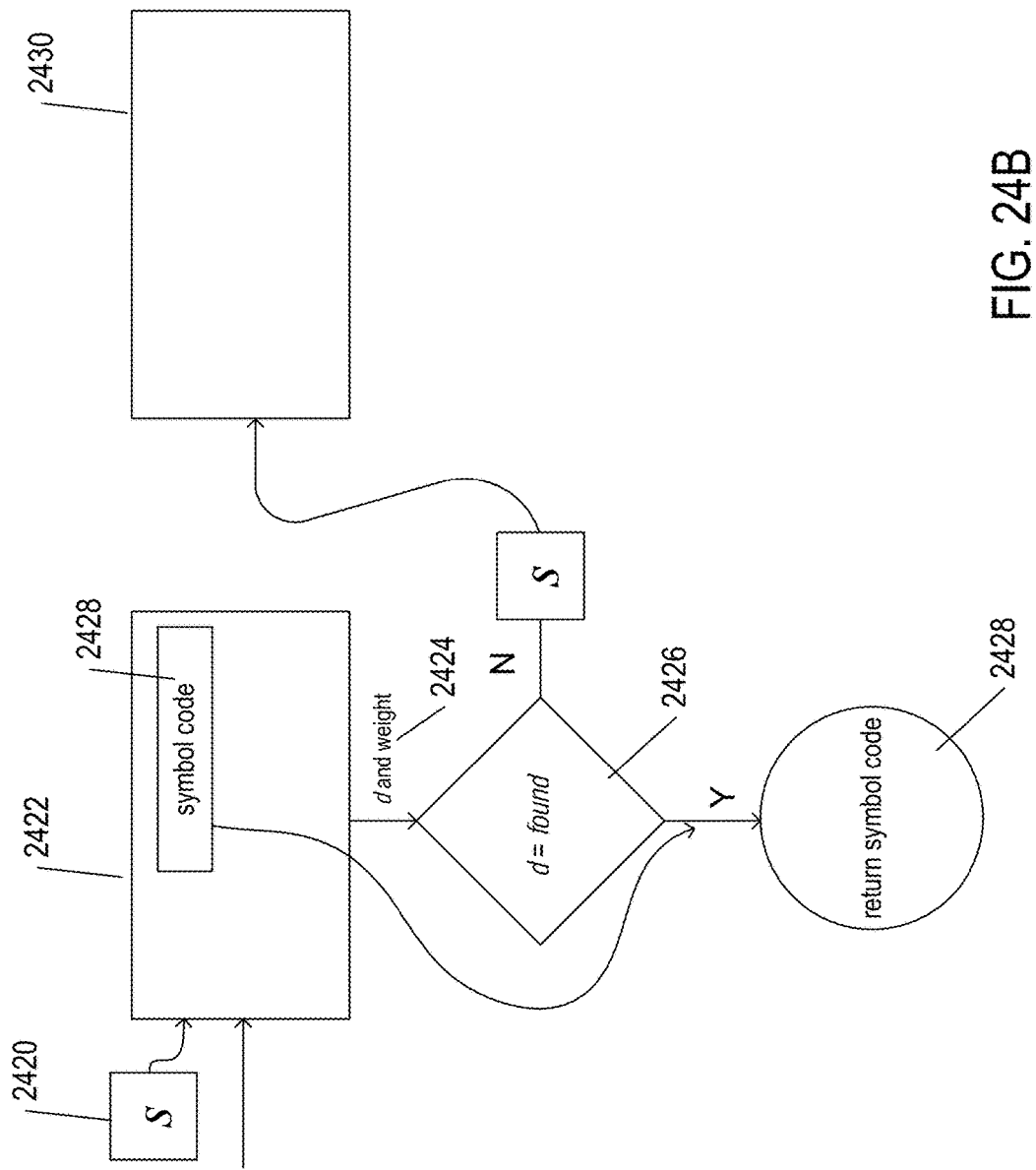
FIG. 24B illustrates the traversal of an intermediate-level decision-tree node and a leaf-node decision-tree node.

FIGS. 24A-B illustrate the traversal of an intermediate-level decision-tree node and a leaf-node decision-tree node. FIG. 24A shows an intermediate-level decision-tree node 2402 that includes a single classifier 2404. When this node is reached, during a traversal of the decision tree, the currently considered symbol image 2406 is input to the classifier 2404. The classifier produces a decision d. When the produced decision d is left or left gray, as determined in conditional step 2408, then the traversal of the decision tree continues along the left link 2410 emanating from the intermediate-level node 2402. Otherwise, when the decision d is right or right gray, as determined in conditional step 2412, traversal of the decision tree continues in the direction of the right link 2414 emanating from the intermediate-level node 2402. Otherwise, the decision d is equal to found, as a result of which the symbol code 2416 contained within the classifier 2404 is returned 2418 by the decision tree as the symbol code corresponding to the input symbol image.

FIG. 24B illustrates traversal of a classifier within a leaf-node decision-tree node. When the symbol image 2420 is input to a next classifier 2422 within the leaf node, the classifier outputs a decision d and the computed weight 2424. When the decision d is found, as determined in conditional step 2426, the symbol code 2428 contained in the classifier is returned as the symbol code corresponding to the input symbol image. Otherwise, traversal of the classifier within the leaf node continues with a next classifier 2430.

Figure 25B:
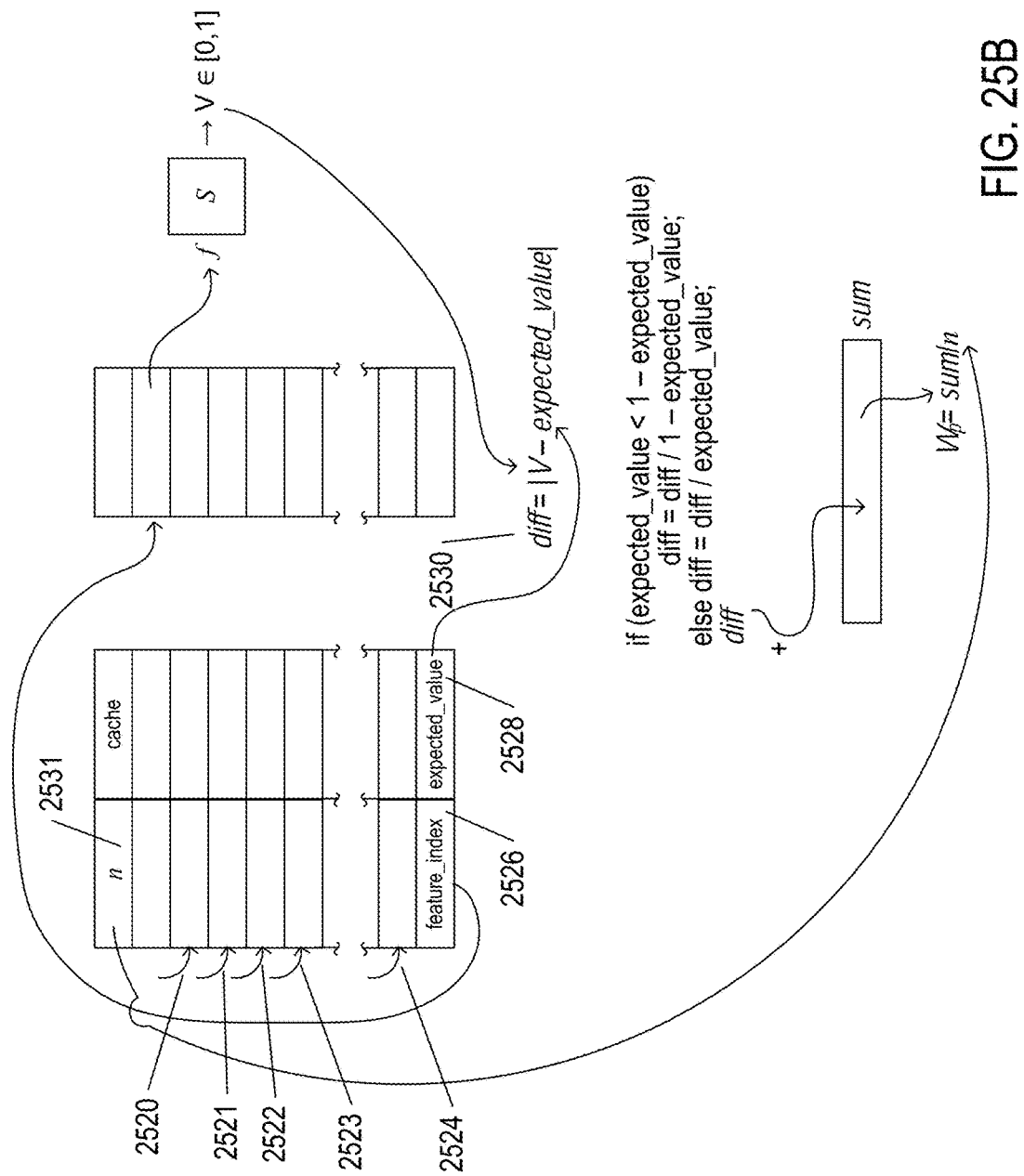
FIG. 25B illustrates generation of a weight by a pattern data structure and OCR logic for an input symbol image.

FIGS. 25A-B illustrate generation of a weight by a pattern data structure and OCR logic for an input symbol image. The input symbol image 2502 is input to a first feature function 2504, selected from the set of feature functions (1904 in FIG. 19) by the first feature index 2506 within the pattern data structure. The expected value 2508 corresponding to the first feature index 2506 is subtracted from the feature value 2510 produced by the feature function 2504 and the absolute value of the result is taken as the value for a local variable diff 2512. The value diff is then scaled in the pseudocode lines 2514 so that the value of diff falls in the range [0,1]. The value diff is then added to the local variable sum 2516. As shown in FIG. 25B, this process continues with each additional feature index in the pattern data structure, as indicated by curved arrows 2520-2524. Finally, the last feature index 2526 and corresponding expected value 2528 are used to compute a final diff value 2530 which is scaled and added to the local variable sum 2516. The contents of this variable are then divided by n 2531, the number of feature indices in the pattern data structure, to produce the pattern weight $W_p$ 2532 corresponding to the input symbol image. In the currently described implementation, the weight produced by the pattern data structure is a real number in the range [0,1].

Figure 26A:
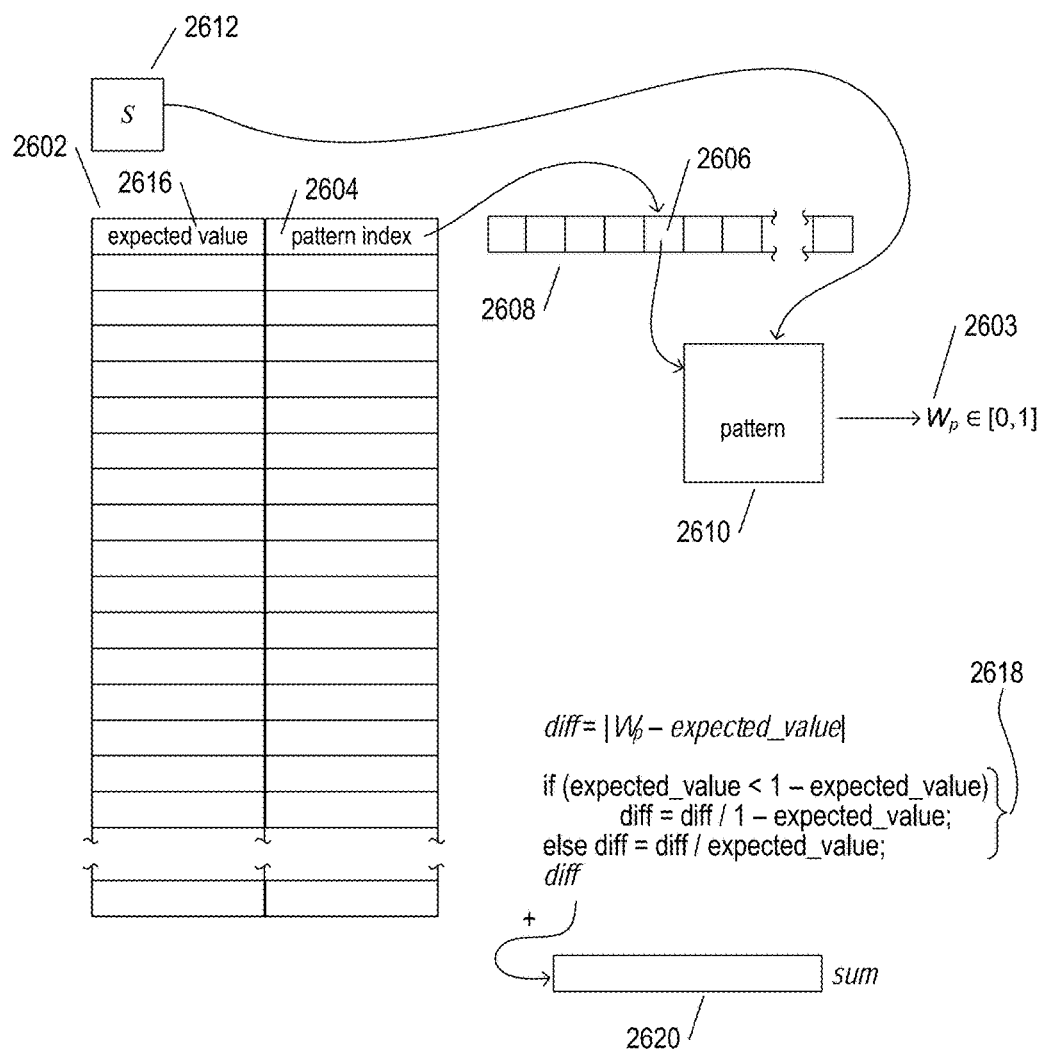
FIG. 26A illustrates computation of a weight and decision by a classifier for an input symbol image.
Figure 26B:
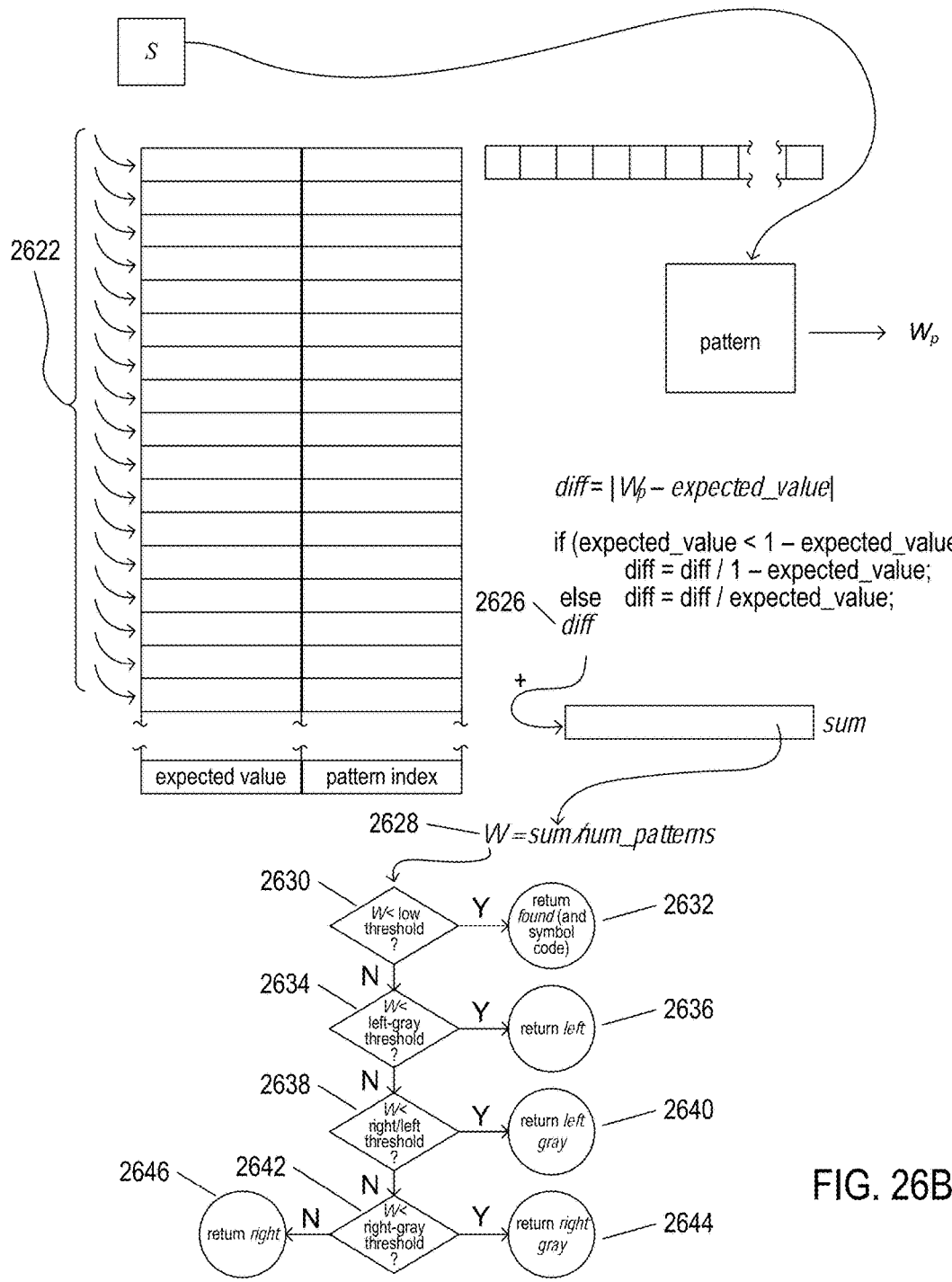
FIG. 26B illustrates computation of a weight and decision by a classifier for an input symbol image.

FIGS. 26A-B illustrate computation of a weight and decision by a classifier for an input symbol image. As shown in FIG. 26A, the first expected-value/pattern-index pair 2602 within the classifier is used to compute a first pattern weight 2603 for the symbol image $W_p$. The pattern index 2604 is used to select a particular reference 2606 from the pattern index 2608, shown as 2014 in FIG. 20B, and the reference is used to access a corresponding pattern data structure 2610. The input symbol image 2612 is input to the pattern data structure 2610 to produce the pattern weight $W_p$ 2603 by the process discussed above with reference to FIGS. 25A-B.

Then, a diff value 2614 is computed as the absolute value of the difference between the pattern weight $W_p$ and the expected value 2616 in the first expected-value/pattern-index pair 2602. The diff value is scaled by the pseudocode 2618 so that the diff value is guaranteed to be a real number within the range [0,1]. This diff value is then added to the local variable sum 2620. As shown in FIG. 26B, the process described in FIG. 26A is repeated for each successive expected-value/pattern-index pair, represented by curved arrows 2622 in FIG. 26B, to produce successive diff values that are added to the local variable sum 2620. Finally, the last expected-value/pattern-index pair 2624 is used, in the process discussed above with reference to FIG. 26A, to produce a final diff value 2626 which is added to the local variable sum 2620. Next, a classifier weight W 2628 is obtained by dividing the value in the local variable sum by the number of patterns num_patterns contained in the classifier. Then, the classifier weight W is input to conditional step 2630. When W is less than a low threshold, the decision found along with the symbol code contained in the classifier are returned 2632 as the result. Otherwise, as determined in conditional step 2634, when W is less than the left gray threshold, the decision left is returned 2636. Otherwise, when W is less than the right/left threshold, as determined in step 2638, the decision left gray is returned 2640. Otherwise, when W is less than the right gray threshold, as determined in step 2642, the decision right gray is returned in step 2644. Otherwise, the decision right is returned in step 2646.

Figure 27A:
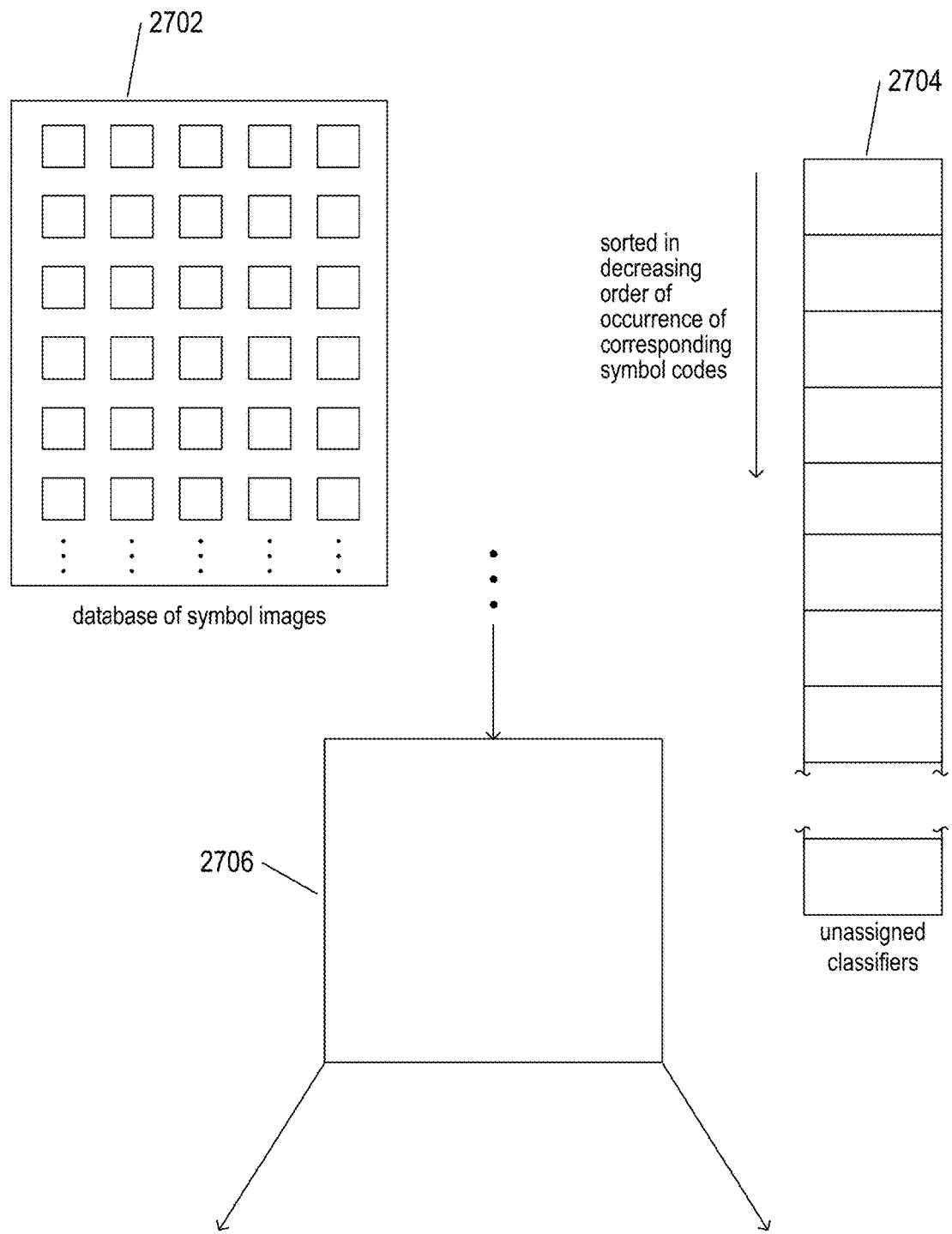
FIG. 27A illustrates the creation and training of an OCR decision tree.
Figure 27B:
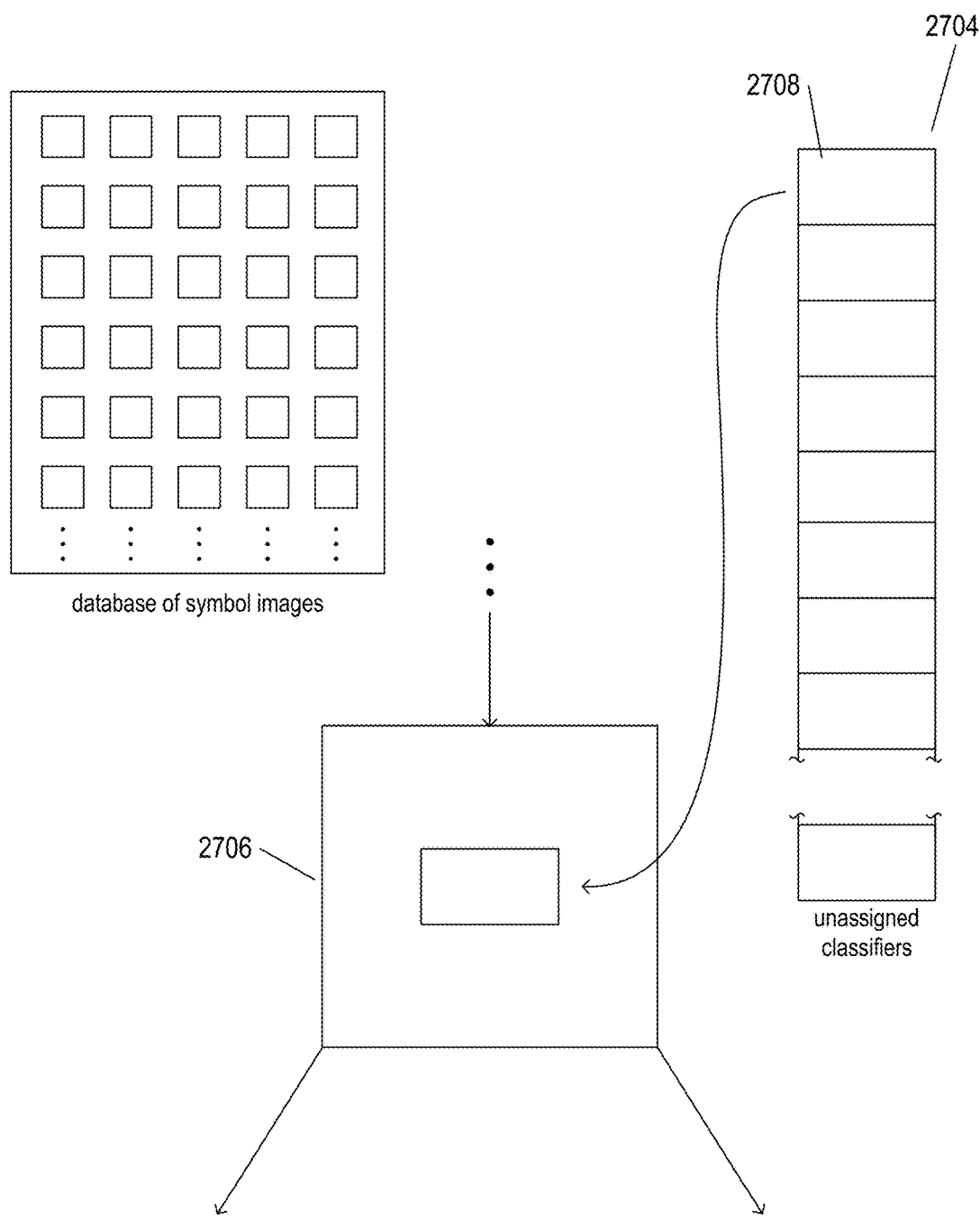
FIG. 27B illustrates the creation and training of an OCR decision tree.

FIGS. 27A-E illustrate the creation and training of an OCR decision tree. As shown in FIG. 27A, creation and training of the decision tree is based on a database of symbol images 2702 and on a list of classifiers for the natural language to which the decision tree is targeted 2704 that are sorted in decreasing order of the occurrence of the corresponding symbol codes for the classifiers in the natural language. The list of classifiers 2704 is referred to as the "unassigned classifiers" because, as classifiers are associated with decision-tree nodes during creation and training of the OCR decision tree, they are removed from the list. The database of symbol images may contain millions of symbol images selected from a wide variety of different types of documents in the natural language to which the decision tree is directed. The database of symbol images generally includes a balanced, representative selection of symbol images for each class of symbol image, with a class of symbol images corresponding to a particular symbol code and character or symbol in the natural language to which the decision tree is targeted. Each entry in the database of symbol images includes a symbol image and corresponding symbol code. These symbol-image/symbol-code pairs are repeatedly passed through the nascent decision tree, as explained below. In the following discussion, when symbol images are referred to as being passed through the nascent symbol-image tree, during the tree-creation process, the symbol image is processed by classifiers while the symbol code remains associated with the symbol image until either tree-traversal is terminated or the symbol image and associated symbol code are entered into one of three different symbol-image/symbol-code pair databases.

Figure 27C:
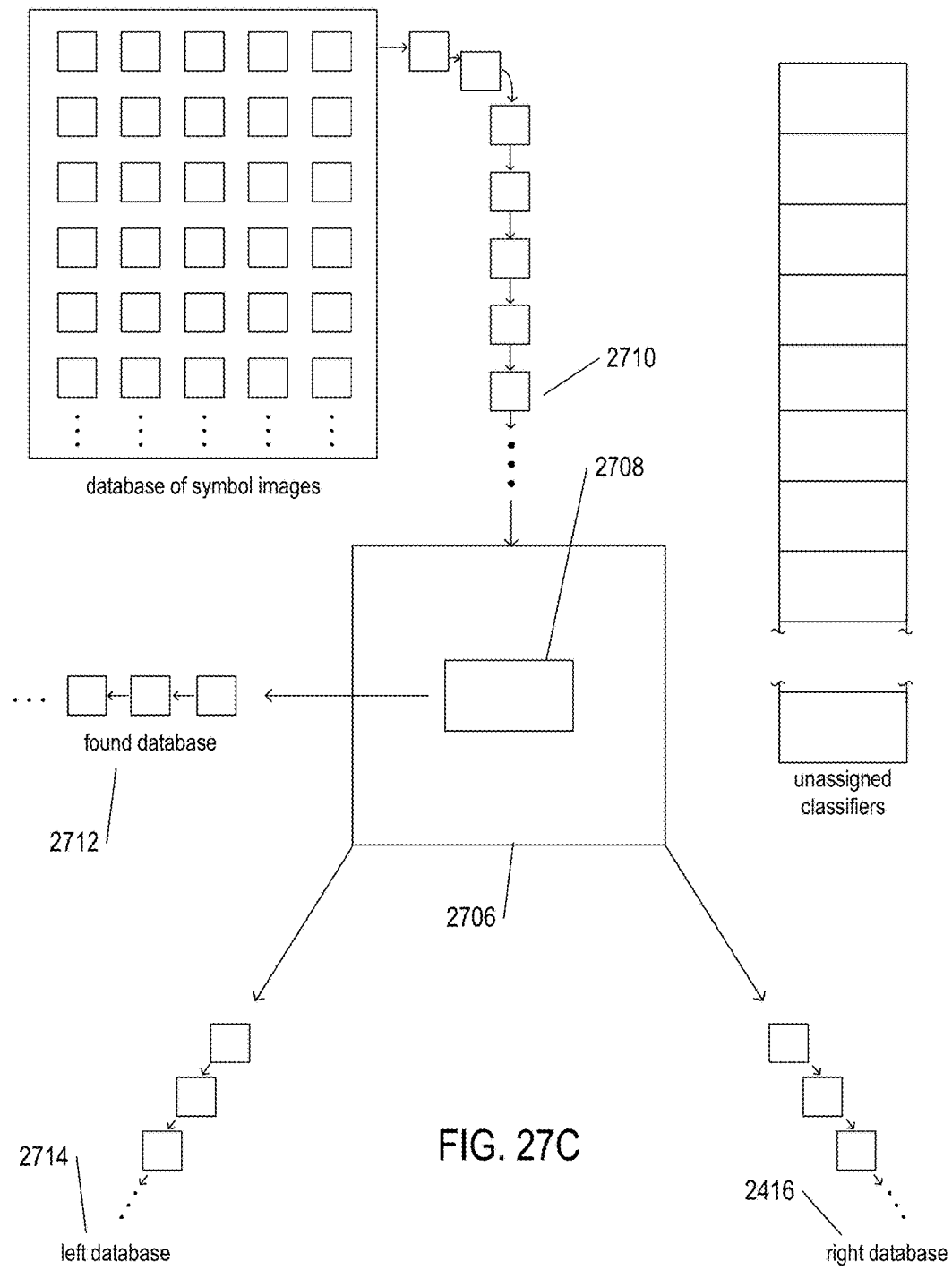
FIG. 27C illustrates the creation and training of an OCR decision tree.
Figure 27D:
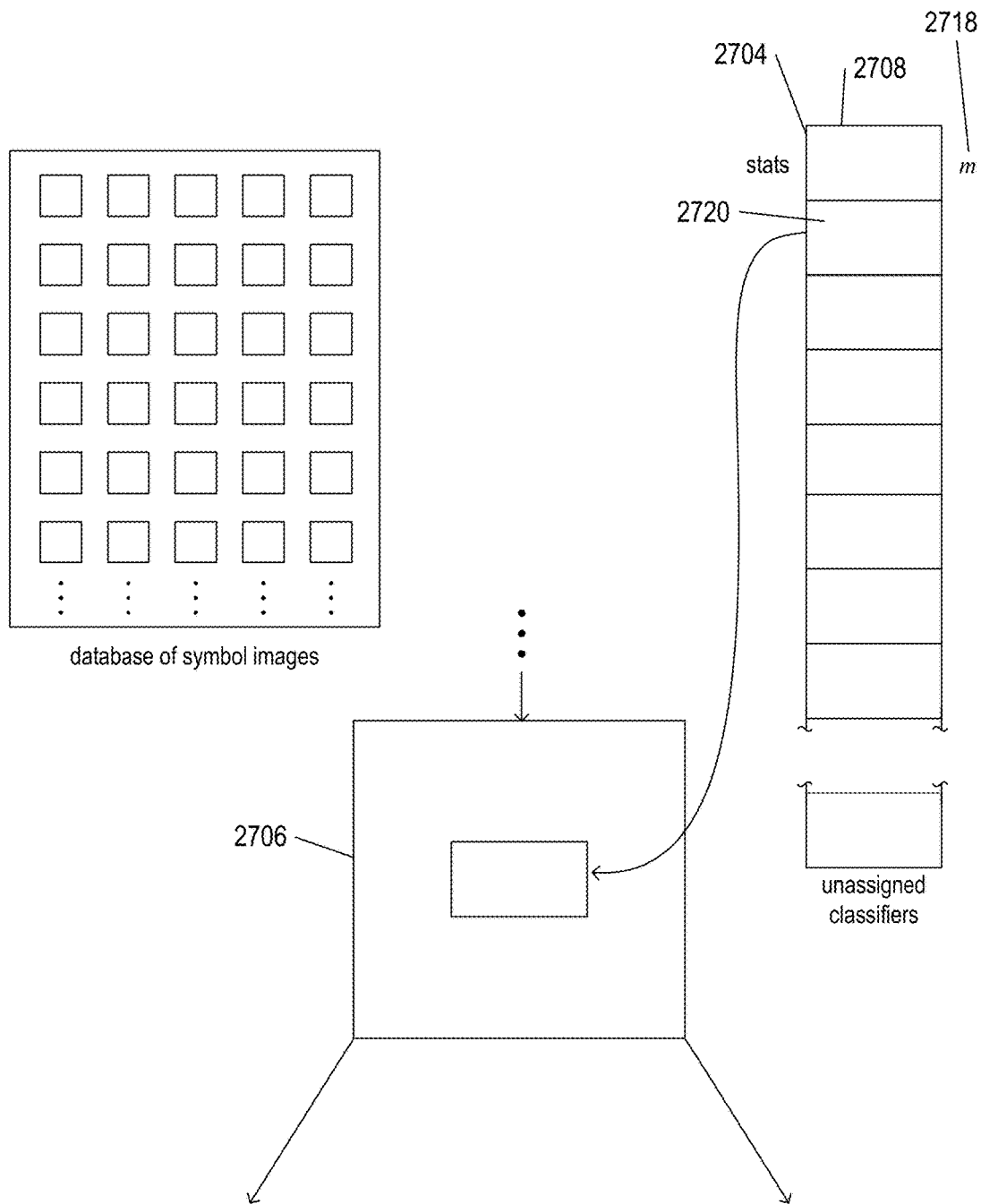
FIG. 27D illustrates the creation and training of an OCR decision tree.
Figure 27E:
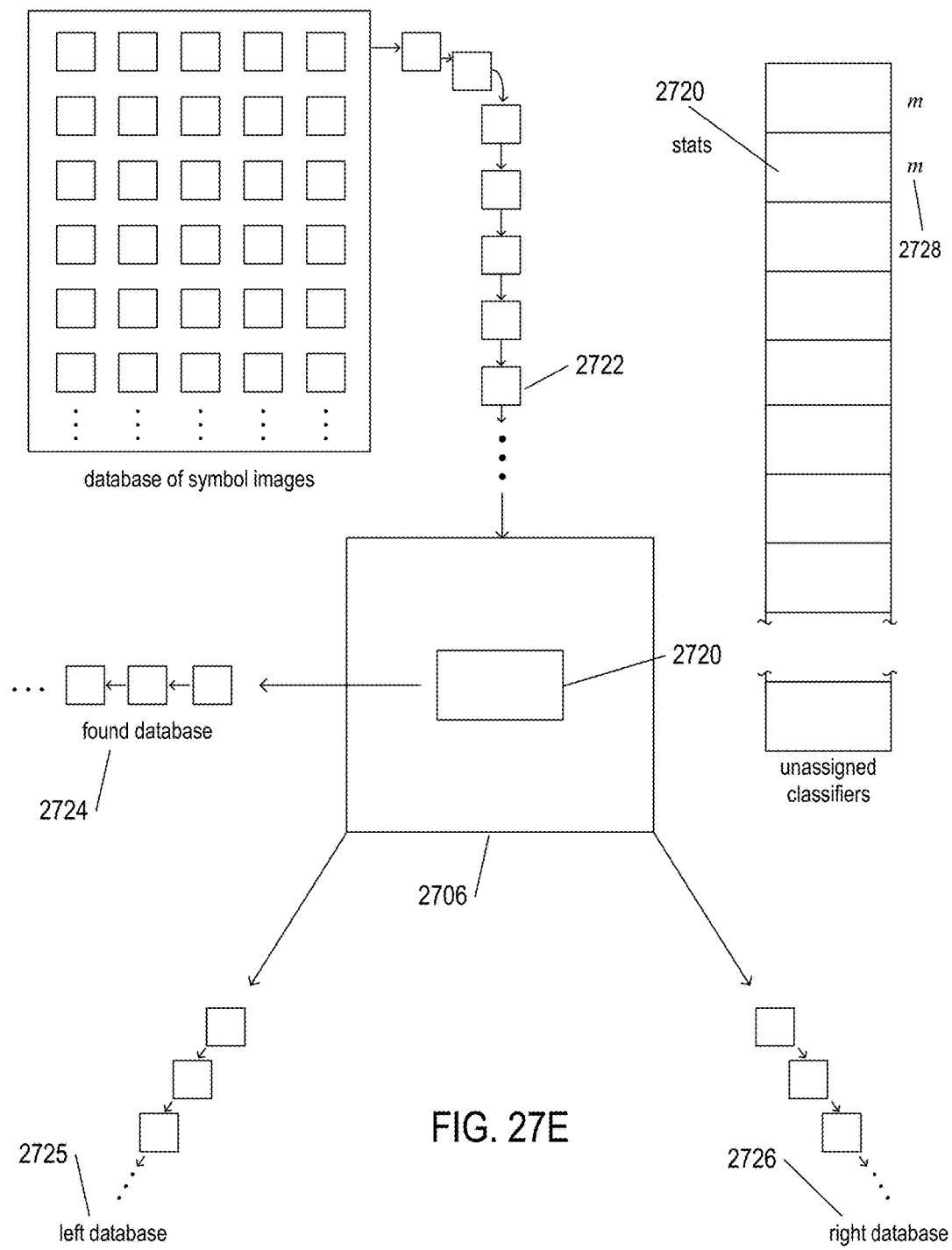
FIG. 27E illustrates the creation and training of an OCR decision tree.

The decision-tree creation and training process is described with respect to a generalized root or intermediate-level node 2706. This process is repeated for all of the intermediate-level nodes, as well as the root node, during decision-tree construction. In a first step, shown in FIG. 27B, the first classifier 2708 in the sorted list of classifiers 2704 is selected for inclusion within the node 2706. Next, as shown in FIG. 27C, each symbol image in the database of symbol images is input 2710, in succession, to the current decision tree. Those symbol images that end up input to the currently considered node 2706 are then processed by the current selected classifier 2708 and directed either to a found database 2712, a left database 2714, or a right database 2716 depending on the decision output by the current classifier 2708. Again, as explained above, each symbol image is associated with a corresponding symbol code in the three databases. The contents of the found, left, and right databases are then used to produce a metric for the first classifier m 2718 which is, as shown in FIG. 27D, associated with the first classifier 2708. Next, the second classifier 2720 from the sorted list of classifiers 2704 is selected for inclusion in the currently considered node 2706. Then, as shown in FIG. 27E, the symbol images in the database of symbol images is again input to the decision tree 2722 and those symbol images that end up traversing the currently considered node 2706 are directed to reinitialized found, left, and right databases 2724, 2725, and 2726. A metric 2728 is computed from the contents of these three databases and associated with a second classifier 2720. This process continues until all of the as-yet unassigned classifiers have been associated with metrics. The classifier with the largest metric is selected for inclusion in the currently considered node. This classifier is then removed from the sorted list of unassigned classifiers and the process is carried out again for a next node of the decision tree.

Figure 28:
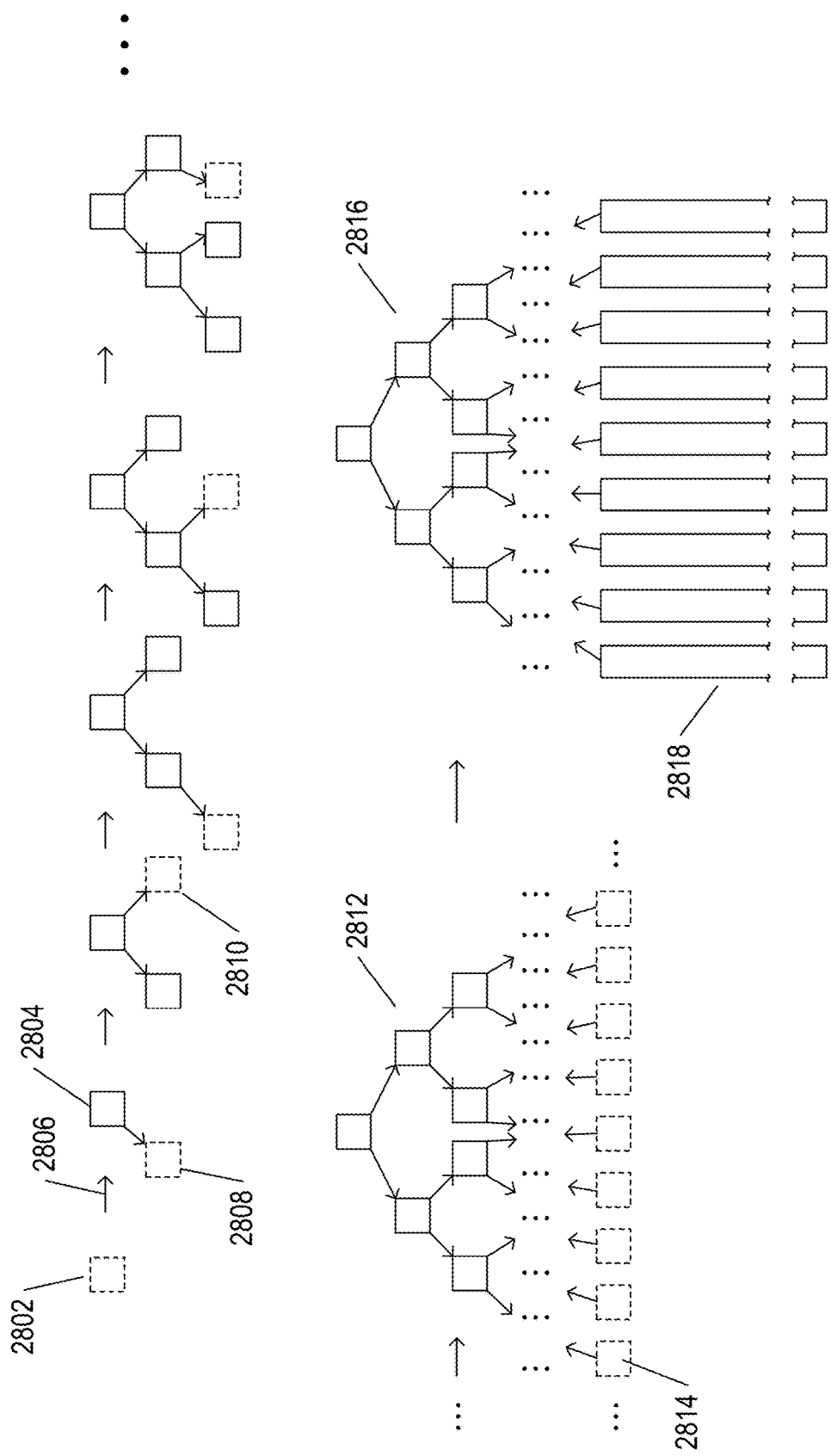
FIG. 28 illustrates stepwise construction and concurrent training of an OCR decision tree in one implementation of an OCR system.

FIG. 28 illustrates stepwise construction and concurrent training of an OCR decision tree in one implementation of an OCR system. In FIG. 28, dashed rectangles, such as dashed rectangle 2802, indicate a newly created root or intermediate-level node to which a classifier has not yet been assigned and solid-lined rectangles, such as solid-lined rectangle 2804, indicate root or intermediate-level nodes to which a classifier has been assigned. In a first step, an initial root node 2802 is created. Then, by the classifier-assignment process discussed above with reference to FIGS. 27A-E, represented in FIG. 28 by horizontal arrow 2806, a classifier is assigned to the root node. A new left child node 2808 is then created for the root node. The classifier-assignment process of FIGS. 27A-E is again applied to assign a classifier to the left child node 2808 and a new right-hand node 2810 is created for the root node. Alternation of classifier assignment and node-creation steps leads to creation of a structurally complete decision tree 2812. The structurally complete decision tree 2812 includes leaf nodes, such as leaf node 2814, to which classifiers have yet to be assigned. In a final step of decision-tree creation and training, classifiers are assigned to each leaf node to produce a final complete decision tree 2816. In the final, complete decision tree 2816 each leaf node, such as leaf node 2818, includes multiple classifiers.

Figure 29:
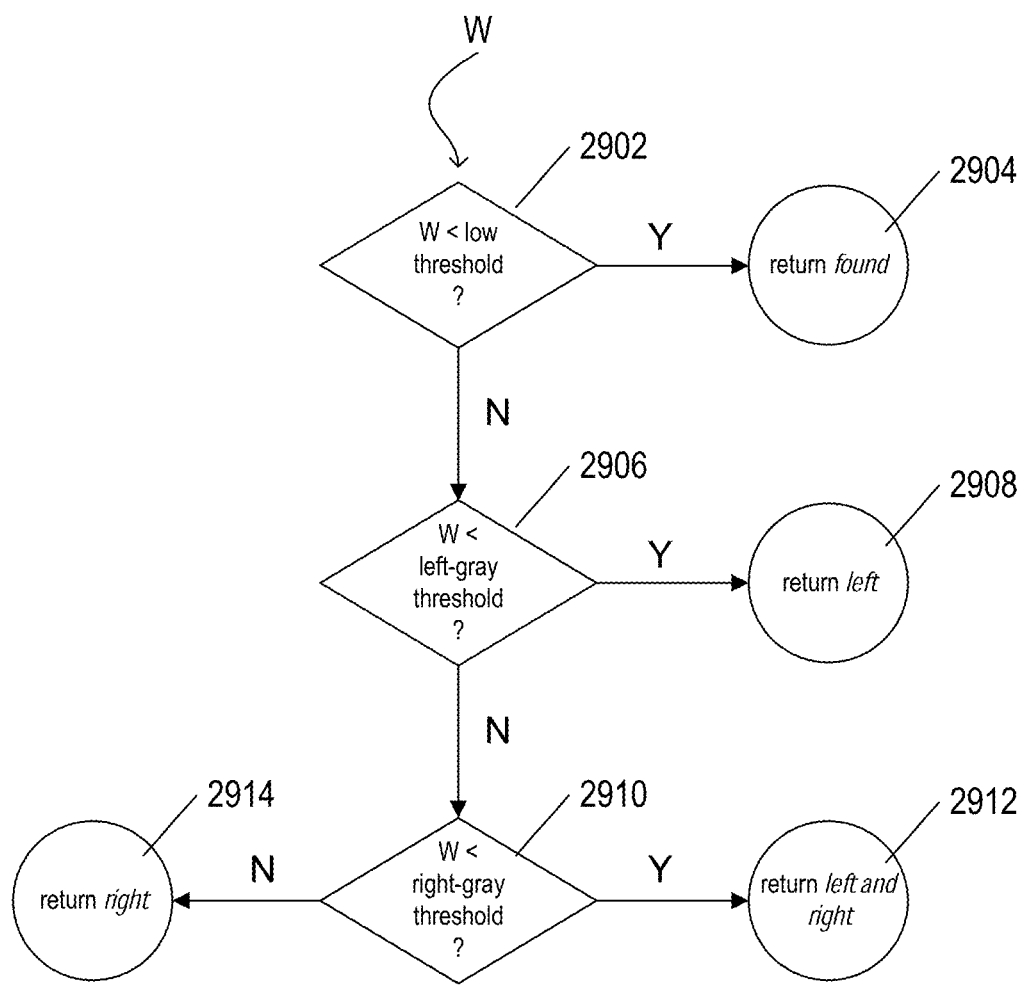
FIG. 29 illustrates alternative classifier decision logic.

The decision-returning logic that includes additional steps 2630, 2632, 2634, 2636, 2638, 2640, 2642, 2644, and 2646, shown at the bottom of FIG. 26B, may be altered to adapt classifiers to particular roles and operational statuses. For example, during tree creation, when the database of symbol images is passed through the tree during the classifier-assignment process, discussed above with reference to FIGS. 27A-E, a classifier returns only four different decisions: (1) found; (2) left; (3) right; and (4) right and left, indicating that the symbol image is to be output to both the right and left links emanating from the node through which the symbol images are passing. Thus, during decision-tree creation and concurrent training, a slightly different decision logic is employed by root and intermediate-level nodes. FIG. 29 illustrates alternative classifier decision logic. When W, the weight computed by the classifier, is less than the low threshold value, as determined in step 2902, the decision found is returned in step 2904. Otherwise, when W is less than the left gray threshold, as determined in step 2906, left is returned in step 2908. Otherwise, when W is less than the right gray threshold, as determined in step 2910, the decision left and right is returned in step 2912. Otherwise, right is returned in step 2914. During normal OCR-recognition operation of a decision tree, by contrast, classifier logic is modified to return only three decisions: found, left, and right. Found is determined when W is less than the low threshold, left is returned when W is less than the left/right threshold, and right is returned otherwise. In fact, the logic shown in FIG. 26B is the most general logic, and can be used for all purposes providing that OCR logic correctly employs the decisions for different types of navigation under different operational statuses of a particular classifier.

FIGS. 30A-G provide control-flow diagrams that illustrate document processing by the currently described OCR system. In step 3002 of FIG. 30A, the OCR system receives a document and initializes an electronic document to contain an encoding of the received document image produced by the OCR process. Those portions of the OCR process not directly related to assigning symbol codes to symbol images are not discussed with reference to FIGS. 30A-G. In general, OCR processing involves many hierarchical layers of processes directed to recognizing regions, formatting, and non-language features of a document and providing suitable encodings of these regions, formatting, and non-symbol portions of the document image in the electronic document. Certain of these processes may be carried out in step 3002, prior to symbol-image recognition. As part of the overall OCR process, the OCR identifies individual symbol images within the document, in step 3004, as discussed above. In the for-loop of steps 3006-3009, each identified symbol image in the received document image is processed. For each identified symbol image, a symbol image is converted to a symbol code, in the routine call of step 3007, and the symbol code is then incorporated into the electronic document, in step 3008. Once the identified symbol images are processed, document processing is completed, in step 3010. Completion of document processing may involve additional OCR processing steps involved in recognizing and encoding the non-symbol portions of the document image.

Figure 30A:
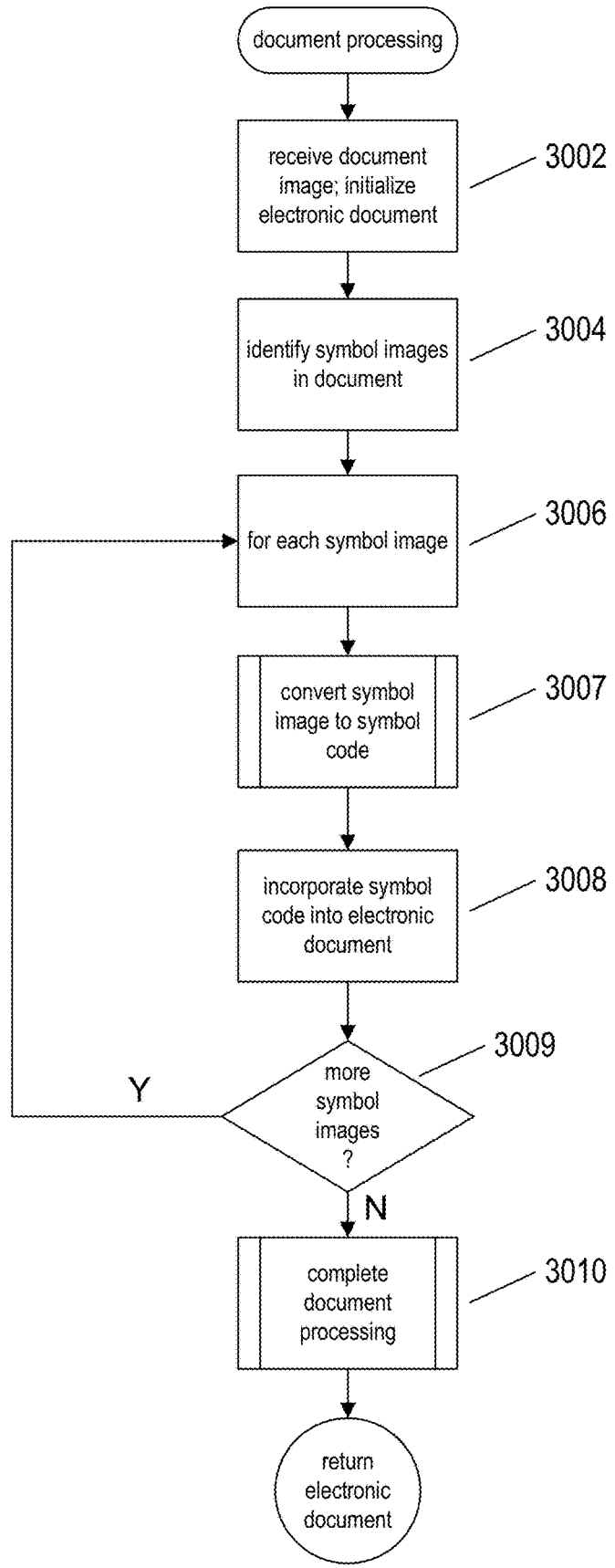
FIG. 30A provides control-flow diagrams that illustrate document processing by the currently described OCR system.
Figure 30B:
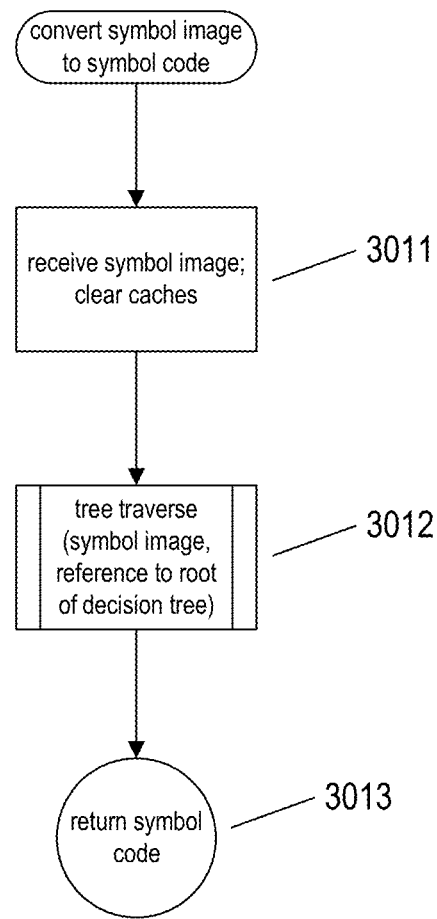
FIG. 30B provides control-flow diagrams that illustrate document processing by the currently described OCR system.

FIG. 30B provides a control-flow diagram for the routine "convert symbol image to symbol code," called in step 3007 of FIG. 30A. In step 3011, this routine receives a symbol image and clears all of the cache values in the set of feature functions (column 1906 in FIG. 19) and pattern data structures (2006 in FIG. 20A). Then, in step 3012, the routine calls the recursive routine "tree traverse," passing to the routine "tree traverse" the received symbol image and a reference to the root node of a decision tree prepared in advance, by the methods discussed above with reference to FIGS. 27A-E and FIG. 28, and discussed in further detail below. The recursive routine "tree traverse" returns a symbol code for the received symbol image. This symbol code is returned from the routine "convert symbol image to symbol code" in step 3013.

Figure 30C:
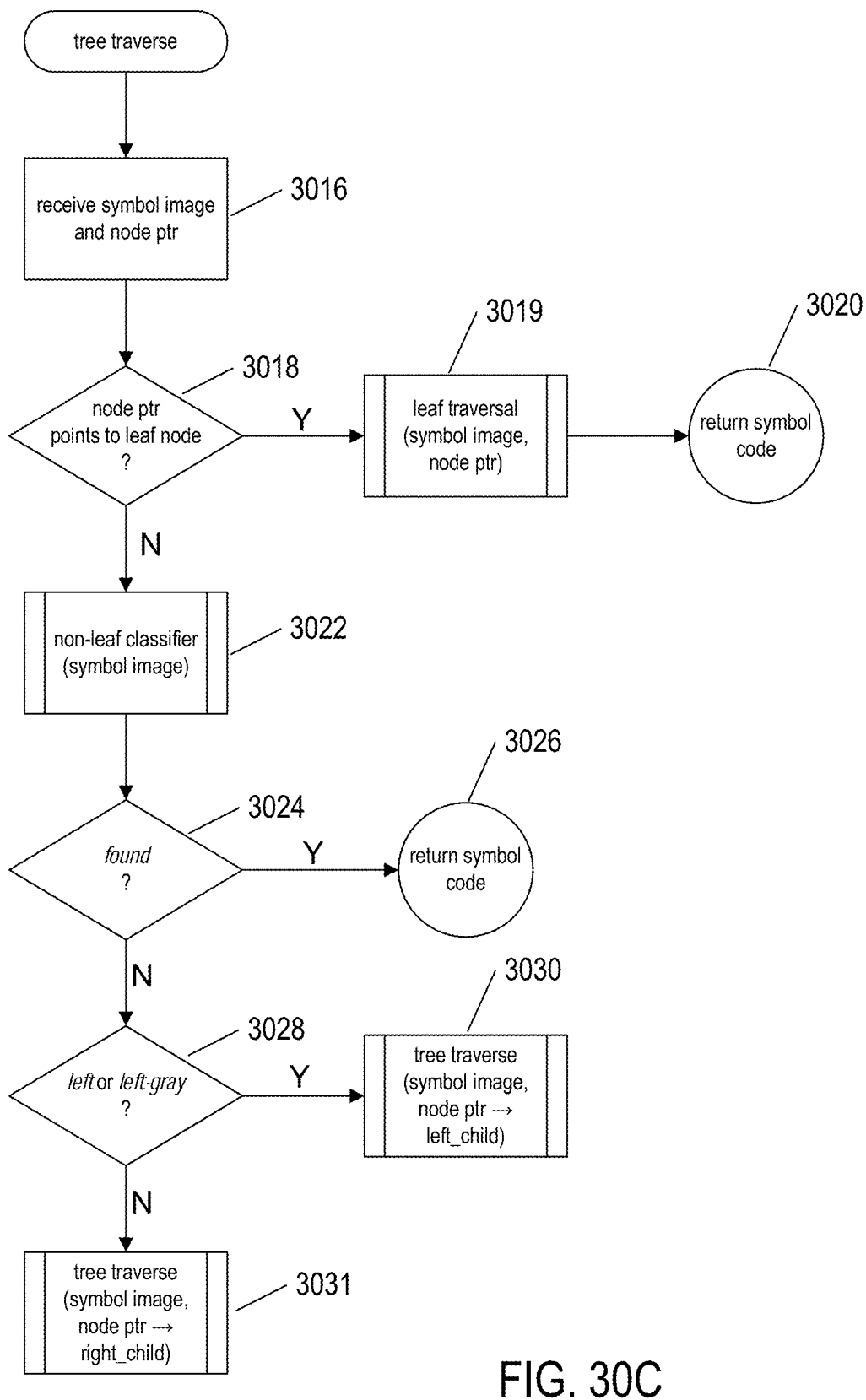
FIG. 30C provides control-flow diagrams that illustrate document processing by the currently described OCR system.

FIG. 30C provides a control-flow diagram for the recursive routine "tree traverse," called in step 3012 of FIG. 30B. In step 3016, the routine "tree traverse" receives a symbol image and a node pointer. In step 3018, the recursive routine "tree traverse" determines whether or not the node pointer references a leaf node of the decision tree. If so, the routine "tree traverse" calls the routine "leaf traversal" in step 3019 and returns, in step 3020, the symbol code returned by the routine "leaf traversal." Otherwise, in step 3022, the received symbol image is input to a classifier of the node referenced by the received node pointer, represented in FIG. 30C by a call to the routine "non-leaf classifier." When the classifier returns the decision found, as determined in step 3024, the symbol code associated with the classifier is returned by the routine "tree traverse" in step 3026. Otherwise, when the decision returned by the classifier is left, in the case of classifier logic that returns the three decisions found, left, and right, or when the classifier returns either the decision left or the decision left-gray, in the case of the decision logic shown in FIG. 26B, the routine "tree traverse" recursively calls itself on the left child of the node referenced by the received node pointer in step 3030. Otherwise, the tree-traversal routine calls itself on the right-hand child of the node referenced by the received node pointer, in step 3031.

Figure 30D:
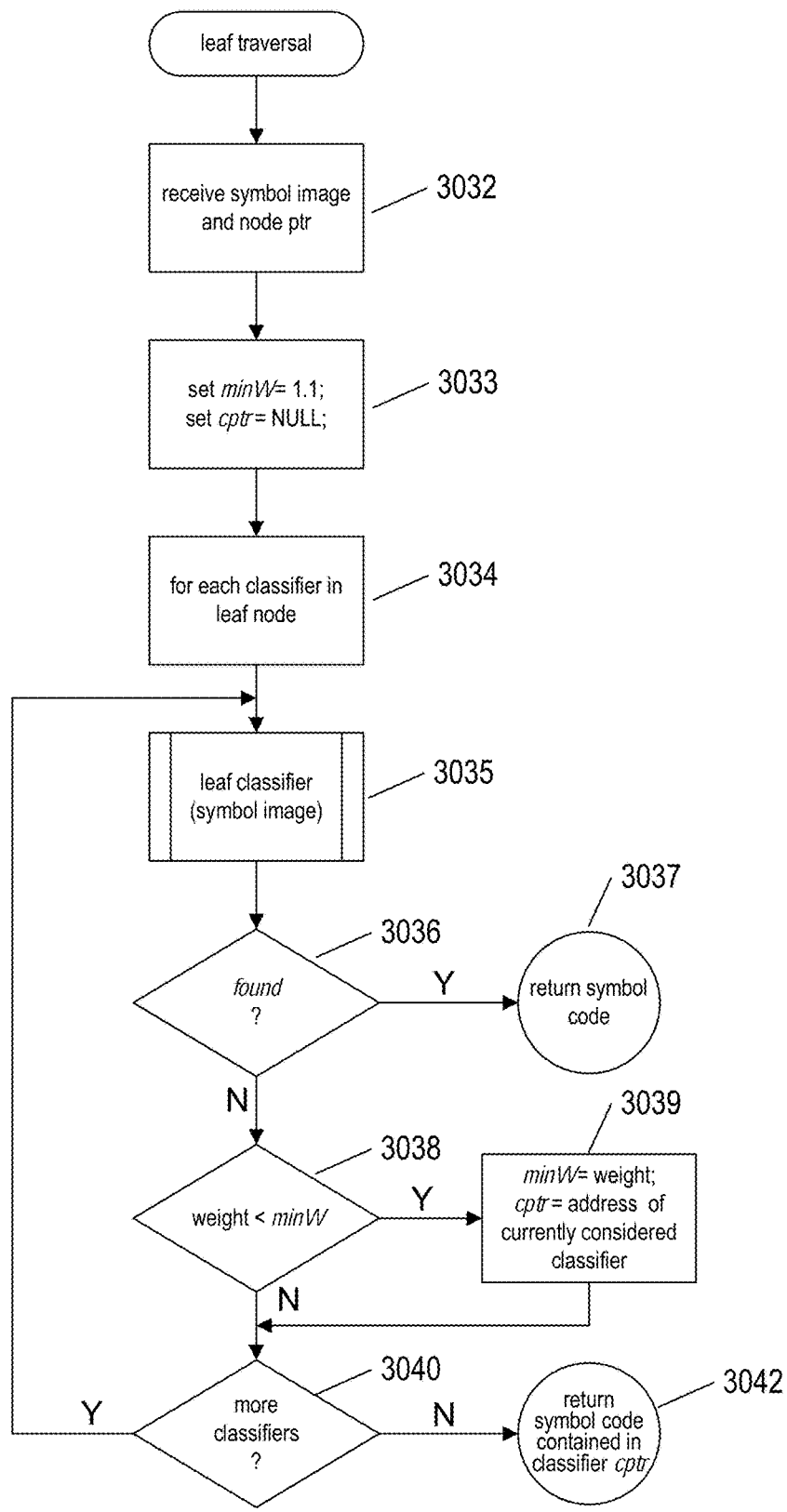
FIG. 30D provides control-flow diagrams that illustrate document processing by the currently described OCR system.

FIG. 30D provides a control-flow diagram for the routine "leaf traversal" called in step 3019 of FIG. 30C. In step 3032, the routine "leaf traversal" receives a symbol image and a pointer to the leaf node to be traversed. In step 3033, the routine "leaf traversal" sets local variables minW to 1.1 and cptr to NULL. Then, in the for-loop of steps 3034-3040, the routine "leaf traversal" traverses the sequence of classifiers within the leaf node. For each classifier, the routine "leaf traversal" submits the symbol image to the classifier, in step 3035, represented by a call to the routine "leaf classifier." When the leaf classifier returns a decision found, as determined in step 3036, the routine "leaf traversal" returns the symbol code associated with the currently considered classifier, in step 3037. Otherwise, when the weight computed by the currently considered classifier is less than local variable minW, as determined in step 3038, then minW is set to the weight returned by the currently considered classifier and cptr is set to the address of the currently considered classifier in step 3039. In the case that the for-loop finishes, the symbol code containing the classifier referenced by local variable cptr is returned by the routine "leaf traversal" in step 3042.

Figure 30E:
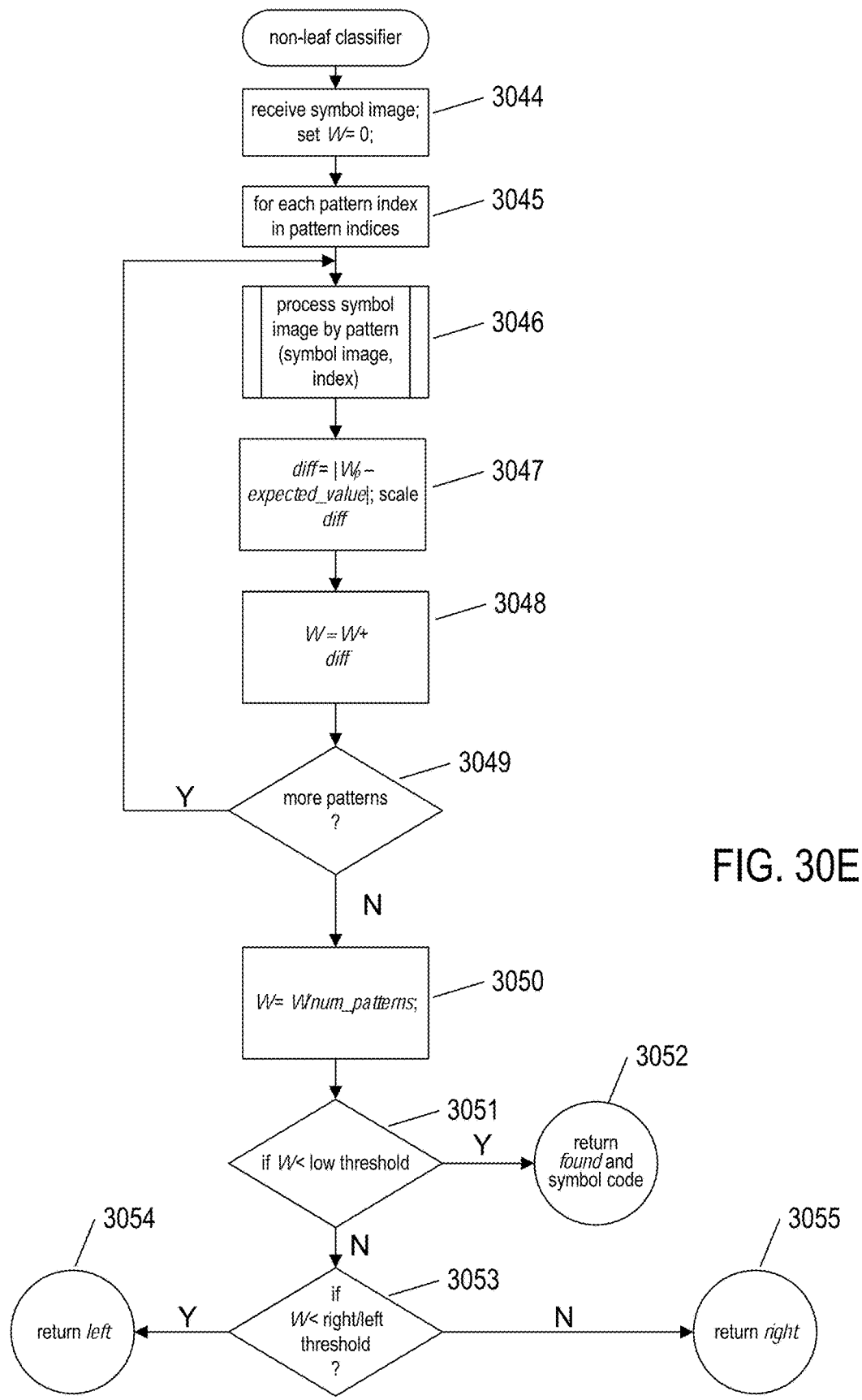
FIG. 30E provides control-flow diagrams that illustrate document processing by the currently described OCR system.

FIG. 30E illustrates, using a control-flow diagram, the routine "non-leaf classifier," called in step 3022 of FIG. 30C. In step 3044, the routine "non-leaf classifier" receives a symbol image and sets a local variable W to 0. In the for-loop of steps 3045-3049, each pattern index in the pattern indices associated with the classifier is used to access a corresponding pattern data structure and compute a pattern weight by the accessed pattern data structure, as represented by a call to the routine "process symbol image by pattern," in step 3046. In step 3047, the absolute value of the difference between the weight returned by the pattern data structure, $W_p$, and the expected value for the weight, contained in the expected-value portion of the tuple containing the pattern index that references the pattern data structure, is computed and then scaled, as discussed above with reference to FIG. 26A. Local variable W is incremented, in step 3048, by the scaled difference. Once all of the patterns have computed pattern weights for the symbol image, and those weights have been added to the local variable W, the local variable W is divided by the number of patterns associated with a classifier, in step 3050, to generate a weight representing the likelihood of classifier recognition of the symbol image. When that weight is less than the low threshold, as determined in step 3051, the decision found and the symbol code associated with the classifier are returned in step 3052. Otherwise, when W is less than the right/left threshold associated with the classifier, as determined in step 3053, the decision left is returned in step 3054. Otherwise, the decision right is returned in step 3055.

Figure 30F:
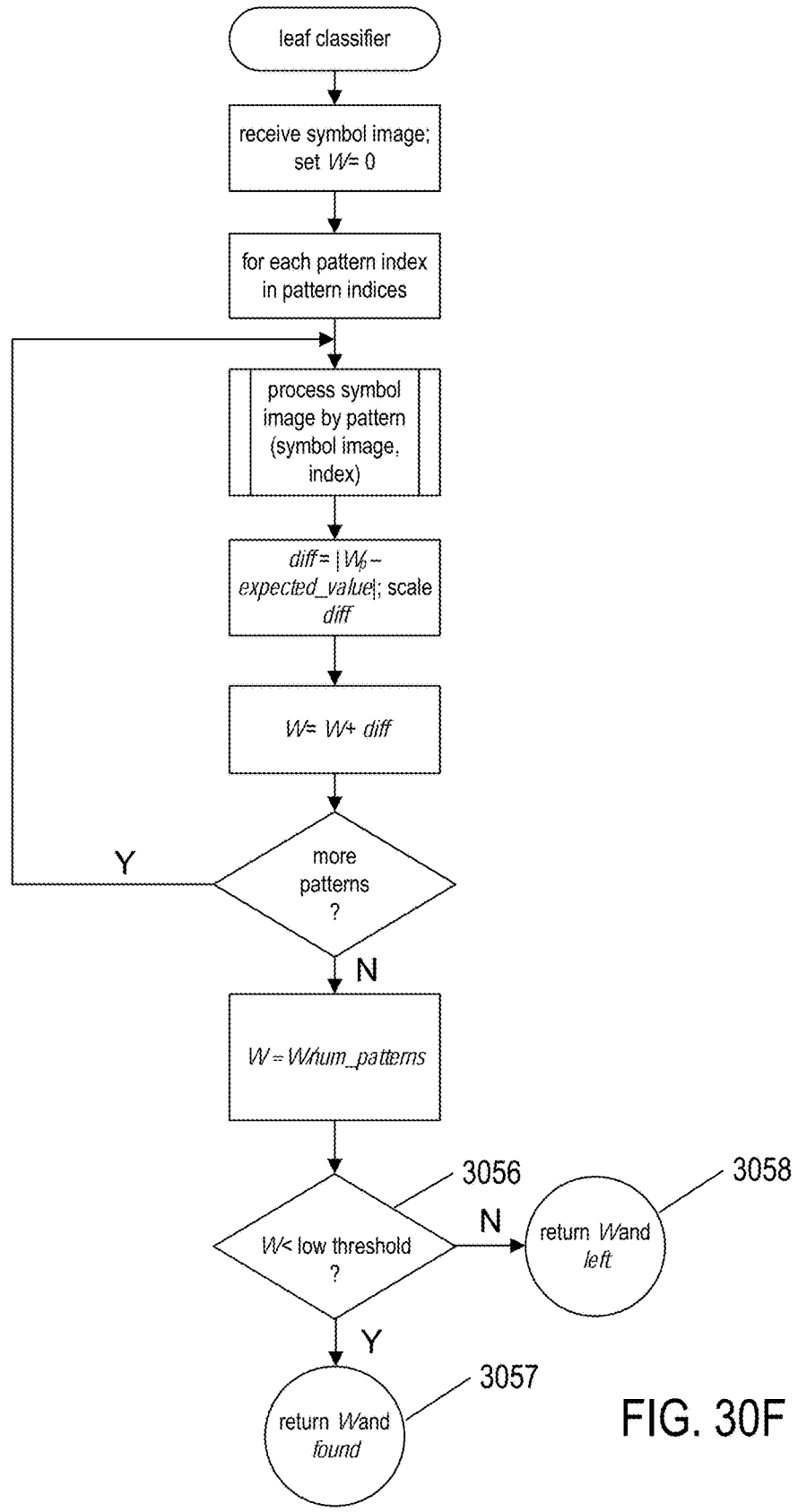
FIG. 30F provides control-flow diagrams that illustrate document processing by the currently described OCR system.

FIG. 30F provides a control-flow diagram for the routine "leaf classifier" called in step 3035 of FIG. 30D. The initial steps of the leaf-classifier routine are identical to the initial steps 3044-3050 of the routine "non-leaf classifier," discussed above with reference to FIG. 30E. In step 3056, the leaf classifier determines whether the computed weight W is less than the low threshold. When so, the leaf classifier returns the computed weight W and the decision found, in step 3057. Otherwise, the routine "leaf classifier" returns the computed weight W and a decision other than found, in step 3058.

Figure 30G:
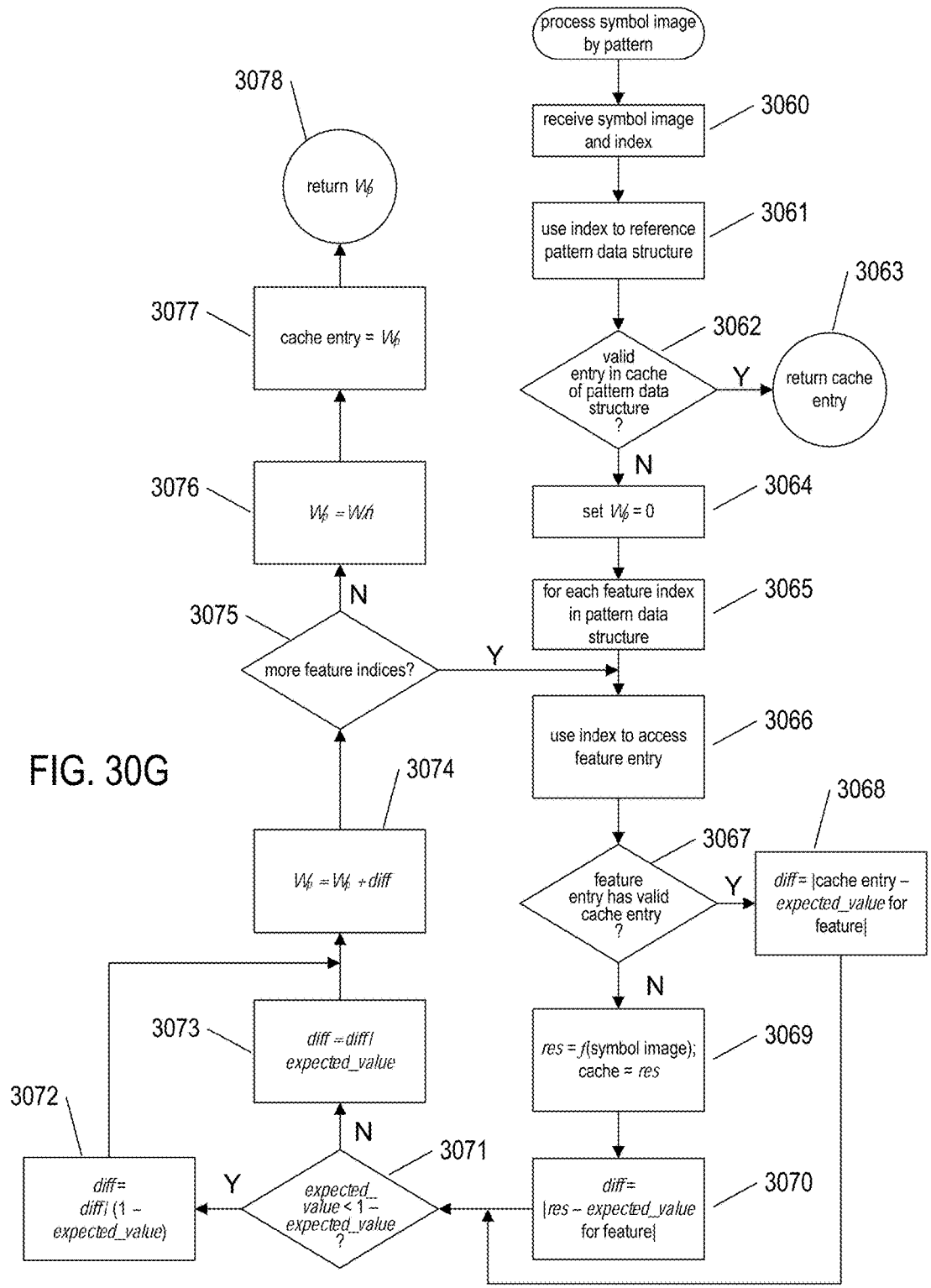
FIG. 30G provides control-flow diagrams that illustrate document processing by the currently described OCR system.

FIG. 30G provides a control-flow diagram for the routine "process symbol image by pattern," called in step 3046 of FIG. 30E and the similar step in FIG. 30F. In step 3060, the routine "process symbol image by pattern" receives a symbol image and pattern index. In step 3061, the routine "process symbol image by pattern" uses the pattern index to reference a pattern data structure in the set of pattern data structures (2012 in FIG. 20B) used by the OCR system. When there is a valid entry in the cache of the pattern data structure, as determined in step 3062, then the cache entry is returned in step 3063. Otherwise, in step 3064, the local variable $W_p$ is set to 0. Then, in the for-loop of steps 3065-3075, each feature index in the pattern data structure (column 2008 in FIG. 20A) is used to index a feature entry (e.g. feature entry 1912 and 1920 in FIG. 19) in the set of feature functions (1902 in FIG. 19) used by the OCR system, in step 3066. When the feature entry has a valid cache entry, as determined in step 3067, then the absolute value of the difference in the cache entry and the expected value for the feature (the expected value in column 2010 of FIG. 20A associated with the currently considered feature index in column 2008 of FIG. 20A). Otherwise, in step 3069, the feature function in the feature entry is called with the symbol image as the argument to produce a result value res and the cache entry associated with the feature entry set to the value stored in res. Then, in step 3070, the local variable diff is set to the absolute value of the difference between res and the expected value for the feature in column 2010 of FIG. 20A associated with the feature index for the feature function in column 2008 of FIG. 20A. When the expected value is less than 1 less than the expected value, as determined in step 3071, then diff is scaled by dividing diff by 1 minus the expected value, in step 3072. Otherwise, diff is scaled by dividing diff by the expected value in step 3073. In step 3074, local variable $W_p$ is incremented by diff. When there are more feature indices to consider, as determined in step 3075, control returns to step 3066. Otherwise, $W_p$ is divided by the number of features n in the pattern data structure, in step 3076 and the cache entry for the pattern data structure is set to $W_p$ in step 3077. $W_p$ is returned in step 3078.

FIGS. 31A-D provide control-diagrams to illustrate the construction and concurrent training of an OCR decision tree. In step 3102 of FIG. 31A, the routine "create decision tree" receives a database of symbol images (2702 in FIG. 27A) and a ordered set of classifiers (2704 in FIG. 27A). In step 3104, a root node is created for the decision tree. In step 3106, the routine "select classifier for node" is called with the root node as argument. The routine "select classifier for node" carries out the process discussed above with reference to FIGS. 27A-E. In step 3108, the routine "create decision tree" creates left and right child nodes for the root node. In step 3109, the routine "create decision tree" calls the routine "continue creation" with r a reference to the left child as the argument. In step 3110, the routine "create decision tree" calls the routine "continue creation" with a reference to the right child of the root node provided as an argument. In step 3112, a reference to the root node is returned as the output value for the function "create decision tree."

Figure 31A:
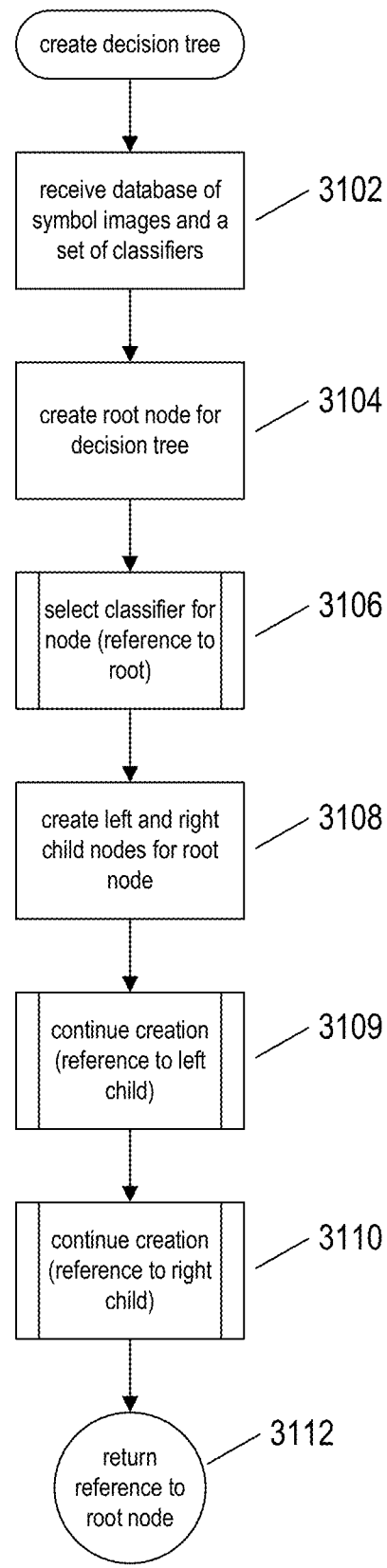
FIG. 31A provides control-diagrams to illustrate the construction and concurrent training of an OCR decision tree.
Figure 31B:
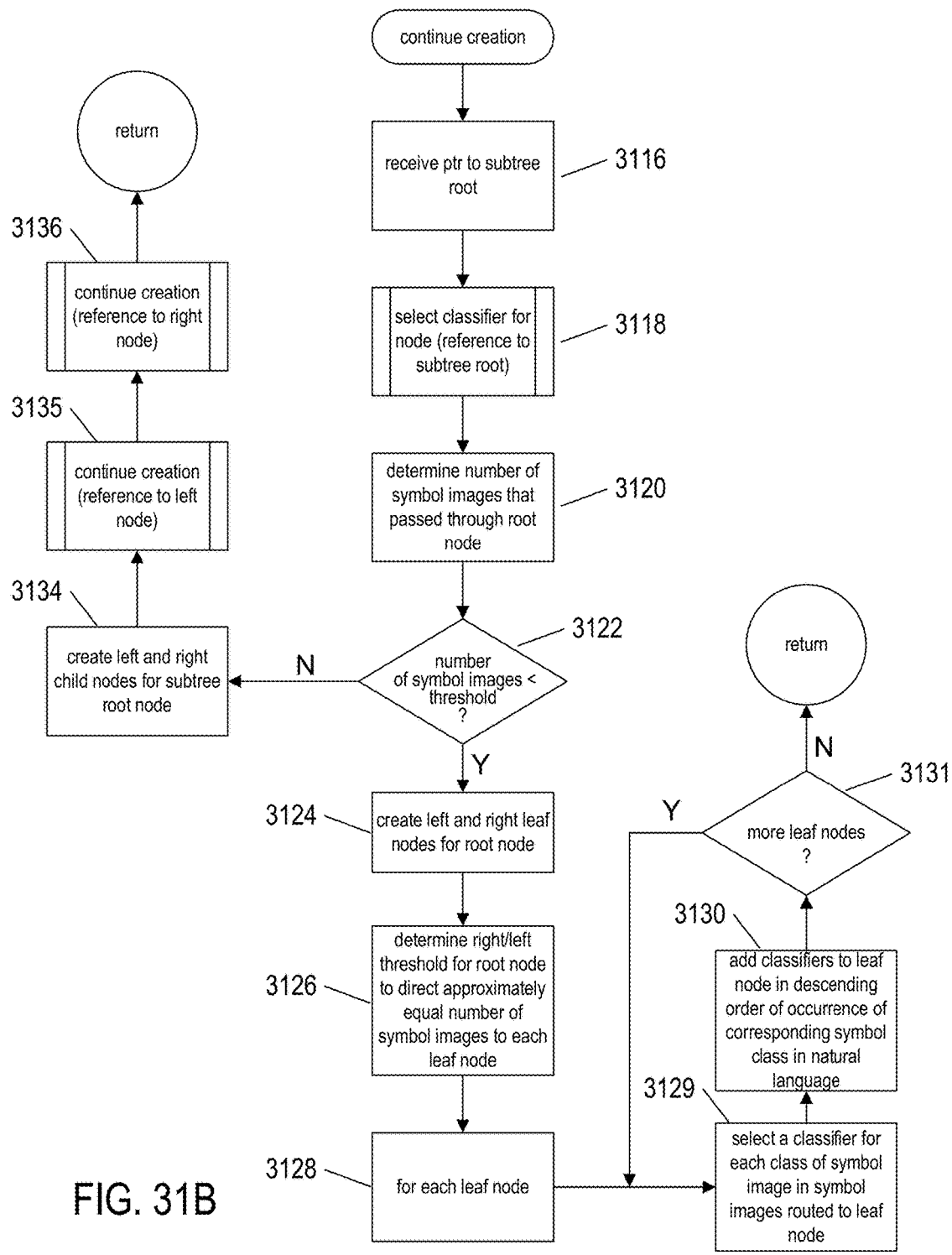
FIG. 31B provides control-diagrams to illustrate the construction and concurrent training of an OCR decision tree.

FIG. 31B provides a control-flow diagram for the recursive routine "continue creation" called in steps 3109 and 3110 of FIG. 31A. In step 3116, the routine "continue creation" receives a pointer to the root of a subtree. In step 3118, the routine "continue creation" calls the routine "select classifier for node," furnishing a reference to the subtree root as an argument. This routine carries out the process described above with reference to FIGS. 27A-E. In step 3120, the routine "continue creation" determines the number of symbol images that passed through the root node referenced by the received pointer, using the found, left, and right databases that collect symbol images passing through the node, as described above with reference to FIGS. 27A-E. When the number of symbol images that passed through the root node is less than a threshold, as determined in step 3122, then, in step 3124, the routine "continue creation" creates left and right leaf nodes for the subtree root node referenced by the received pointer. In step 3126, the routine "continue creation" determines a right/left threshold for the subtree root node to direct an approximately equal number of symbol images to each of the leaf nodes created in step 3124. Not only is the right/left threshold intended to direct an approximately equal number of symbol images to each leaf node, the right/left threshold is also intended to, when possible, ensure that all of the symbol images passing through the subtree root node that belong to a particular symbol class are directed either to the left or right leaf node. A symbol class refers to a set of symbol images, all of which correspond to a single symbol and corresponding symbol code of a natural language. For example, the column 704 in FIG. 7A includes different forms of the eighth symbol in the symbol set shown in FIG. 6. This set of different forms of the eight symbol constitutes a symbol class for the eighth symbol. A symbol class within a large database of symbol images may have many hundreds, thousands, or more member symbol images that reflect the many different forms and appearances a particular symbol may have in various types of printed and displayed text. Thus, if small adjustments in the right/left threshold can be made to direct all of the symbol images belonging to more symbol classes to the left or right, then those adjustments are made as long as the total number of symbol images directed to the left and right leaf nodes is relatively balanced. Then, in thefor-loop of steps 3128-3131, for each of the two leaf nodes created in step 3124, the classifier for each class of symbol image in the symbol images routed to the leaf node is determined, and, in step 3130, the classifiers are added to the leaf node in descending order of occurrence of the corresponding symbol class in natural language texts. When the number of symbol images that have passed through the subtree root during the classifier/selection process, in step 3118, is not less than a threshold value, as determined in step 3122, then, in step 3134, right and left child nodes are created for the subtree root node and, in steps 3135 and 3136, the routine "continue creation" is recursively called for the left and right nodes, respectively.

Figure 31C:
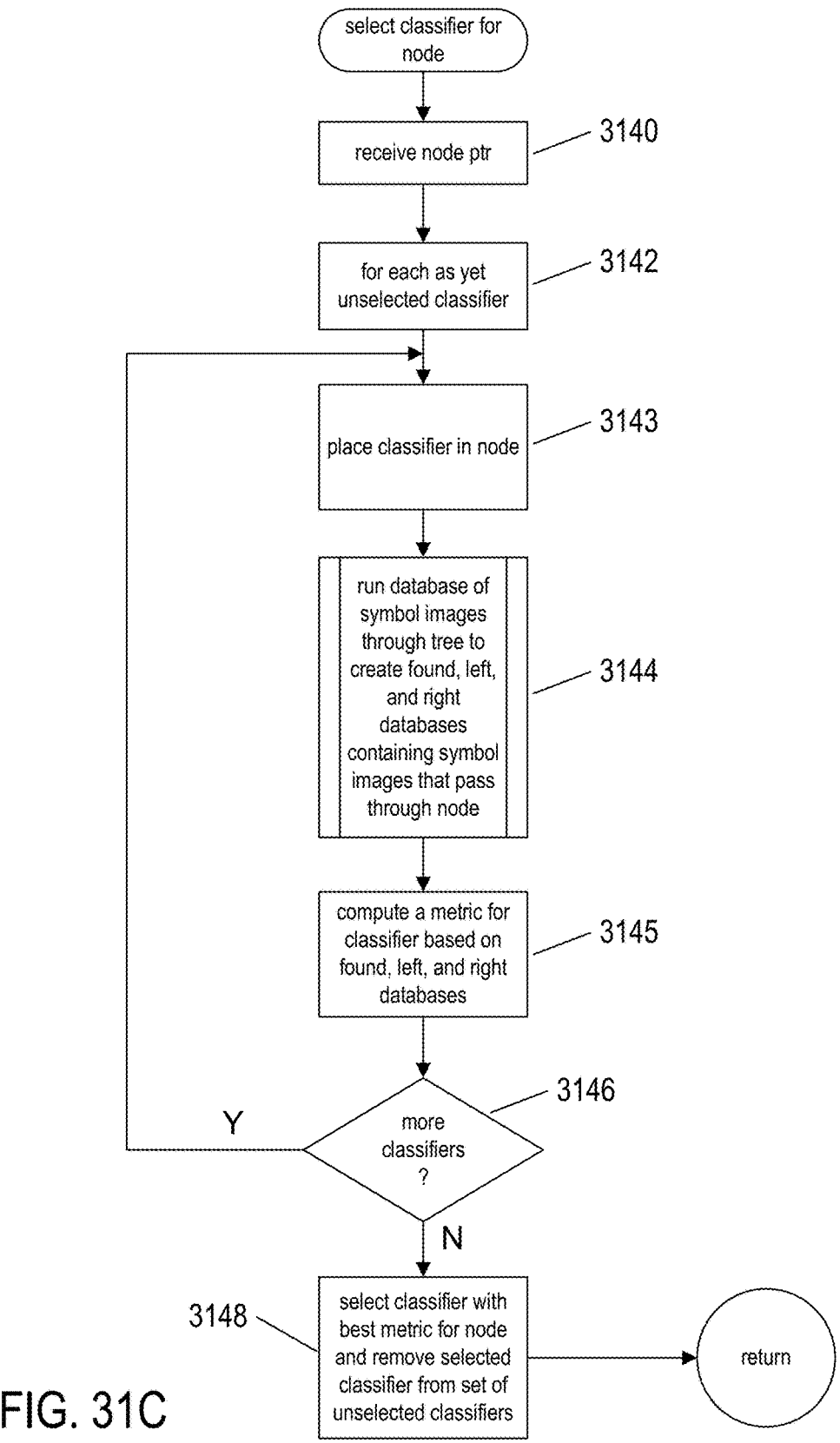
FIG. 31C provides control-diagrams to illustrate the construction and concurrent training of an OCR decision tree.

FIG. 31C provides a control-flow diagram for the routine "select classifier for node," called in steps 3106 of FIG. 31A and 3118 of FIG. 31B. In step 3140, the routine "select classifier for node" receives a pointer or reference to the node. In thefor-loop of steps 3142-3146, each as yet unselected or unassigned classifier is considered. In step 3143, the currently considered classifier is inserted into the node as the sole classifier within the node. In step 3144, a routine is called to run the database of symbol images through the tree to create left, right, and found databases containing symbols images that pass through the node reference by the received node pointer. In step 3145, a metric is computed for the classifier based on the found, left, and right databases populated with symbol images that pass through the node during the run of the database of symbol images through the decision tree, in step 3144. Once all of the unassigned classifiers have been evaluated, then, in step 3148, the classifier with the best metric is selected from the node and removed from the set of unselected classifiers.

Figure 31D:
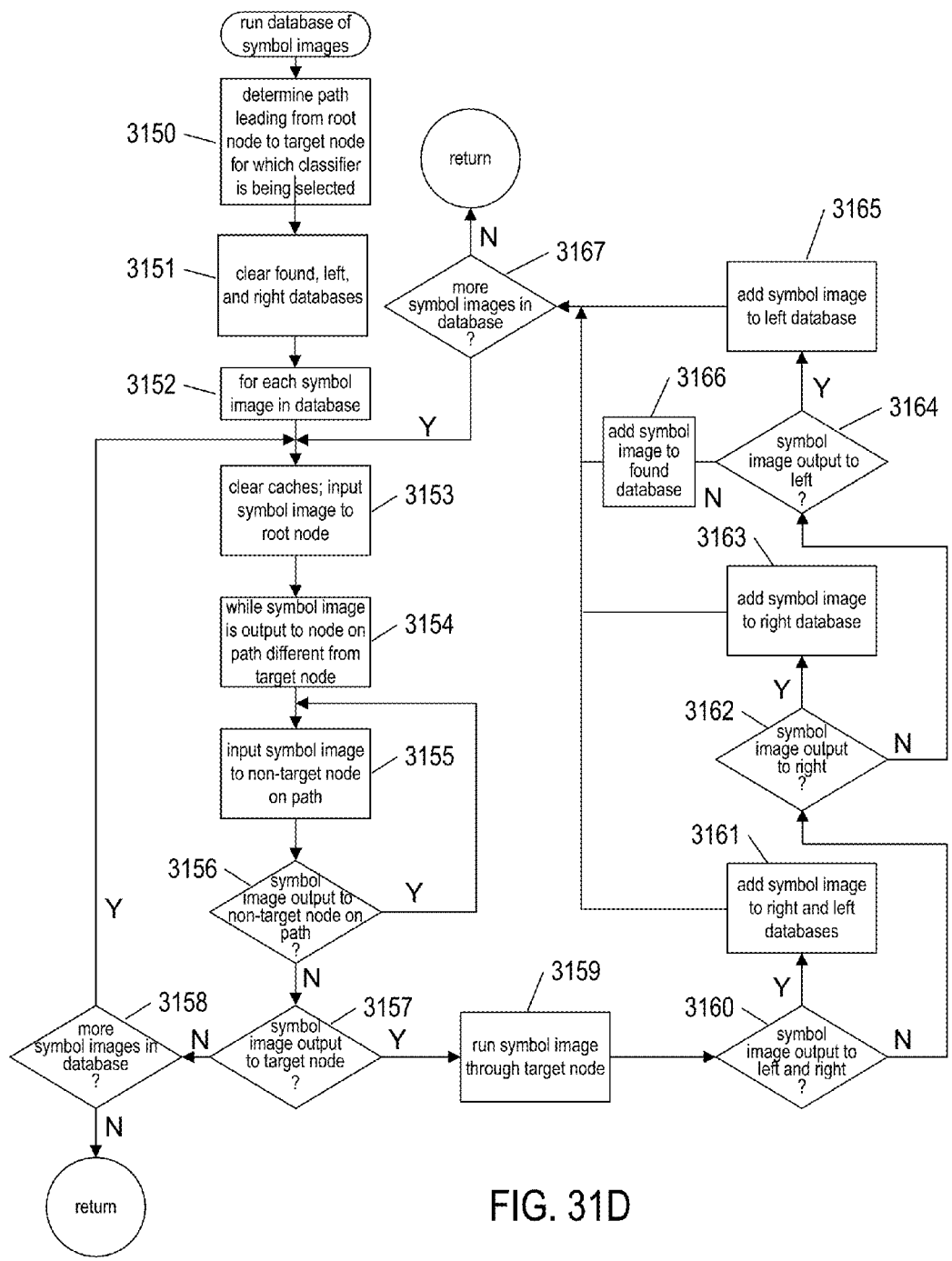
FIG. 31D provides control-diagrams to illustrate the construction and concurrent training of an OCR decision tree.

FIG. 31D provides a control-flow diagram for the routine called in step 3144 of FIG. 31C. In step 3150, a path leading from the root node to the target node for which a classifier is being selected by the routine illustrated in FIG. 31C is determined. In the for-loop of steps 3152-3167, each symbol in the symbol image database is run through the determined path of the decision tree. In step 3153, the found, the caches are cleared and the input symbol image is input to the root node of the decision tree. In the while-loop of steps 3154-3156, the symbol image output from a previous node is input to a next node along the path leading to the target node. Of course, should the symbol image be output by a node on the path to a node not on the path, then processing for the currently considered symbol image is finished and control flows to step 3158. When the symbol is output from a higher-level node to the target node, as determined in step 3157, then, in step 3159, the symbol image is run through the target node, which involves inputting the signal to the classifier in the target node and receiving a decision from the classifier. When the classifier indicates that the symbol should be output to both left and right nodes, as determined in step 3160, then the symbol is added to both the right and left databases in step 3161. Otherwise, when the classifier indicates that the symbol is to be output to the right node, as determined in step 3162, then, in step 3163, the symbol image is added to the right database. When the classifier indicates that the symbol image is output to the left child node, as determined in step 3164, then, in step 3165, the symbol image is added to the left database. When the classifier indicates that the symbol image is not output to any child node, as determined in step 3164, then, in step 3166, the symbol image is added to the found database.

The metric computed in step 3145 of FIG. 31C can be computed in a variety of different ways. The metric is intended to have maximum value for the most suitable classifier of the as-yet unassigned classifiers to assign to the node. The most suitable classifier is, in general, a classifier that directs all of the symbol images corresponding to each symbol class to either the left, right, or found databases. In addition, a suitable classifier is a classifier that directs the most symbol images to the found database. In one implementation, a suitable classifier is one that, for the most part, directs all of the symbol images corresponding to each symbol class in only one direction. In another implementation, the number of symbol images directed to the left and to the right should be approximately equal, for the most suitable classifier. Although balancing the number of symbol images directed to the left and right child of a node may, in some cases, appear to conflict with directing all of the symbol images of each symbol class in only one direction, an optimal classifier may well produce a balanced distribution of symbol images to the right and left as well as directing symbol images corresponding to a particular symbol class in only one direction. The example computed metric shown, below, includes weighted contributions, or terms, for each of the above-mentioned goals of maximizing the symbol images directed to the found database, balancing the numbers of symbol images directed to the left and right child nodes, and directing symbol images of each symbol class to only one child:

$$m = W_1\left(\frac{n}{t}\right) + W_2\left(\frac{r+l}{|r-l|+r+l}\right) + W_3(f)$$

where $W_1$, $W_2$, and $W_3$ are constant weights;
n=number of symbol classes not split between right and left links;
t=total number of symbol classes that pass through node;
r=number of symbol classes that are output to right link;
l=number of symbol classes that are output to left link; and
f=number of symbol images identified as found by node.

Of course, other types of metrics may be employed that fewer or more terms and intermediate computed values and that include no, fewer, or more weights. The computed metric value may be additionally normalized, to fall in a particular range of values, such as [0,1]. For yet other types of metrics, a non-linear function may be used to compute metric values. In general, the metric provides a value reflective of one or more goals that allows a best possible classifier to be selected from among the as yet unselected classifiers for each node during construction of the decision tree.

Although the present invention has been described in terms of particular embodiments, it is not intended that the invention be limited to these embodiments. Modifications within the spirit of the invention will be apparent to those skilled in the art. For example, the order of creation of nodes in the OCR decision tree may vary with varying implementations. Different types of metrics for selecting classifiers for the root node and intermediate-level nodes may be employed. The threshold values incorporated in classifiers and used for terminating intermediate-node creation and instead creating leaf nodes may have different values for different target natural languages and in different implementations. The values of thresholds used within classifiers may also vary, in different implementations. An OCR system that incorporates the OCR-decision-tree-based identification of symbol codes for symbol images may be variously implemented by varying any of many different design and implementation parameters, including choice of hardware systems, operating systems, programming language, modular organization, data structures, control structures, and other such design and implementation parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An optical-symbol-recognition system comprising:
one or more processors;
one or more memories;
one of more data-storage devices; and computer instructions, stored in one or more of the one or more data-storage devices that, when executed by one or more of the one or more processors, control the optical-symbol- recognition system to process a text-containing scanned image of a document by
identifying symbol images in the scanned image of the document, for each identified symbol image,
accessing a decision tree stored within the optical-symbol-recognition system, wherein the decision tree comprises one or more nodes including one or more classifiers, wherein each classifier included in a node of the decision tree includes a number of tuples, and wherein each tuple comprises a reference to a pattern data structure and an expected value;
starting with a root node of the decision tree, traversing the decision tree until a classifier within a decision-tree node recognizes the symbol image; and
representing the symbol image with a symbol code contained within, or referenced by, the classifier; and
preparing a processed document containing a set of symbol codes that represent the symbol images in the scanned image of the document and storing the processed document in one or more of the one of more data-storage devices and memories.

2. The optical-symbol-recognition system of claim 1 wherein the decision tree comprises:
the root node that includes a classifier;
multiple intermediate-level nodes that each include a classifier; and
multiple leaf nodes that each include multiple classifiers.

3. The optical-symbol-recognition system of claim 2 wherein the decision tree is constructed to include, in each of the root and intermediate-level nodes, each of which is linked to two or more child nodes, a classifier selected from among as yet unselected classifiers based on a computed metric reflective of one or more goals that include:
during traversal of the decision tree, recognizing as many symbol images as possible;
during traversal of the decision tree, directing as many unrecognized symbol images as possible that correspond to a single symbol class to a single child node; and
during traversal of the decision tree, directing a similar number of unrecognized symbol images to each child node.

4. The optical-symbol-recognition system of claim 2 wherein each of the root node and intermediate nodes of the decision tree have a left link to a first lower-level child node and a right link to a second lower-level child node.

5. The optical-symbol-recognition system of claim 2 wherein each classifier contained in a node of the decision tree further includes:
an indication of the number of tuples included in the classifier;
a symbol code, or a reference to a symbol code, for a symbol recognized by the classifier; and
multiple threshold values.

6. The optical-symbol-recognition system of claim 5 wherein each classifier within a root node or intermediate-level node receives, as input, a symbol image and returns, as output, a decision.

7. The optical-symbol-recognition system of claim 6 wherein each classifier within a root node or intermediate-level node, upon receiving an input symbol image:
computes a weight value from weights produced by the pattern data structure referenced by, and the expected value contained in, each tuple; and
determines a decision to output based on one or more of the multiple thresholds and the computed weight value.

8. The optical-symbol-recognition system of claim 7 wherein the weight value is computed by:
for each tuple,
subtracting the weight value produced by the pattern data structure referenced by the reference contained in the tuple and the expected value contained in the tuple to produce a difference,
computing an absolute value of the difference,
scaling the computed absolute value, and
adding the scaled computed absolute value to an accumulator; and
dividing the value in the accumulator by the number of tuples contained in the classifier.

9. The optical-symbol-recognition system of claim 7 wherein the decision returned by each root-node and intermediate-level classifier, to which a symbol image is input during a symbol- recognition traversal of the decision tree, is selected from among:
found, returned by the classifier when the computed weight is less than a low threshold;
left, returned by the classifier when the computed weight is less than a left/right threshold and greater than or equal to the low threshold; and
right, returned by the classifier when the computed weight is greater than the left/right threshold.

10. The optical-symbol-recognition system of claim 7 wherein the decision returned by each root-node and intermediate-level classifier, to which a symbol image is input during construction and concurrent training of the decision tree, is selected from among:
found, returned by the classifier when the computed weight is less than a low threshold;
left, returned by the classifier when the computed weight is less than a left-gray threshold and greater than or equal to the low threshold;
left and right, returned by the classifier when the computed weight is less than a right-gray threshold and greater than or equal to the left-gray threshold; and
right, returned by the classifier when the computed weight is greater than or equal to the right-gray threshold.

11. The optical-symbol-recognition system of claim 5 wherein each classifier within a leaf node receives, as input, a symbol image and returns, as output, a decision and a weight.

12. The optical-symbol-recognition system of claim 11 wherein each classifier within a leaf node, upon receiving an input symbol image:
computes a weight value from weights produced by the pattern data structure referenced by, and the expected value contained in, each tuple;
outputs the computed weight value and a decision found, when the computed weight is less than a low threshold; and
otherwise outputs the computed weight and a decision other than found.

13. The optical-symbol-recognition system of claim 5 wherein each pattern data structure contained in each classifier comprises:
a number of tuples, each tuple containing a reference to a feature function and an expected value; and
an indication of the number of tuples contained in the pattern data structure.

14. The optical-symbol-recognition system of claim 13 wherein the pattern data structure produces a weight for a symbol image by:
for each tuple,
subtracting the weight value produced by the feature function, referenced by the reference contained in the tuple, operating on the symbol image and the expected value contained in the tuple to produce a difference,
computing an absolute value of the difference,
scaling the computed absolute value, and
adding the scaled computed absolute value to an accumulator; and
dividing the value in the accumulator by the number of tuples contained in the pattern data structure.

15. The optical-symbol-recognition system of claim 1 wherein traversing the decision tree until a classifier within a decision-tree node recognizes the symbol image further comprises:
recursively, starting with the root node of the decision tree as the currently considered node,
inputting the symbol image to the classifier of the currently considered node;
when the classifier returns a decision found, returning the symbol code contained within, or referenced by, the classifier as the symbol code corresponding to the symbol image;
when the classifier returns a decision left, and a left child of the currently considered node is an intermediate-level node, considering the left child of the currently considered node as a next currently considered node for a next recursion;
when the classifier returns a decision right, and a right child of the currently considered node is an intermediate-level node, considering the right child of the currently considered node as a next currently considered node for a next recursion; and
when the classifier returns either the decision left or returns the decision right and the children of the currently considered node are leaf nodes, traversing the classifiers within an indicated leaf node to identify the symbol code corresponding to the symbol image.

16. The optical-symbol-recognition system of claim 15 wherein traversing the classifiers within the indicated leaf node to identify the symbol code corresponding to the symbol image further comprises:
inputting the symbol image to each successive classifier within the leaf node until either a classifier returns the decision found, in which case the symbol code contained in, or referenced by, the classifier is identified as the symbol code corresponding to the symbol image or until there are no more classifiers to which to input the symbol image, in which case a symbol code contained in, or referenced by, the classifier that returned the lowest weight value is identified as the symbol code corresponding to the symbol image.

17. A method incorporated within an optical-symbol-recognition system having one or more processors, one or more memories, one of more data-storage devices, and a decision tree stored within one or more of the one or more memories and one or more data-storage devices, the method implemented by computer instructions, stored in one or more of the one or more data-storage devices that, when executed by one or more of the one or more processors, control the optical-symbol- recognition system to identify a symbol code corresponding to a symbol image, the method comprising:
accessing the decision tree, wherein the decision tree comprises one or more nodes including one or more classifiers, wherein each classifier included in a node of the decision tree includes a number of tuples, and wherein each tuple comprises references to multiple pattern data structures and expected values;
starting with a root node of the decision tree, recursively traversing the decision tree until a classifier within a decision-tree node recognizes the symbol image; and
storing an association of the symbol image with a symbol code that represents the symbol image recognized by the classifier in one or more of the one or more memories and one or more data-storage devices.

18. The method of claim 17
wherein the decision tree includes
the root node and multiple intermediate-level nodes that each includes a classifier and that each includes a right link to a right child node and a left link to a left child node, and
multiple leaf nodes that each includes multiple classifiers; and
wherein each classifier references the multiple pattern data structures and contains, for each referenced pattern data structure, an expected value, and each pattern data structure referenced by the classifier references multiple feature functions and contains, for each referenced feature function, an expected value.

19. The method of claim 18 wherein a classifier within the root node or within an intermediate-level node contains, in addition to the references to multiple pattern data structures and corresponding expected values:
an indication of the number of pattern data structures referenced by the classifier;
a symbol code, or a reference to a symbol code, for a symbol recognized by the classifier; and
multiple threshold values.

20. The method of claim 19 wherein each classifier within a root node or intermediate-level node receives, as input, a symbol image and returns, as output, a decision by:
for each referenced pattern data structure,
subtracting a weight produced by the pattern data structure for the symbol image and the expected value corresponding to the referenced pattern data structure to produce a difference,
computing an absolute value of the difference,
scaling the computed absolute value, and
adding the scaled computed absolute value to an accumulator; and
dividing the value in the accumulator by the number of pattern data structures referenced by the classifier to produce a computed weight;
when the computed weight is less than a low threshold, returning the decision found;
when the computed weight is less than a left/right threshold and greater than or equal to the low threshold, returning the decision left; and
when the computed weight is greater than the left/right threshold, returning the decision right.

21. The method of claim 18 wherein each classifier within a leaf node receives, as input, a symbol image and returns, as output, a decision and a weight by:
for each referenced pattern data structure,
subtracting a weight produced by the pattern data structure for the symbol image and the expected value corresponding to the referenced pattern data structure to produce a difference, computing an absolute value of the difference, scaling the computed absolute value, and adding the scaled computed absolute value to an accumulator; and dividing the value in the accumulator by the number of pattern data structures referenced by the classifier to produce a computed weight;

when the computed weight is less than a low threshold, returning the decision found and the computed weight; and when the computed weight is greater than or equal to the low threshold, returning a decision other than found and the computed weight.

22. The method of claim 17 wherein starting with a root node of the decision tree, recursively traversing the decision tree until a classifier within a decision-tree node recognizes the symbol image further comprises:

recursively, starting with the root node of the decision tree as a currently considered node, inputting the symbol image to the classifier of the currently considered node;

when the classifier returns a decision found, returning the symbol code contained within, or referenced by, the classifier as the symbol code corresponding to the symbol image;

when the classifier returns a decision left, and a left child of the currently considered node is an intermediate-level node, considering the left child of the currently considered node as a next currently considered node for a next recursion;

when the classifier returns a decision right, and a right child of the currently considered node is an intermediate-level node, considering the right child of the currently considered node as a next currently considered node for a next recursion; and when the classifier returns either the decision left or returns the decision right and the children of the currently considered node are leaf nodes, traversing the classifiers within an indicated leaf node corresponding to the decision to identify the symbol code corresponding to the symbol image by inputting the symbol image to each successive classifier within the indicated leaf node until either a classifier returns the decision found, in which case the symbol code contained in, or referenced by, the classifier is identified as the symbol code corresponding to the symbol image or until there are no more classifiers to which to input the symbol image, in which case a symbol code contained in, or referenced by, the classifier that returned the lowest weight value is identified as the symbol code corresponding to the symbol image.

23. Computer instructions stored in a physical data-storage device that implement a method incorporated within an optical-symbol-recognition system having one or more processors, one or more memories, one of more data-storage devices, and a decision tree stored within one or more of the one or more memories and one of more data-storage devices, the method implemented by computer instructions, stored in one or more of the one or more data-storage devices that, when executed by one or more of the one or more processors, control the optical-symbol-recognition system to identify a symbol code corresponding to a symbol image, the method comprising:

accessing the decision tree, wherein the decision tree comprises one or more nodes including one or more classifiers, wherein each classifier included in a node of the decision tree includes a number of tuples, and wherein each tuple comprises references to multiple pattern data structures and expected values;

starting with a root node of the decision tree, recursively traversing the decision tree until a classifier within a decision-tree node recognizes the symbol image; and storing an association of the symbol image with a symbol code that represents the symbol image recognized by the classifier in one or more of the one or more memories and one or more data-storage devices.

* * * * *